(12) United States Patent
Taylor et al.

(10) Patent No.: US 12,240,173 B2
(45) Date of Patent: Mar. 4, 2025

(54) CYLINDRICAL COORDINATE 3D PRINTER AND METHODS OF OPERATION THEREOF

(71) Applicant: Gantri, Inc., San Leandro, CA (US)

(72) Inventors: Christianna Elizabeth Taylor, Oakland, CA (US); Yi Yang, San Francisco, CA (US); Puneet Bhumipal Jhaveri, Burlingame, CA (US); Noah Benjamin Novik Katz, San Francisco, CA (US); Jason Reyes Cortella, San Francisco, CA (US)

(73) Assignee: Gantri, Inc., San Leandro, CA (US)

( * ) Notice: Subject to any disclaimer, the term of this patent is extended or adjusted under 35 U.S.C. 154(b) by 629 days.

(21) Appl. No.: 17/530,173

(22) Filed: Nov. 18, 2021

(65) Prior Publication Data

US 2022/0072781 A1    Mar. 10, 2022

Related U.S. Application Data

(63) Continuation of application No. PCT/US2020/044212, filed on Jul. 30, 2020.

(60) Provisional application No. 62/882,024, filed on Aug. 2, 2019.

(51) Int. Cl.
| | |
|---|---|
| B29C 64/236 | (2017.01) |
| B29C 64/209 | (2017.01) |
| B29C 64/232 | (2017.01) |
| B29C 64/241 | (2017.01) |
| B29C 64/245 | (2017.01) |
| B33Y 10/00 | (2015.01) |
| B33Y 30/00 | (2015.01) |

(52) U.S. Cl.
CPC .......... B29C 64/241 (2017.08); B29C 64/209 (2017.08); B29C 64/232 (2017.08); B29C 64/245 (2017.08); B33Y 10/00 (2014.12); B33Y 30/00 (2014.12)

(58) Field of Classification Search
None
See application file for complete search history.

(56) References Cited

U.S. PATENT DOCUMENTS

| | | |
|---|---|---|
| 2008/0042321 A1 | 2/2008 | Russell et al. |
| 2015/0035198 A1 | 2/2015 | Saba et al. |
| 2015/0273768 A1 | 10/2015 | Alchemy |

(Continued)

FOREIGN PATENT DOCUMENTS

| | | |
|---|---|---|
| CN | 105034391 | 11/2015 |
| CN | 205989515 | 3/2017 |
| WO | WO 2021/025939 | 2/2021 |

OTHER PUBLICATIONS

Hoy, Brandon, "Design and Implementation of a Three-Dimensional Printer using a Cylindrical Printing Process" Student Report, 2016.

*Primary Examiner* — Armand Melendez
(74) *Attorney, Agent, or Firm* — Levine Bagade Han LLP

(57) ABSTRACT

Disclosed are cylindrical-coordinate 3D printers and methods of 3D printing. In one embodiment, the cylindrical-coordinate 3D printer can comprise a printbed, a rotatable printbed support assembly, a vertically translatable base plate supporting the printbed support assembly, four rail segments aligned radially with the printbed support assembly, and four gantry carriers configured to carry or support four printheads. The gantry carriers can be moveable along the rail segments. The four gantry carriers can be moved simultaneously.

16 Claims, 26 Drawing Sheets

(56) References Cited

U.S. PATENT DOCUMENTS

2016/0144564 A1 5/2016 Padgett et al.
2018/0215092 A1 8/2018 Dudley et al.

Lamp Printed by Cylindrical-Coordinate 3D Printer

CYLINDRICAL COORDINATE 3D PRINTER AND METHODS OF OPERATION THEREOF

CROSS-REFERENCE TO RELATED APPLICATIONS

This application is a continuation of International Patent Application No. PCT/US2020/044212, filed on Jul. 30, 2020, which claims the benefit of U.S. Provisional Application No. 62/882,024 filed on Aug. 2, 2019, the contents of which are incorporated herein by reference in their entireties.

FIELD OF TECHNOLOGY

The present disclosure relates generally to the field of additive manufacturing or three-dimensional (3D) printing, and, more specifically, to an improved cylindrical coordinate 3D printer and methods of operation thereof.

BACKGROUND

Fused deposition modeling (FDM), also referred to as fused filament fabrication (FFF), is a 3D printing process by which a 3D object is created from a digital model by selectively depositing melted material in a pre-determined manner layer-by-layer. Currently, the two most popular types of FDM or FFF 3D printers are cartesian 3D printers and delta 3D printers.

Cartesian 3D printers are named for the three-axes Cartesian coordinate system that uses x, y, z coordinates to determine the location of the printhead. Cartesian printers are often built with rails that allow the printhead to move in the x- and y-dimensions and actuators that move the printhead up or down in the z-dimension. However, most traditional Cartesian 3D printers are only designed with one printhead, which severely limits the deposition rate and, in turn, the average print time. While larger filaments may be deposited to increase deposition rates, such a workaround usually results in a loss of resolution.

Delta 3D printers usually rely on a different system setup to locate and navigate the printhead within 3D space. For example, most delta 3D printers have three arms that move up and down on vertical rails arranged in a triangular formation. Each arm can move up and down the rails, independently of one another. Delta printers use trigonometric functions based on the angles created by these arms to determine the location of the printhead within the 3D print space. While delta 3D printers have been known to work better for taller printed objects, such printers often have trouble printing more intricate shapes and tend to print with less detail. Moreover, most commercially available delta 3D printers are often unsuited for printing larger 3D objects.

Therefore, a solution is needed which addresses the above shortcomings and disadvantages. Such a solution should decrease print times while not sacrificing precision or print quality for speed. In addition, such a printer should be cost-effective to manufacture and not be overly complicated to operate.

Recently, some in the field have suggested building 3D printers that rely on a cylindrical-coordinate system comprising radial (r), angular (θ), and height (z) dimensions. For example, Saba et al. (US Patent Publication US2015/0035198) discusses a system for controlling filament extrusion with printheads capable of moving radially. Saba's system consists of four radially-oriented tracks with one or two printheads capable of moving along each of the radially-oriented tracks. However, only one of the printheads shown in Saba is able to reach the origin of the rotatable printbed. Moreover, according to Saba's design, the rotatable printbed is positioned at a fixed height and each of the radially-oriented tracks is moved up and down by an actuating mechanism. This limits the types of 3D objects capable of being printed by the Saba system and likely results in longer print times. In addition, the Saba system does not address how to properly align or calibrate the multiple printheads and how to address technical issues stemming from a vertically translatable rotating printbed. Furthermore, Saba's printheads also appear to be driven radially by a plurality of horizontal drive screws, which results in a bulkier and heavier 3D printer overall.

SUMMARY

Disclosed are improved 3D printers and methods of operation thereof. In one embodiment, a cylindrical coordinate 3D printer can comprise a rotatable printbed support assembly and a vertically translatable base plate configured to support the printbed support assembly. A printbed can be removably or detachably coupled to the printbed support assembly. The printbed can be rotated in response to a rotation of the printbed support assembly.

The 3D printer can further comprise a first rail segment and a second rail segment positioned above the printbed support assembly. The first rail segment can be aligned radially with the printbed support assembly. The second rail segment can be oriented perpendicular to the first rail segment and also aligned radially with the printbed support assembly.

The 3D printer can further comprise a first gantry carrier configured to carry or support a first printhead and a second gantry carrier configured to carry or support a second printhead. For example, the first printhead can be mounted to the first gantry carrier and the second printhead can be mounted to the second gantry carrier via screws, nuts, bolts, or other fasteners. The first gantry carrier can be moveable along at least part of the first rail segment. The second gantry carrier can be moveable along at least part of the second rail segment. In some embodiments, the first gantry carrier and the second gantry carrier can be moved simultaneously via belt drives.

The 3D printer can further comprise a third rail segment positioned above the printbed support assembly. The third rail segment can be oriented perpendicular to the second rail segment and collinear with the first rail segment. A third gantry carrier can be configured to carry or support a third printhead. The third gantry carrier can be moveable along at least part of the third rail segment.

The 3D printer can further comprise a fourth rail segment positioned above the printbed support assembly. The fourth rail segment can be oriented perpendicular to the third rail segment and collinear with the second rail segment. A fourth gantry carrier can be configured to carry or support a fourth printhead. The fourth gantry carrier can be moveable along at least part of the fourth rail segment. In some embodiments, the first gantry carrier, the second gantry carrier, the third gantry carrier, and the fourth gantry carrier can all be moved simultaneously via belt drives.

The first rail segment and the third rail segment can be part of a continuous rail coupled to an underside of a first rail frame support. The second rail segment and the fourth rail segment can be coupled to the underside of a second rail frame support.

The first frame support can comprise a cutout defined along the first rail frame support. The second rail frame support can extend or pass through the cutout. The second rail frame support can be oriented perpendicular to the first rail frame support.

The printbed support assembly can comprise a center point. At least one of the first printhead, the second printhead, the third printhead, and the fourth printhead can be configured to print to the center point. For example, at least one of the first nozzle of the first printhead, the second nozzle of the second printhead, the third nozzle of the third printhead, and the fourth nozzle of the fourth printhead can reach and print to the center point. In other embodiments, all four printheads can print to the center point. In some embodiments, the center point can be a calculated center point or a center point determined by the software or firmware running on the 3D printer. For example, a point on the printbed support assembly or printbed can be considered the "center point" when a point is substantially near a center of the printbed support assembly or printbed but not the actual center of printbed support assembly or printbed.

Each of the gantry carriers can comprise a carrier body made of a metallic alloy having a Young's modulus of at least 68 gigapascals (GPa). Each of the gantry carriers can comprise a plurality of micro-adjustment screws configured to adjust at least one of a vertical height of the first printhead and a lateral positioning of the first printhead.

Each of the gantry carriers can further comprise a direct drive extruder motor and a direct drive extruder coupled to the carrier body of the gantry carrier. The printheads coupled to the gantry carrier can be configured to receive a filament from the direct drive extruder. The filament can have a filament diameter of about 1.75 mm.

In other embodiments, the printheads can be Bowden-type printheads. In these embodiments, the 3D printer can comprise Bowden-type extruders coupled to part of a structural frame of the 3D printer.

In one embodiment, a plurality of filament spools can be positioned vertically above the rail segments. The filament spools can be left exposed to allow detachment and replacement of the filament spools.

In some embodiments, the base plate can be vertically translatable via a first rotatable lead screw and a second rotatable lead screw coupled to and extending through the base plate. The first rotatable lead screw and the second rotatable lead screw can be positioned on opposite sides of the base plate.

A first lead screw pulley can be coupled to the first rotatable lead screw and a second lead screw pulley can be coupled to the second rotatable lead screw. A lead screw motor can be configured to rotate a lead screw drive pulley coupled to the lead screw motor. In addition, a lead screw belt can be looped around at least the first rotatable lead screw pulley, the second rotatable lead screw pulley, and the lead screw drive pulley. Both the lead screw belt and the rotation of the first and second rotatable lead screws can be driven by the rotation of the lead screw drive pulley.

The 3D printer can further comprise at least four stabilizing rods extending through the base plate. Each of the at least four stabilizing rods can be positioned at a corner of the base plate. The stabilizing rods can be configured to stabilize and level the base plate.

In some embodiments, the printbed support assembly can comprise an upper support plate, a lower support plate positioned below the upper support plate and coupled to the upper support plate, a toothed gear plate positioned below the lower support plate and coupled to the lower support plate, an upper bearing plate coupled to an underside of the lower support plate, and a lower bearing plate coupled to the base plate. The upper bearing plate can be configured to swivel or rotate with respect to the lower bearing plate via bearings disposed in between the upper bearing plate and the lower bearing plate.

The 3D printer can also comprise a printbed motor disposed on the base plate and configured to rotate a printbed drive pulley. A printbed timing belt can be looped around the toothed gear plate and the printbed drive pulley. The printbed timing belt and the rotation of the toothed gear plate can be driven by the rotation of the printbed drive pulley. The lower support plate and the upper support plate can be configured to rotate in response to a rotation of the toothed gear plate.

The upper support plate can be coupled to the lower support plate by a plurality of height-adjustable spacers configured to lengthen or shorten to level the upper support plate. The upper support plate can also be heated by a heating pad coupled to an underside of the upper support plate. The heating pad can be electrically coupled to a power supply of the 3D printer via a slip ring assembly such that electrical wires connecting the heating pad to the power supply remain untangled when the printbed support assembly is rotated.

The upper support plate can comprise a plurality of cavities defined along a surface of the upper support plate. In some embodiments, the upper support plate can comprise a first cavitied portion having a first cavity pattern and a second cavitied portion having a second cavity pattern. The second cavitied portion can be positioned radially inward of the first cavitied portion. The first cavity pattern can be different from the second cavity pattern.

The upper support plate can comprise a central portion having a first alignment cavity defined within the central portion. The upper support plate can also comprise a second alignment cavity positioned radially outward of the first alignment cavity.

Each of the first alignment cavity and the second alignment cavity can comprise a converging portion having at least two cavity sides converging toward a vertex. The first alignment cavity can be in the shape of an isotoxal star polygon having a plurality of vertices.

For example, the first alignment cavity can be in the shape of a four-point star. The second alignment cavity can be in the shape of an arrowhead or triangle.

The printbed support assembly can comprise a center point. The center point can serve as an origin for the cylindrical coordinate system of the 3D printer.

The 3D printer can further comprise a control unit comprising one or more processors and one or more memory units. The one or more processors can be programmed to execute instructions stored in the one or more memory units to undertake an alignment procedure. The alignment procedure can comprise calculating a first alignment vertex based in part on recorded points of contact made by an electrically conductive nozzle of a printhead with the two electrically conductive cavity sides of the first alignment cavity. The alignment procedure can further comprise calculating a second alignment vertex based in part on recorded points of contact made by the electrically conductive nozzle with the two cavity sides of the second alignment cavity. The alignment procedure can further comprise calculating a line intersecting the first alignment vertex and the second alignment vertex representing a calculated travel path of the nozzle. The alignment procedure can also comprise determining an alignment of the nozzle based on whether the line intersects the center point. The alignment procedure can be repeated for each of the four printheads. The alignment procedure can be undertaken to ensure that the nozzles of the four printheads are aligned and that the nozzles agree on the same origin.

In another embodiment, a method of 3D printing can comprise moving a first gantry carrier in a radial direction along a first rail segment. The method can also comprise moving a second gantry carrier in a radial direction along a second rail segment. The second rail segment can be perpendicular to the first rail segment.

The method can further comprise vertically translating a base plate supporting a printbed support assembly. Vertically translating the base plate can further comprise vertically translating the base plate by simultaneously rotating a first lead screw and a second lead screw coupled to and extending through the base plate. The first rotatable lead screw and the second rotatable lead screw can be positioned on opposite sides of the base plate.

The method can also comprise rotating the printbed support assembly using a printbed motor coupled to the base plate. Rotating the printbed support assembly can further comprise rotating a printbed drive pulley using the printbed motor. The printbed drive pulley can be linked to the toothed gear plate via a printbed timing belt. The printbed timing belt and the rotation of the toothed gear plate can be driven by the rotation of the printbed drive pulley. The lower support plate and the upper support plate can be configured to rotate in response to a rotation of the toothed gear plate.

The method can further comprise moving a third gantry carrier in a radial direction along a third rail segment. The third rail segment can be perpendicular to the second rail segment. The method can also comprise moving a fourth gantry carrier in a radial direction along a fourth rail segment. The fourth rail segment can be perpendicular to the third rail segment. In some embodiments, the first gantry carrier, the second gantry carrier, the third gantry carrier, and the fourth gantry carrier can be configured to be moved simultaneously.

The method can also comprise depositing a heated filament at a center point of a printbed attached to the printbed support assembly using a nozzle of a printhead (e.g., the first printhead) mounted to a gantry carrier. The method can further comprise depositing another instance of the heated filament at the center point of the printbed using a nozzle of another printhead (e.g., the second printhead) mounted to another gantry carrier. The heated filament can be extruded from a direct drive extruder mounted to the gantry carrier.

The method can further comprise heating the upper support plate using a heating pad coupled to an underside of the upper support plate. The heating pad can be electrically coupled to a power supply via a slip ring assembly such that electrical wires connecting the heating pad to the power supply remain untangled when the printbed support assembly is rotated.

A support plate for supporting a printbed of a 3D printer is also disclosed. The support plate can comprise a central portion, a first cavitied portion having a first cavity pattern, and a second cavitied portion having a second cavity pattern. The first cavitied portion can surround the central portion. The second cavitied portion can be positioned radially inward of the first cavitied portion. The first cavity pattern can be different from the second cavity pattern.

In some embodiments, the cavities of the first cavitied portion and the second cavitied portion do not extend through a depth of the support plate.

The first cavity pattern can comprise a plurality of circular trapezoids arranged in an annular pattern. The second cavity pattern can comprise a plurality of triangles pointing toward the central portion.

The support plate can be made in part of an aluminum alloy. The support plate can be made in part of an electrically conductive material.

The support plate can also comprise non-cavitied regions positioned in between cavities of the first cavitied portion and cavities of the second cavitied portion. The support plate can further comprise magnets adhered or otherwise coupled to the non-cavitied regions.

The central portion can comprise a first alignment cavity defined within the central portion. The first alignment cavity can be in the shape of an isotoxal star polygon having a plurality of vertices. The support plate can further comprise a second alignment cavity positioned radially outward of the first alignment cavity. The second alignment cavity can be in the shape of an arrowhead or triangle.

The first alignment cavity can comprise a converging portion having two cavity sides converging toward a first alignment vertex. The second alignment cavity can also comprise a converging portion having two cavity sides converging toward a second alignment vertex. In some embodiments, the first alignment vertex can be radially aligned with the second alignment vertex.

In yet another embodiment, a 3D printer is disclosed comprising a printbed configured to rotate about a rotational axis extending through a rotational origin of the printbed. The 3D printer can further comprise a first rail and a second rail positioned above the printbed.

A length of the first rail can be substantially equivalent to or exceed a diameter of the printbed. A length of the second rail can be less than the length of the first rail. In some embodiments, a length of the second rail can be substantially equivalent to or slightly less than a radius of the printbed.

The first rail can intersect the rotational axis and cross over the rotational origin. The first rail can be continuous from one terminal end of the first rail to the other terminal end (i.e., there are no breaks or discontinuities along the entire length of the first rail). The second rail can be aligned radially with the printbed and oriented substantially perpendicular or at an angle to the first rail.

A first gantry carrier can be moveable along the length of the first rail such that a travel path of the first gantry carrier crosses over the rotational axis or the rotational origin. The first gantry carrier can also be configured to hold or carry a first printhead. A second gantry carrier can be moveable along the length of the second rail. The travel path of the second gantry carrier ends prior to reaching the rotational axis or rotational origin. The second gantry carrier can be configured to hold or carry a second printhead. In some embodiments, the first gantry carrier and the second gantry carrier can be configured to be moved simultaneously while in operation.

The 3D printer can also comprise a third gantry carrier configured to hold or carry a third printhead. The third gantry carrier can be moveable along a segment of the first rail. The third gantry carrier and at least one of the first gantry carrier and the second gantry carrier can be configured to be moved simultaneously.

The 3D printer can further comprise a fourth gantry carrier. The fourth gantry carrier can be configured to hold or carry a fourth printhead. The fourth gantry carrier can be moveable along a length of a third rail. The third rail can be aligned radially with the printbed. The third rail can be oriented substantially perpendicular or at an angle with respect to the first rail and substantially collinear or diametrically aligned with the second rail. The third rail can end prior to reaching the rotational axis or rotational origin. As such, the travel path of the fourth gantry carrier can be prohibited from reaching the rotational axis or rotational origin.

The 3D printer can further comprise a plurality of timing belts or drive belts including at least a first timing belt, a second timing belt, a third timing belt, and a fourth timing belt. The first timing belt can be driven by a first motorized pulley. The first gantry carrier can be coupled to a segment of the first timing belt such that movement of the first gantry carrier is driven by the movement of the first timing belt.

The second timing belt can be driven by a second motorized pulley. The second gantry carrier can be coupled to a segment of the second timing belt such that movement of the second gantry carrier is driven by the movement of the second timing belt.

The second timing belt can be arranged substantially perpendicular or at an angle with respect to the first timing belt and extend through a belt loop void defined by the first timing belt. Both the first timing belt and the second timing belt can be operable when the second timing belt is extended or crisscross through the belt loop void defined by the first timing belt. In some embodiments, the belt loop void of the first timing belt can be enlarged by a plurality of idler pulleys or driven pulleys working in combination with the first motorized pulley. In other embodiments, the belt loop void of the first timing belt can be enlarged by pulleys having an enlarged diameter.

The 3D printer can further comprise a plurality of radially-oriented rail frame supports including at least a first rail frame support, a second rail frame support, a third rail frame support, and a fourth rail frame support. In some embodiments, the first rail frame support, the second rail frame support, the third rail frame support, and the fourth rail frame support can all be coupled to a central frame support. In certain embodiments, the central frame support can be positioned in line with the rotational axis of the printbed such that the rotational axis can extend axially through a length of the central frame support.

At least part of the first rail can be affixed to the first rail frame support and another part of the first rail can be affixed to the third rail frame support. The third rail frame support can be positioned substantially collinear or diametrically aligned with the first rail frame support. The second rail frame support and the fourth rail frame support can be positioned perpendicular or at an angle with respect to the first rail frame support and the third rail frame support. At least part of the second rail can be affixed to the second rail frame support and at least part of the third rail can be affixed to the fourth rail frame support.

In embodiments where the second timing belt extends or crisscrosses through a belt loop void defined by the first timing belt, the first timing belt can comprise an above-frame segment and a below-frame segment. The above-frame segment of the first timing belt can be positioned vertically above the first rail frame support and the below-frame segment can be positioned vertically below the first rail frame support. In these embodiments and other embodiments, the first gantry carrier can be coupled to the below-frame segment of the first timing belt.

In alternative embodiments, the second timing belt can be positioned above the first timing belt. The first timing belt can be driven, directly or indirectly, by a first motorized pulley. The first timing belt can, in turn, drive one or more additional pulleys. At least one of the driven pulleys can be secured to the third rail frame support. In this embodiment, the second rail frame support can extend through a belt loop void defined by the first timing belt. The first timing belt can be operable while looped around the second rail frame support. Moreover, the first gantry carrier can be coupled to a segment of the first timing belt.

In this embodiment, the first motorized pulley can be linked by an ancillary drive belt to a driven pulley of a dual pulley assembly coupled to the first rail frame support. The dual pulley assembly can comprise the driven pulley and an intermediary drive pulley coupled to the driven pulley. The first motorized pulley can drive the driven pulley via the ancillary drive belt. Rotation of the driven pulley can rotate the intermediary drive pulley which can, in turn, drive the first timing belt. The first timing belt can link the intermediary drive pulley to the pulley secured to the third radially-oriented rail frame support.

A plurality of extruder frame supports can be positioned vertically above the various printheads. In one embodiment, at least one extruder frame support can be positioned vertically above each of the rail frame supports (e.g., any of the first rail frame support, the second rail frame support, the third rail frame support, or the fourth rail frame support). In some embodiments, each of the extruder frame supports can be radially-oriented and be coupled to the central frame support at a radially innermost end and to an outer vertical frame support at a radially outermost end.

In these embodiments, at least one extruder (e.g., a Bowden-type extruder) can be coupled to each of the extruder frame supports. For example, a first extruder can be coupled to a first extruder frame support. An extruder tube can connect the first extruder to the first printhead positioned below the first extruder and the first extruder frame support. The extruder tube (e.g., a Bowden-type extruder tube) can be configured to allow the 3D printing filament to be fed through the extruder tube into a printhead.

In one embodiment, a segment of the extruder tube proximal to the first printhead can form an entry angle with respect to a longitudinal axis extending through the first printhead. The entry angle can be less than about 45 degrees. In other embodiments, the entry angle can be between about 30 degrees and 45 degrees. In further embodiments, the entry angle can be between about 20 degrees and 30 degrees. In even further embodiments, the entry angle can be between about 10 degrees and 20 degrees or less than 10 degrees.

As previously described, the cylindrical-coordinate 3D printer can comprise a rotatable printbed. The printbed can be configured to rotate in a clockwise rotational direction or a counterclockwise rotational direction. The printbed can be vertically translatable (e.g., up or down) via a ball screw mechanism driven by a ball screw motor.

In some embodiments, the printbed can be configured to be heated by a heating pad coupled to an underside of the printbed. The heating pad can be electrically coupled to a power supply via a slip ring assembly such that electrical wires connecting the heating pad to the power supply remain untangled when the printbed is rotated.

The printbed can also have a central printbed pulley coupled to an underside of the printbed. A motorized printbed pulley can be configured to drive a printbed timing belt linking the motorized printbed pulley to the central printbed pulley. Rotation of the printbed can be driven by the motorized printbed pulley via the printbed timing belt.

The cylindrical-coordinate 3D printer can also comprise a plurality of filament spools positioned vertically above a plurality of extruders. The filament spools can be exposed to allow detachment and replacement of the filament spools.

The cylindrical-coordinate 3D printer can further comprise a control unit having one or more processors, one or more memory units, and at least one communication module. The control unit can be configured to simultaneously control the operation of the printer's four gantry motors, four extruder motors, printbed motor, and ball screw motor. In addition, the control unit can also control the heating of the printbed.

In some embodiments, the one or more processors of the control unit can be programmed to execute instructions stored in the one or more memory units to control a movement of a first gantry carrier along the first rail relative to a movement of a third gantry carrier along the same first rail. For example, the one or more processors of the control unit can be programmed to execute instructions stored in the one or more memory units to disable the movement of the third gantry carrier when the first gantry carrier is moved past the rotational axis into a segment of the first rail currently occupied by the third gantry carrier. Alternatively, the one or more processors of the control unit can also be programmed to execute instructions stored in the one or more memory units to limit the movement of the third gantry carrier when the first gantry carrier is moved past the rotational axis into a segment of the first rail currently occupied by the third gantry carrier. In further embodiments, the one or more processors of the control unit can be programmed to execute instructions stored in the one or more memory units to prohibit the movement of the first gantry carrier into a segment of the first rail currently occupied by the third gantry carrier when the third printhead carried by the third gantry carrier is in operation.

A method of three-dimensional (3D) printing is also disclosed. In one embodiment, the method can comprise rotating a printbed of a 3D printer. The printbed can be vertically translatable and can be defined by a rotational origin having a rotational axis extending therethrough. The method can also comprise moving or controlling a movement of a first gantry carrier in a first radial direction along a first rail. The first rail can intersect the rotational axis and cross over the rotational origin.

The method can further comprise moving the first gantry carrier past the rotational axis. A length of the first rail can be substantially equivalent to or exceed a diameter of the printbed. The method can also comprise moving a second gantry carrier in a second radial direction along a second rail. The second rail can be aligned radially with the printbed and oriented substantially perpendicular or at an angle with respect to the first rail. The travel path of the second gantry carrier can end or terminate prior to the second gantry carrier reaching the rotational axis.

The method can also comprise moving a third gantry carrier in a third radial direction along a portion of the first rail. The third radial direction can be substantially diametrically aligned or collinear with the first radial direction. The method can further comprise limiting a movement of the third gantry carrier based on a movement and positioning of the first gantry carrier.

The method can also comprise moving a fourth gantry carrier in a fourth radial direction along a third rail. The third rail can be oriented substantially perpendicular or at an angle with respect to the first rail and be substantially collinear with the second rail. The travel path of the fourth gantry carrier can end or terminate prior to the fourth gantry carrier reaching the rotational axis.

DETAILED DESCRIPTION

Figure 1A:
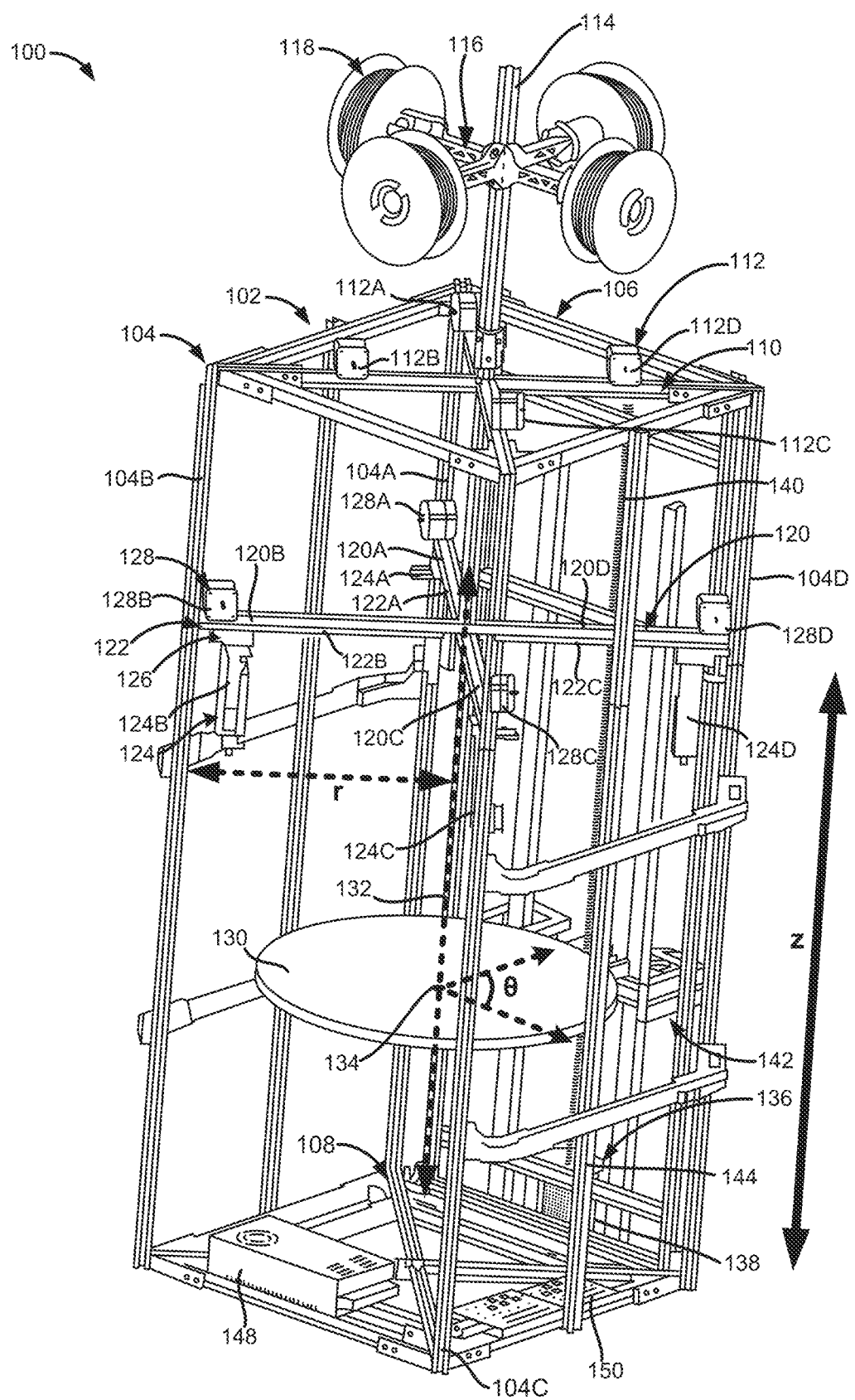
FIG. 1A illustrates a perspective view of an embodiment of a cylindrical-coordinate 3D printer.
Figure 1B:
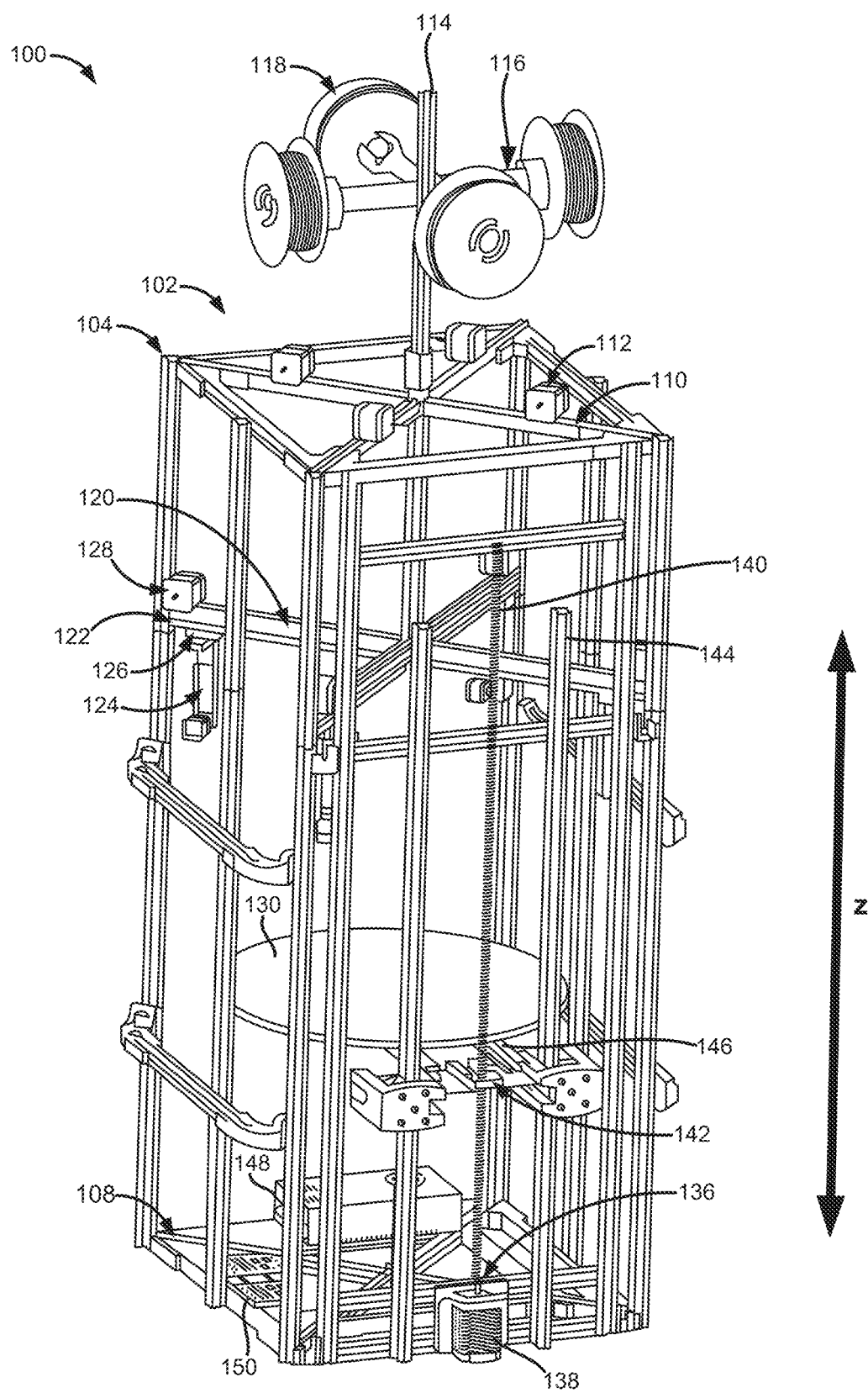
FIG. 1B illustrates another perspective view of a rear of the cylindrical-coordinate 3D printer.
Figure 1C:
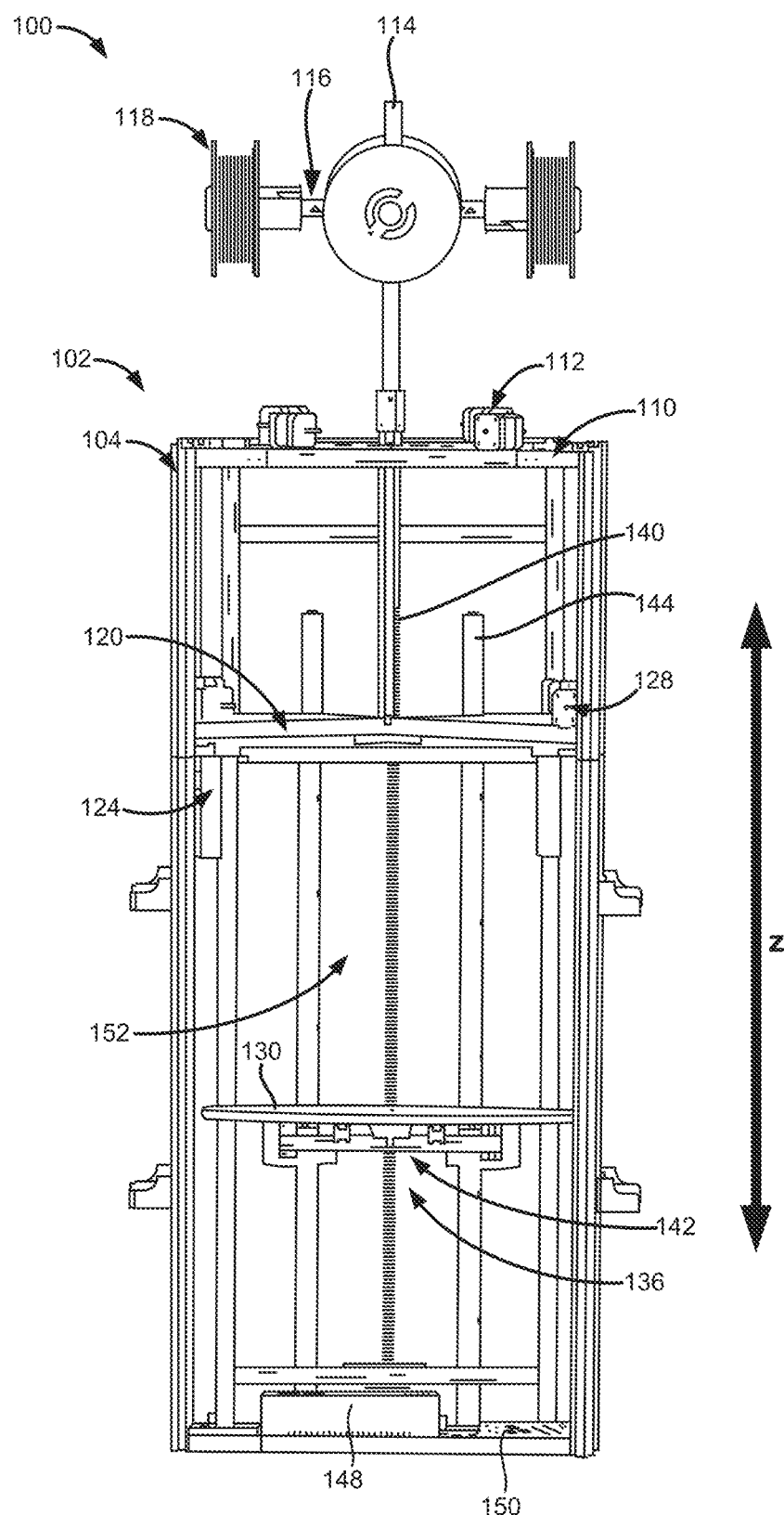
FIG. 1C illustrates a front view of the cylindrical-coordinate 3D printer.

FIG. 1A illustrates a perspective view of an embodiment of a cylindrical-coordinate 3D printer 100. The 3D printer 100 can comprise a structural frame 102 made in part of a plurality of frame supports coupled to one another. FIGS. 1A-1C illustrate the cylindrical-coordinate 3D printer 100 with an outer enclosure or housing removed or separated from the structural frame 102 for ease of viewing. In some embodiments, the outer enclosure or housing can be substantially cylindrical-shaped. In other embodiments, the outer enclosure or housing can be substantially shaped as an elongate polyhedron such as an elongate cuboid or rectangular prism, a pentagonal prism, a hexagonal prism, a heptagonal prism, or an octagonal prism.

In some embodiments, the structural frame 102 can comprise a plurality of vertical frame supports 104 including at least a first vertical frame support 104A, a second vertical frame support 104B, a third vertical frame support 104C, and a fourth vertical frame support 104D. The structural frame 102 can also comprise a number of additional vertical frame supports 104 interspersed in between the first vertical frame support 104A, the second vertical frame support 104B, the third vertical frame support 104C, and the fourth vertical frame support 104D.

The structural frame 102 can also comprise a plurality of horizontal frame supports 106 and a plurality of diagonal frame supports 108. The plurality of horizontal frame supports 106 and diagonal frame supports 108 can be fastened to the plurality of vertical frame supports 104 (e.g., by screws, nuts, bolts, adhesives, etc.) to form the structural frame 102.

Although FIGS. 1A-1C illustrate the structural frame 102 as shaped substantially as a cuboid or rectangular prism, it is contemplated by this disclosure that the plurality of vertical frame supports 104, horizontal frame supports 106, and diagonal frame supports 108 can be arranged so that the structural frame 102 is shaped substantially as a cylinder or an elongate polyhedron having more than four sides. For example, the structural frame 102 can be shaped substantially as an elongate pentagonal prism, hexagonal prism, heptagonal prism, or octagonal prism.

In certain embodiments, the structural frame 102 can have a height dimension between about 120 cm to about 130 cm and length and width dimensions (if the top-down profile of structural frame 102 is substantially a square) of between about 45.0 cm to about 55.0 cm each.

The structural frame 102 including any of the plurality of vertical frame supports 104, horizontal frame supports 106, diagonal frame supports 108, or a combination thereof can be made in part of a metallic material (e.g., aluminum, stainless steel, or a combination thereof), a polymeric material (such as a rigid plastic), or a combination thereof.

As shown in FIG. 1A, the 3D printer 100 can also comprise a plurality of extruder frame supports 110. The plurality of extruder frame supports 110 can be positioned in proximity to or near a top of the structural frame 102. In some embodiments, the plurality of extruder frame supports 110 can include four extruder frame supports 110 oriented substantially diagonally with respect to a top of the structural frame 102. As will be discussed in more detail in the following sections, when a printbed 130 of the 3D printer 100 is substantially circular, the plurality of extruder frame supports 110 can be oriented substantially radially or diametrically with respect to the printbed 130.

Each of the extruder frame supports 110 can be configured to support an extruder assembly 112 or part of the extruder assembly 112 (FIGS. 1A-1C only illustrate an extruder motor coupled to each of the extruder frame supports 110 but it should be understood by one of ordinary skill in the art that other components of the extruder assembly 112 including drive gears, mounts or brackets, tubing, etc. can also be coupled to the extruder frame supports 110). As will be discussed in more detail in the following sections, the extruder assembly 112 can be a Bowden-type extruder assembly where the extruder is separated from the Bowden-type printhead or hotend.

The 3D printer 100 can comprise at least four Bowden-type extruder assemblies 112 including a first extruder assembly 112A, a second extruder assembly 112B, a third extruder assembly 112C, and a fourth extruder assembly 112D. In the embodiments shown in FIGS. 1A-1C, each of the plurality of extruder frame supports 110 can be coupled to a central frame support 114 at a radially innermost end of the extruder frame supports 110 and at least one of the vertical frame supports 104 at a radially outermost end of the extruder frame supports 110.

The central frame support 114 can be a post or column extending vertically into at least part of the structural frame 102 of the 3D printer 100. In instances where the printbed 130 is a circular printbed 130, the central frame support 114 can be substantially aligned with a rotational axis 132 of the printbed 130.

FIGS. 1A-1C also illustrate that a plurality of spool shafts 116 can be secured or otherwise coupled to the central frame support 114 and can flare out from the central frame support 114 in a cross-pattern or X-pattern. Each of the plurality of spool shafts 116 can be configured to carry or hold at least one rotatable filament spool 118. In the embodiments shown in FIGS. 1A-1C, the 3D printer 100 comprises four spool shafts 116 with each spool shaft 116 configured to hold one rotatable filament spool 118. In other embodiments contemplated by this disclosure but not shown in the figures, each of the spool shafts 116 can be configured to carry or hold multiple filament spools 118.

Moreover, in an alternative embodiment, at least one spool shaft 116 can be secured or otherwise coupled to a segment of a vertical frame support 104 protruding above a top of the structural frame 102. In this embodiments, the filament spools 118 can be positioned at the corners of the structural frame 102.

In all such embodiments, the filament spools 118 can be positioned vertically above the extruder assemblies 112 and the extruder frame supports 110. In certain embodiments, each of the filament spools 118 can be a 1 kg (or 2.2 lbs.) spool comprising a thermoplastic filament wound around the spool. The filament spools 118 can have a spool diameter of between about 18-20 cm, a spool width of between about 5.0 to 7.0 cm, and spool hub diameter of between about 5.0 cm to about 6.0 cm. The length of the thermoplastic filament wound around the spool can be about 335 m. The thermoplastic filament can have a cross-sectional filament diameter of approximately 1.75 mm.

As shown in FIGS. 1A-1C, the filament spools 118 can be exposed to allow detachment and replacement of the filament spools 118. In addition, the filament spools 118 can be exposed to allow an operator to untangle any filament which has become tangled on the spools. A filament spool 118 can be detached from a spool shaft 116 when an operator pinches a terminal end of the spool shaft 116 and slides the filament spool 118 off of a pinched end of the spool shaft 116. Similarly, an operator can attach a filament spool 118 to a spool shaft 116 by pinching the terminal end of the spool shaft 116 and sliding a filament spool 118 onto a pinched end of the spool shaft 116.

The filament spools 118 can be spools of any type of thermoplastic appropriate for FDM or FFF printing. For example, any of the following types of thermoplastic filaments can be used with the cylindrical-coordinate 3D printer 100 disclosed herein: polylactic acid (PLA), nylon or polyamide (PA) including PA 6, PA 11, or PA 12, acrylonitrile butadiene styrene (ABS), polystyrene (PS), high-impact polystyrene (HIPS), polycarbonate (PC), thermoplastic polyurethane (TPU), polyethylene terephthalate glycol (PETG), polypropylene (PP), polyether ether ketone (PEEK), polyether imide (PEI), polyphenylene ether (PPE), and polyvinyl chloride (PVC). It should be understood by one of ordinary skill in the art that although the above filaments are mentioned, other types of thermoplastic filaments can also be compatible with the cylindrical-coordinate 3D printer 100.

The 3D printer 100 can also comprise a plurality of radially-oriented rail frame supports 120. As shown in FIGS. 1A and 1B, the 3D printer 100 can comprise at least a first rail frame support 120A, a second rail frame support 120B, a third rail frame support 120C, and a fourth rail frame support 120D. The first rail frame support 120A, the second rail frame support 120B, the third rail frame support 120C, and the fourth rail frame support 120D can all be coupled to the central frame support 114. For example, each of the rail frame supports 120 can be coupled to the central frame support 114 at a radially-innermost end of the rail frame support 120 and coupled to a vertical frame support 104 at a radially-outermost end of the rail frame support 120.

The first rail frame support 120A can be positioned substantially collinear or diametrically aligned with the third rail frame support 120C. The second rail frame support 120B and the fourth rail frame support 120D can be positioned perpendicular to or at an angle (an oblique or non-right angle, i.e., an acute angle or an obtuse angle) with respect to the first rail frame support 120A and the third rail frame support 120C. The second rail frame support 120B can be positioned substantially collinear or diametrically aligned with the fourth rail frame support 120D. Although not shown in FIGS. 1A-1C, the 3D printer 100 can also comprise two rail frame supports 120 that crisscross or three rail frame supports 120 including one long diagonal rail frame support and two shorter rail frame supports that intersect and couple to the long diagonal rail frame support.

The 3D printer 100 can also comprise a plurality of gantry rails 122. For example, the 3D printer 100 can comprise a first rail 122A, a second rail 122B, and a third rail 122C. At least part of the first rail 122A can be affixed to the first rail frame support 120A and another part of the same first rail 122A can be affixed to the third rail frame support 120C. In embodiments where the first rail frame support 120A and the third rail frame support 120C are part of one long diagonal rail frame support, the first rail 122A can be coupled to the long diagonal rail frame support.

In some embodiments, the first rail 122A can have a rail length of between about 600 mm to about 650 mm. In these and other embodiments, the second rail 122B and the third rail 122C can each have a rail length of between about 275 mm to about 325 mm (e.g., about 300 mm). In further embodiments, the first rail 122A can have a rail length between about 400 mm to about 600 mm or between about 600 mm to about 1.0 m. In these and other embodiments, the second rail 122B and the third rail 122C can each have a rail length of between about 175 mm to about 325 mm or about 300 mm to about 500 mm. The rail lengths can vary depending on the size of the structural frame 102 or the size of the printbed 130.

At least part of the second rail 122B can be affixed to the second rail frame support 120B and at least part of the third rail 122C can be affixed to the fourth rail frame support 120D. The second rail 122B can be positioned substantially collinear or diametrically aligned with the third rail 122C. The second rail 122B and the third rail 122C can be positioned substantially perpendicular to or at an angle (an oblique or non-right angle, i.e., an acute angle or an obtuse angle) with respect to the first rail 122A.

As will be discussed in more detail in the following sections, in some embodiments, the length of the first rail 122A can be substantially equivalent to or exceed a diameter of the circular printbed 130. A length of the second rail 122B can be less than the length of the first rail 122A. In some embodiments, a length of the second rail 122B can be substantially equivalent to or slightly less than a radius of the printbed 130. A length of the third rail 122C can be less than the length of the first rail 122A. In some embodiments, a length of the third rail 122C can be substantially equivalent to or slightly less than a radius of the printbed 130.

The first rail 122A can intersect the rotational axis 132 of the printbed 130 and cross over a rotational origin 134 of the printbed 130. The first rail 122A can be continuous from one terminal end of the first rail 122A to the other terminal end (i.e., there are no breaks or discontinuities along the entire length of the first rail). The second rail 122B and the third rail 122C can be aligned radially with the printbed 130.

The 3D printer 100 can further comprise a plurality of gantry carriers 124 configured to move radially inward and outward along the gantry rails 122. In some embodiments, the plurality of gantry carriers 124 can comprise a first gantry carrier 124A, a second gantry carrier 124B, a third gantry carrier 124C, and a fourth gantry carrier 124D.

Each of the gantry carriers 124 can be configured to hold a printhead or a hotend of the extruder assembly 112. The printheads or hotends will be discussed in more detail in the following sections.

The first gantry carrier 124A can be configured to move along the length of the first rail 122A such that a travel path of the first gantry carrier 124A crosses over the rotational axis 132 or the rotational origin 134 of the printbed 130 positioned below the first gantry carrier 124A. The second gantry carrier 124B can be moveable along the length of the second rail 122B. The travel path of the second gantry carrier 124B can end or terminate prior to reaching the rotational axis 132 or rotational origin 134 of the printbed 130 below the second gantry carrier 124B.

The third gantry carrier 124C can be moveable along a segment of the first rail 122A. The fourth gantry carrier 124D can be moveable along a length of the third rail 122C. In some embodiments, all four of the gantry carriers 124 can be configured to be moved simultaneously. In certain embodiments, three out of the four gantry carriers 124, such as the first gantry carrier 124A and any two of the second gantry carrier 124B, the third gantry carrier 124C, and the fourth gantry carrier 124D can be configured to be moved simultaneously. In further embodiments, two out of the four gantry carriers 124 such as the first gantry carrier 124A and any one of the second gantry carrier 124B, the third gantry carrier 124C, and the fourth gantry carrier 124D can be configured to be moved simultaneously.

The gantry carriers 124 can be coupled to the gantry rails 122 via slidable carriages 126. For example, each of the gantry carriers 124 can be coupled to its own slidable carriage 126. In some embodiments, the slidable carriages 126 can slide along the gantry rails 122 on metallic ball bearings positioned in between the gantry rails 122 and the slidable carriages 126.

Movement of the gantry carriers 124 can be controlled by gantry motors 128 coupled to a plurality of belt drives 300 (see, for example, FIGS. 3A-3C or FIG. 4). The belt drives 300 including the numerous pulleys operably coupled to the belt drives 300 are not shown in FIGS. 1A-1C to avoid over complicating the figures. Portions of such belt drives 300 are shown in FIGS. 3A-3C, FIG. 4, FIGS. 5A-5C, FIGS. 6A-6B, and FIG. 9.

As shown in FIGS. 1A-1C, the gantry motors 128 can comprise at least a first gantry motor 128A, a second gantry motor 128B, a third gantry motor 128C, and a fourth gantry motor 128D. The first gantry motor 128A can be positioned vertically above the first rail 122A and above the moveable first gantry carrier 124A. In one embodiment, the first gantry motor 128A can be coupled to a top of the first rail frame support 120A and part of the first vertical frame support 104A.

The second gantry motor 128B can be positioned vertically above the second rail 122B and above the moveable second gantry carrier 124B. In one embodiment, the second gantry motor 128A can be coupled to a top of the second rail frame support 120B and part of the second vertical frame support 104B.

The third gantry motor 128C can be positioned vertically above the first rail 122A and above the moveable third gantry carrier 124C. In one embodiment, the third gantry motor 128C can be coupled to a top of the third rail frame support 120C and part of the third vertical frame support 104C.

The fourth gantry motor 128D can be positioned vertically above the fourth rail 122D and above the moveable fourth gantry carrier 124D. In one embodiment, the fourth gantry motor 128D can be coupled to a top of the fourth rail frame support 120D and part of the fourth vertical frame support 104D.

The gantry motors 128 and the belt drives 300 (including the various pulleys and timing belts, see, for example, FIGS. 3A-3C or FIG. 4) work together to control the incremental or stepped movement of the gantry carriers 124 along the gantry rails 122. Furthermore, the gantry motors 128 and the belt drives 300 work together to control the incremental or stepped movement of the gantry carriers 124 in a radial direction (shown in FIG. 1A as "r") with respect to the printbed 130. The gantry motors 128 and the belt drives 300 will be discussed in more detail in the following sections.

FIGS. 1A-1C illustrate that the gantry carriers 124 can be positioned vertically above a rotatable printbed 130. The printbed 130 can be configured to rotate in a clockwise rotational direction or a counterclockwise rotational direction. The printbed 130 can be configured to rotate about a rotational axis 132 extending through a rotational origin 134 or center point of the printbed 130. Angular rotation of the printbed 130 about its rotational axis 132 is shown using the symbol "θ" in FIG. 1A. As will be discussed in more detail in the following sections, rotation of the printbed 130 is controlled by a pulley mechanism positioned, at least partially, beneath the printbed 130. In some embodiments, the printbed 130 can also be heated via a heating mechanism.

The printbed 130 can be vertically translatable (e.g., up or down), that is, translatable in a z-direction, via a ball screw mechanism 136 driven by a ball screw motor 138. The ball screw mechanism 136 can comprise an elongate threaded screw 140 configured to rotate via the ball screw motor 138.

FIG. 1B illustrates that the printbed 130 can be actuated in the z-direction (vertically upward or downward) using a mechanical linear actuator that translates rotational motion to linear motion with minimal friction. In the embodiments shown in FIGS. 1A-1C, the mechanical linear actuator can be a ball screw mechanism 136 comprising a rotatable threaded screw 140 acting as a pitched helical track for ball bearings (not shown) within a ball nut assembly threaded onto the threaded screw 140. Controlled rotation of the threaded screw 140 raises or lowers the ball nut assembly. A load, such as a platform or platen, can be coupled to the ball nut assembly, which normally comprises a flanged portion for coupling to the platform or platen.

As shown in FIGS. 1B and 1C, a printbed supporting platform 142 can be coupled to the ball nut assembly such that the entire printbed supporting platform 142 can be raised or lowered in response to a rotation of the threaded screw 140.

The printbed supporting platform 142 can also be stabilized by one or more lateral rails 144 (two such rails 144 are shown in FIGS. 1A-1C). In the example embodiments shown in FIGS. 1A-1C, the printbed supporting platform 142 can further comprise a plurality of supporting arms 146 for supporting the rotatable printbed 130. As will be discussed in more detail in the following sections, the plurality of supporting arms 146 can support a rotatable load-bearing swivel ring 710 (see FIG. 7) for attaching directly to the underside of the printbed 130. Rotation of the printbed 130 can then be controlled by a pulley mechanism 700 (see FIG. 7) coupled to the underside of the printbed 130 and supported by the printbed supporting platform 142. As will be discussed in more detail in the following sections, the pulley mechanism 700 can be driven by a printbed motor 708 coupled to the printbed supporting platform 142.

The threaded screw 140 shown in FIGS. 1A-1C can have a length dimension between about 500 mm to about 800 mm. In other embodiments, the length of the threaded screw 140 can be less than 500 mm or greater than 800 mm depending on the overall dimensions of the 3D printer 100. The threaded screw 140 can be made in part of stainless steel.

The threaded screw 140 can be coupled to a ball screw motor 138 via a shaft coupler. In some embodiments, the ball screw motor 138 can be a step or stepper motor. As a more specific example, the ball screw motor 138 can be a National Electrical Manufacturers Association (NEMA) size 23 (or NEMA 23) bipolar stepper motor having a step angle of approximately 1.8 degrees or approximately 200 steps per revolution.

In other embodiments not shown in the figures but contemplated by the disclosure, the ball screw motor 138 can be a servo motor or other types of motors requiring an encoder. In further embodiments, the printbed 130 can be actuated in the z-direction using a threadless ball screw mechanism, pneumatic actuators, or hydraulic lifting mechanisms.

FIGS. 1A-1C also illustrate that the 3D printer 100 can further comprise a power supply 148 and a control unit 150. The power supply 148 can be configured to supply power to the control unit 150 and the various motors and electronic components disclosed herein. In some embodiments, the power supply 148 can be a switching or switched-mode power supply comprising a switching regulator for converting 110V/220V AC (mains) power to 12V DC for powering the various motors and electronic components. In some embodiments, the power supply 148 can be a 400W switch-mode power supply. In these and other embodiments, the power supply 148 can also comprise a portable power supply such as one or more batteries.

The cylindrical-coordinate 3D printer can further comprise a control unit 150 having one or more processors, one or more memory units, and at least one wireless communication module for receiving commands and executable instructions from another device via a wireless communication protocol (e.g., WiFi, Bluetooth™, BLE, ZigBee, etc.). The control unit 150 can be configured to simultaneously control the operation of the printer's four gantry motors 128, four extruder motors (shown as part of the extruder assemblies 112), ball screw motor 138, and printbed motor 708. In addition, the control unit 150 can also control the heating of the printbed 130.

In some embodiments, the control unit 150 can be a Duet 2™ 3D printer controller board (provided by Duet3D Ltd.) modified with a Duex 5™ expansion board. In these embodiments, the one or more processors can be 32-bit microprocessors. The wireless communication module can be an onboard WiFi chip supporting a number of WiFi communication protocols including the IEEE 802.11b protocol, the IEEE 802.11g protocol, the IEEE 802.11n protocol, or a combination thereof.

The memory units can comprise read-only memory (ROM), on-chip static random-access memory (SRAM), flash memory, or a combination thereof. Firmware instructions can be stored on one or more of the memory units to operate the one or more processors and the other electronic components of the 3D printer 100. In some embodiments, the firmware instructions can be written in the C programming language, the C++ programming language, or a combination thereof.

In some embodiments, the control unit 150 can comprise built-in stepper motor controllers and drivers. For example, the control unit 150 can comprise one or more built-in TMC2660 stepper drivers provided by Trinamic Motion Control GmbH & Co.

The control unit 150 can control the movement of the gantry carriers 124 in the radial direction (r), the upward and downward movement of the printbed 130 in the z-direction, and the angular rotation (θ) of the printbed. In this manner, the 3D printer 100 can print 3D objects on its printbed 130 by relying on a cylindrical-coordinate system (r, z, and θ) rather than a traditional 3-axis Cartesian-coordinate system.

FIG. 1C illustrates a front view of the cylindrical-coordinate 3D printer 100. As shown in FIG. 1C, an open cavity 152 is defined in between the gantry rails 122 and the moveable printbed 130. The size of the open cavity 152 can depend on the size of the structural frame 102 including the lengths of the vertical frame supports 104, the horizontal frame supports 106, the diagonal frame supports 108, and the diameter of the circular printbed 130.

In some embodiments, the printbed 130 can have a diameter between about 300 mm to about 500 mm. More specifically, the printbed 130 can have a diameter between about 400 mm to about 460 mm. In alternative embodiments, the printbed 130 can have a diameter between about 500 nm to about 700 nm. The diameter of the printbed 130 can be adjusted based on the size of the structural frame 102 of the 3D printer 100.

In some embodiments, the open cavity 152 can accommodate a 3D object having a diameter of up to 40 cm (about 16 inches) and a height of up to 60 cm (about 24 inches). For example, the 3D printer 100 can print a 3D object having a maximum volume of up to 75,000 cm$^3$.

It should be noted that for ease of viewing, certain wires, tubing, securement ties, and fasteners have been removed from the illustrations shown in certain figures. For example, all electrical wiring connecting the control unit 150 or the power supply 148 to the various electronic components have been removed for ease of viewing. Moreover, certain belts and belt drive components including pulleys have been removed from FIGS. 1A-1D to avoid overcomplicating the illustrations.

Figure 1D:
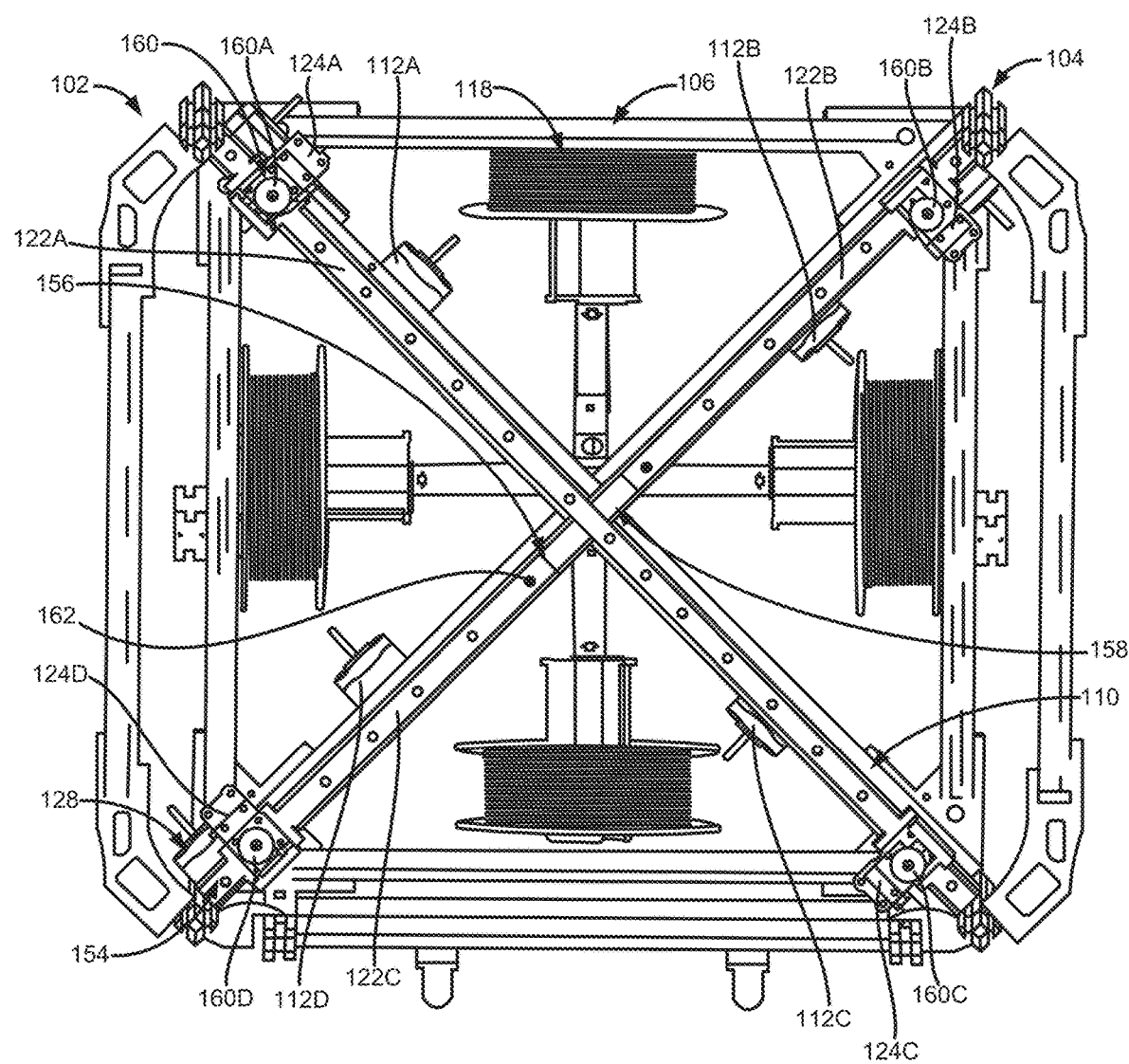
FIG. 1D illustrates a bottom-up view of the cylindrical-coordinate 3D printer when viewed from a printbed of the cylindrical-coordinate 3D printer.

FIG. 1D illustrates a bottom-up view of the cylindrical-coordinate 3D printer 100 when viewed from a top of the printbed 130 of the 3D printer 100. As shown in FIG. 1D, the 3D printer 100 can comprise a plurality of gantry rails 122. The gantry rails 122 can be affixed to a bottom or underside of the rail frame supports 120.

As previously discussed, the gantry rails 122 can comprise a first rail 122A, a second rail 122B, and a third rail 122C. At least part of the first rail 122A can be affixed to the first rail frame support 120A and another part of the same first rail 122A can be affixed to the third rail frame support 120C. At least part of the second rail 122B can be affixed to the second rail frame support 120B and at least part of the third rail 122C can be affixed to the fourth rail frame support 120D. The second rail 122B can be positioned substantially collinear or diametrically aligned with the third rail 122C. The second rail 122B and the third rail 122C can be positioned substantially perpendicular to or at an angle (an oblique or non-right angle, i.e., an acute angle or an obtuse angle) with respect to the first rail 122A.

The length of the first rail 122A can be substantially equivalent to or exceed a diameter of the circular printbed 130. A length of the second rail 122B can be less than the length of the first rail 122A. In some embodiments, a length of the second rail 122B can be substantially equivalent to or slightly less than a radius of the printbed 130.

The first rail 122A can intersect the rotational axis 132 of the printbed 130 and cross over a rotational origin 134 of the printbed 130. The first rail 122A can be continuous from one terminal end of the first rail 122A to the other terminal end (i.e., there are no breaks or discontinuities along the entire length of the first rail).

In the embodiment shown in FIG. 1D, the second rail 122B and the third rail 122C do not reach the rotational origin 134 of the printbed 130 (i.e., the center of the 3D printer 100) and do not intersect the rotational axis 132 of the printbed 130. For example, the second rail 122B and the third rail 122C can each have a radially outermost end 154 and a radially innermost end 156. The radially innermost ends 156 of the second rail 122B and the third rail 122C can terminate or cease prior to reaching the rotational axis 132 or the rotational origin 134 of the printbed 130.

As shown in FIG. 1D, a gap 158 can be created by the radially innermost ends 156 of the second rail 122B and the third rail 122C. The gap 158 can be sized to allow a slidable carriage 126 (see FIGS. 1A and 1B) or a top portion of a gantry carrier 124 carrying a printhead 160 to pass through the gap 158. For example, the gap 158 can be sized to allow a slidable carriage 126 and at least part of a top portion of the first gantry carrier 124A carrying a first printhead 160A to pass through the gap 158. In some embodiments, the gap 158 can have a gap length of between about 5.0 cm and 15.0 cm. In other embodiments, the gap 158 can be between about 3.0 cm to about 5.0 cm and between about 15.0 cm and 30.0 cm.

The plurality of gantry carriers 124 can comprise a first gantry carrier 124A, a second gantry carrier 124B, a third gantry carrier 124C, and a fourth gantry carrier 124D. The first gantry carrier 124A can carry or securely hold a first printhead 160A, the second gantry carrier 124B can carry or securely hold a second printhead 160B, the third gantry carrier 124C can carry or securely hold a third printhead 160C, and the fourth gantry carrier 124D can carry or securely hold a fourth printhead 160D.

The printheads 160 can be Bowden-type hotends comprising at least a heater, a thermistor, a fan, and a nozzle for depositing the heated filament on to the printbed 130. The printheads 160 will be discussed in more detail in the following sections. For purposes of this disclosure, any discussion concerning movement of the printheads 160 can also refer to or apply to movement of the gantry carriers 124 carrying or holding the printheads 160.

FIG. 1D illustrates that the first printhead 160A can be configured to move along a length of the first rail 122A such that a travel path of the first printhead 160A crosses over the rotational axis 132 or the rotational origin 134 of the printbed 130. In some embodiments, the first printhead 160A can be configured to move past the rotational axis 132 or rotational origin 134 and near or in proximity to the third printhead 160C. In other embodiments, the first printhead 160A can be configured to move past the rotational axis 132 or rotational origin 134 but the travel path of the first printhead 160A can cease or terminate prior to getting close to the third printhead 160C. In all such embodiments, the first printhead 160A can move radially back and forth across the rotational axis 132 or rotational origin 134 (i.e., the midpoint of the circular printbed 130) when in operation.

It has been discovered by the applicant that allowing at least one of the printheads 160 (such as the first printhead 160A) the ability to move diagonally past the rotational axis 132 or rotational origin 134 (for example, allowing a printhead 160 to move past the rotational axis 132 or rotational origin 134 by at least about 5.0 cm, between about 5.0 cm to about 10.0 cm, or by at least 10.0 cm) greatly increases the efficiency of the cylindrical-coordinate 3D printer 100 and greatly decreases print times for most 3D printed objects compared to traditional Cartesian 3D printers and delta 3D printers. Such a design is different from other multi-printhead cylindrical-coordinate 3D printers disclosed previously which only allowed one printhead to reach the rotational origin but not go past the rotational origin. Moreover, it has been discovered by the applicant that allowing one printhead 160 (e.g., the first printhead 160A) to move freely past the rotational axis 132 or rotational origin 134 while also allowing at least one other printhead 160 (e.g., any of the second printhead 160B, the third printhead 160C, or the fourth printhead 160D) to move radially concurrently significantly increases efficiency and decreases print times. Furthermore, it has been discovered by the applicant that allowing at least one printhead 160 to move past the rotational origin 134 or rotational axis 132 allows the 3D printer to print 3D printed objects with more complicated geometries at a fraction of the time compared to other traditional Cartesian 3D printers or delta 3D printers.

FIG. 1D further illustrates that the second printhead 160B can be moveable or translatable radially along the length of the second rail 122B. In addition, the fourth printhead 160D can be moveable or translatable radially along the length of the third rail 122C. The travel path of the second printhead 160B can end prior to reaching the rotational axis 132 or rotational origin 134. In addition, the travel path of the fourth printhead 160D can end prior to reaching the rotational axis 132 or rotational origin 134.

The radially innermost ends 156 of the second rail 122B and the third rail 122C can also have endstops 162 coupled to the gantry rail 122 (as shown in FIG. 1D). The endstops 162 can also be coupled to a part of the structural frame 102 or frame support near the radially innermost ends 156. In some embodiments, the endstops 162 can be physical endstops such as silicone or rubber bumpers physically attached to the gantry rails 122. The endstops 162 can act as barrier or obstruction to stop the printheads 160, the gantry carriers 124 holding or carrying the printheads 160, or the slidable carriages 126 coupled to such gantry carriers 124 from going past the endstop 162.

In other embodiments, the endstops 162 can refer to sensors or mechanical devices coupled to the gantry rails 122 or coupled to locations in proximity to the gantry rails 122 to detect the positioning of the printheads 160 or gantry carriers 124. In certain embodiments, sensing endstops 162 can be positioned at the radially outermost ends 154 of the gantry rails 122 (including at the outermost ends of the first rail 122A). The endstops 162 can also allow the control unit 150 of the 3D printer to detect the positioning of the printheads 160 along the gantry rails 122.

FIG. 1D also illustrates that the third printhead 160C can be moveable along a segment of the first rail 122A. The first printhead 160A and the third printhead 160C can be configured to be moved and be in operation simultaneously. The one or more processors of the control unit 150 can be configured to execute instructions (e.g., firmware or other software) stored in the memory unit(s) to control the movement of the first printhead 160A relative to the positioning of the third printhead 160C. In other embodiments, the one or more processors of the control unit 150 can be configured to execute instructions (e.g., firmware or other software) stored in the memory unit(s) to control the movement of the third printhead 160C relative to the positioning of the first printhead 160A. This prevents the first printhead 160A from colliding with the third printhead 160C when both printheads 160 are in operation.

In certain embodiments, three out of the four printheads 160, such as the first printhead 160A and any two of the second printhead 160B, the third printhead 160C, and the fourth printhead 160D can be configured to be in operation simultaneously. In further embodiments, two out of the four printheads 160 such as the first printhead 160A and any one of the second printhead 160B, the third printhead 160C, and the fourth printhead 160D can be configured to be in operation simultaneously.

FIGS. 2A-2G illustrate example travel paths 200 of gantry carriers 124 of different embodiments of the cylindrical-coordinate 3D printer 100. The travel paths 200 are presented above a circular printbed 130 with the rotational origin 134 of the printbed 130 indicated in the figures. Although FIGS. 2A-2G show the travel paths 200 of gantry carriers 124, it should be understood by one of ordinary skill in the art that any references to the gantry carriers 124 can also refer or apply to the travel paths 200 of printheads 160 held or carried by the gantry carriers 124 and slidable carriages 126 coupled to the tops of such gantry carriers 124. It should also be understood by one of ordinary skill in the art that even though certain travel paths 200 (for example, the first travel path 200A and the third travel path 200C) appear offset with respect to one another or the rotational origin 134, such travel paths 200 are only offset for purposes of these figures for ease of viewing.

Figure 2A:
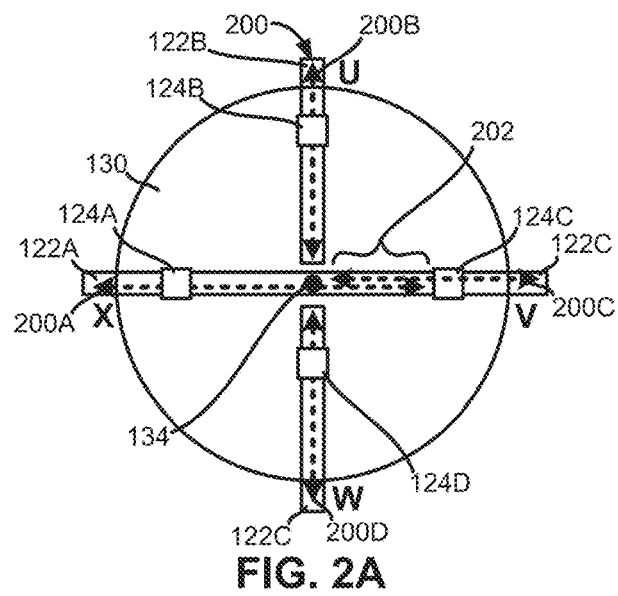
FIGS. 2A-2G illustrate example travel paths of gantry carriers of different embodiments of the cylindrical-coordinate 3D printer.
Figure 2B:
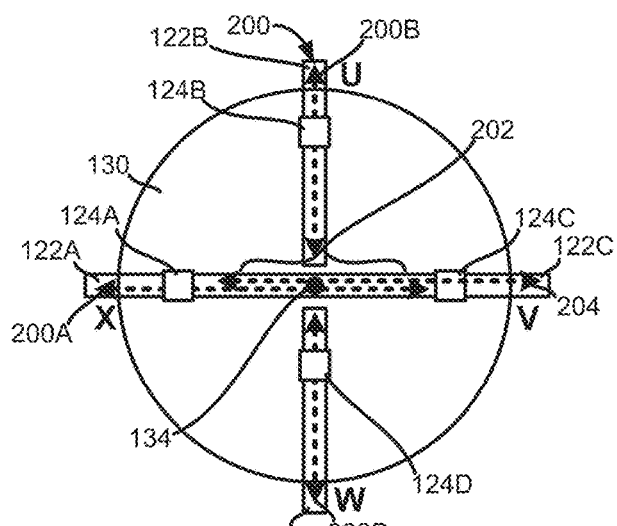
Figure 2C:
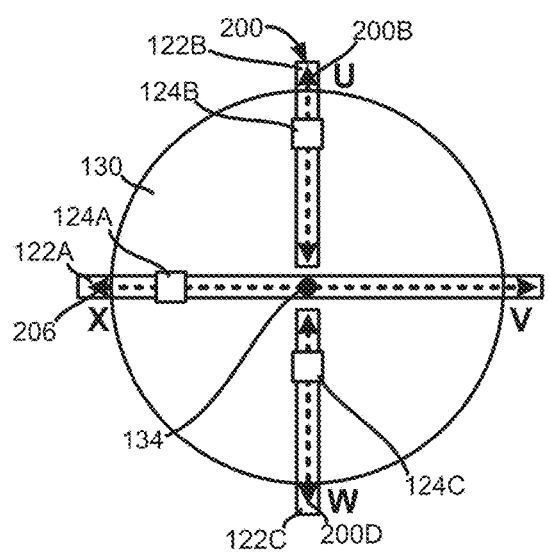

The gantry rails 122 in FIGS. 2A-2C are also labeled as X, U, V, and W. For purposes of this disclosure, the X-rail can refer to a segment of the first rail 122A extending from a radially-outermost end of the first rail 122A closest to the X-label and ending at the rotational origin 134. The U-rail can refer to the entire segment of the second rail 122B. The V-rail can refer to a segment of the first rail 122A extending from a radially-outermost end of the first rail 122A closest to the V-label and ending at the rotational origin 134. The W-rail can refer to the entire segment of the third rail 122C.

FIG. 2A illustrates an embodiment of the cylindrical-coordinate 3D printer 100 where a first travel path 200A of the first gantry carrier 124A encompasses substantially the entire X-rail and crosses over the rotational origin 134 of the printbed 130 into the V-rail. In this embodiment, a third travel path 200C of the third gantry carrier 124C extends along the entire V-rail and ends prior to reaching the rotational origin 134. As shown in FIG. 2A, the first travel path 200A and the third travel path 200C share a travel path overlap segment 202.

The length of the travel path overlap segment 202 can range from a few centimeters (about 2.0 cm to about 5.0 cm) or millimeters to half the length of the V-rail (e.g., about 150 mm) or more than half the length of the V-rail. The travel path overlap segment 202 can be adjusted by changing a positioning of certain driven pulleys or idler pulleys used to define a belt loop path for a belt loop drive used to power the first gantry carrier 124A.

In some embodiments, the first travel path 200A of the first gantry carrier 124A can cease or terminate prior to getting close to the opposite end of the first rail 122A or prior to getting close to the third gantry carrier 124C. For example, one or more processors of the control unit 150 can be programmed to execute instructions stored in the one or more memory units to control a movement of the first gantry carrier 124A along the first rail 122A based on a movement of the third gantry carrier 124C along the same first rail 122A. For example, the one or more processors of the control unit 150 can be programmed to execute instructions stored in the one or more memory units to disable the movement of the third gantry carrier 124C when the first gantry carrier 124A is moved past the rotational origin 134 into the travel path overlap segment 202. Alternatively, the one or more processors of the control unit can also be programmed to execute instructions stored in the one or more memory units to limit the movement of the third gantry carrier 124C (for example, to limit the movement of the third gantry carrier 124C to only a non-overlapping segment of the third travel path 200C) when the first gantry carrier 124A is moved past the rotational origin 134 into the travel path overlap segment 202. In further embodiments, the one or more processors of the control unit 150 can be programmed to execute instructions stored in the one or more memory units to prohibit the movement of the first gantry carrier 124A into either the travel path overlap segment 202 or any part of the V-rail when the third gantry carrier 124C is in motion or when the third printhead 160C carried or held by the third gantry carrier 124C is in operation.

FIG. 2B illustrates an embodiment of the cylindrical-coordinate 3D printer 100 where a first travel path 200A of the first gantry carrier 124A encompasses substantially the entire X-rail and crosses over the rotational origin 134 of the printbed 130 into the V-rail. In this embodiment, an alternative travel path 204 of the third gantry carrier 124C encompasses substantially the entire V-rail and crosses over the rotational origin 134 of the printbed 130 into the X-rail. As shown in FIG. 2B, the first travel path 200A and the third travel path 200C share a travel path overlap segment 202 that encompasses part of the first rail 122A spanning the rotational origin 134. In this embodiment, both the first gantry carrier 124A and the third gantry carrier 124C can cross over the rotational origin 134 and go back-and-forth between the X-rail and the V-rail.

In this embodiment, the length of the travel path overlap segment 202 can range from a few centimeters (about 2.0 cm to about 5.0 cm) or millimeters to half the length of the first rail 122A (e.g., about 300 mm) or more than half the length of the first rail 122A. The travel path overlap segment 202 can be adjusted by changing a positioning of certain driven pulleys or idler pulleys used to define belt loop paths for belt loop drives used to power the first gantry carrier 124A and the third gantry carrier 124C.

In some embodiments, the first travel path 200A of the first gantry carrier 124A can cease or terminate prior to getting close to a radially-outermost end of the V-rail. In these and other embodiments, the alternative travel path 204 of the third gantry carrier 124C can also cease or terminate prior to getting close to a radially-outermost end of the X-rail.

For example, one or more processors of the control unit 150 can be programmed to execute instructions stored in the one or more memory units to control a movement of the first gantry carrier 124A along the first rail 122A based on a movement of the third gantry carrier 124C along the same first rail 122A. For example, the one or more processors of the control unit 150 can be programmed to execute instructions stored in the one or more memory units to disable the movement of the third gantry carrier 124C when the first gantry carrier 124A is moved past the rotational origin 134 into the travel path overlap segment 202. The one or more processors of the control unit 150 can be programmed to execute instructions stored in the one or more memory units to control a movement of the third gantry carrier 124C along the first rail 122A based on a movement of the first gantry carrier 124A along the same first rail 122A. For example, the one or more processors of the control unit 150 can be programmed to execute instructions stored in the one or more memory units to disable the movement of the first gantry carrier 124A when the third gantry carrier 124C is moved past the rotational origin 134 into the travel path overlap segment 202.

Alternatively, the one or more processors of the control unit 150 can also be programmed to execute instructions stored in the one or more memory units to limit the movement of the first gantry carrier 124A (for example, to limit the movement of the first gantry carrier 124A to only a non-overlapping segment of the first travel path 200A) when the third gantry carrier 124C is moved past the rotational origin 134 into the travel path overlap segment 202. In further embodiments, the one or more processors of the control unit 150 can be programmed to execute instructions stored in the one or more memory units to limit the movement of the third gantry carrier 124C (for example, to limit the movement of the third gantry carrier 124C to only a non-overlapping segment of the alternative travel path 204) when the first gantry carrier 124A is in motion or when the first printhead 160A carried or held by the first gantry carrier 124A is in operation.

FIG. 2C illustrates an alternative embodiment of the cylindrical-coordinate 3D printer 100 where the 3D printer 100 comprises only three gantry carriers 124 and where a first travel path 200A of the first gantry carrier 124A encompasses substantially the entirety of the first rail 122A (both the X-rail and the V-rail). As shown in FIG. 2C, the first gantry carrier 124A can move freely along the first rail 122A without any collision-risk with another gantry carrier along the same rail.

As shown in FIGS. 2A-2C, the second travel path 200B of the second gantry carrier 124B can encompass substantially the entirety of the second rail 122B (or U-rail). The fourth travel path 200D of the fourth gantry carrier 124D can encompass substantially the entirety of the third rail 122C (or W-rail).

Figure 2D:
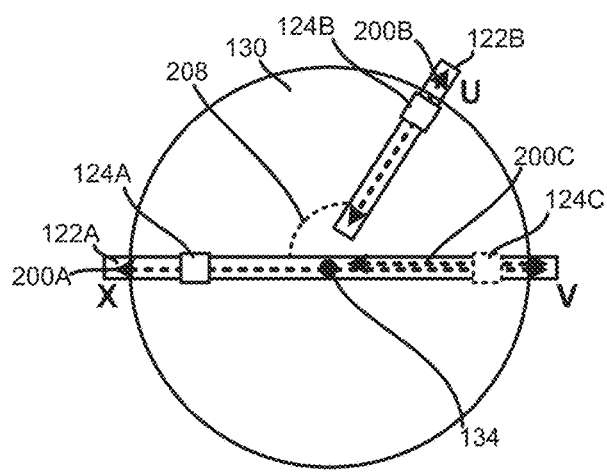
Figure 2E:
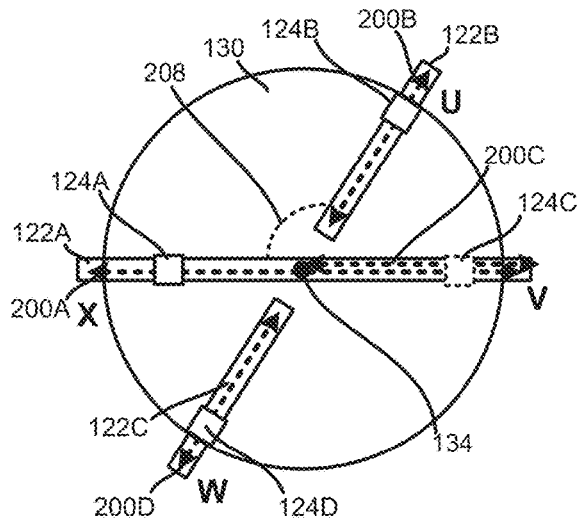
Figure 2F:
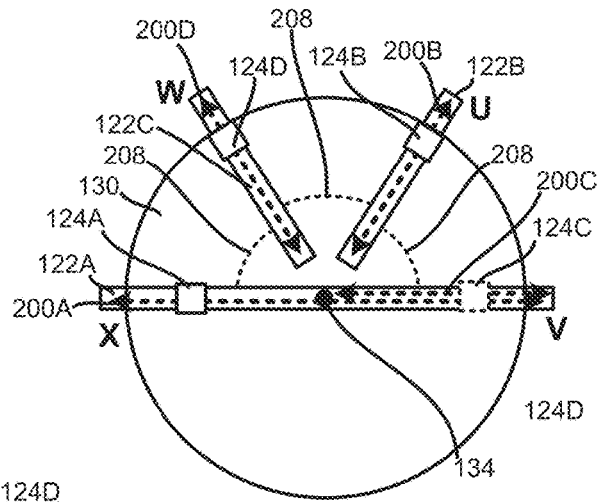

FIGS. 2D-2G illustrate alternative embodiments of the cylindrical-coordinate 3D printer 100. For example, FIG. 2D illustrates that the second rail 122B (or U-rail) can be positioned or oriented at an angle 208 (an oblique or non-right angle, i.e., an acute angle or an obtuse angle) with respect to the first rail 122A. FIG. 2E illustrates that each of the second rail 122B (or U-rail) and the third rail 122C (or W-rail) can be positioned or oriented at an angle 208 with respect to the first rail 122A. FIG. 2F illustrates that each of the second rail 122B (or U-rail) and the third rail 122C (or W-rail) can be positioned or oriented at an angle 208 with respect to the first rail 122A. Moreover, FIG. 2F illustrates that each of the second rail 122B (or U-rail) and the third rail 122C (or W-rail) can be positioned or oriented at an angle 208 with respect to one another.

As shown in FIGS. 2D-2F, the second travel path 200B of the second gantry carrier 124B can encompass substantially the entirety of the second rail 122B (or U-rail). The fourth travel path 200D of the fourth gantry carrier 124D can encompass substantially the entirety of the third rail 122C (or W-rail).

Figure 2G:
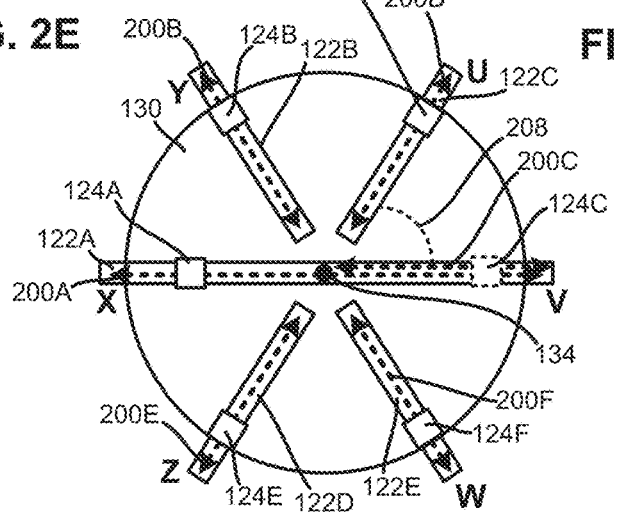

FIG. 2G illustrates that the cylindrical-coordinate 3D printer 100 can comprise five rails. For example, the cylindrical-coordinate 3D printer 100 can comprise a first rail 122A (with a first gantry carrier 124A configured to travel along the first rail 122A along a first travel path 200A and, optionally, a third gantry carrier 124C configured to travel along the first rail 122A along a third travel path 200C), a second rail 122B (with a second gantry carrier 124B configured to travel along the second rail 122B along a second travel path 200B), a third rail 122C (with a fourth gantry carrier 124D configured to travel along the third rail 122C along a fourth travel path 200D), a fourth rail 122D (with a fifth gantry carrier 124E configured to travel along the fourth rail 122D along a fifth travel path 200E), and a fifth rail 122E (with a sixth gantry carrier 124F configured to travel along the fifth rail 122E along a sixth travel path 200F).

Although two to five rails 122 are shown in FIGS. 2D-2G, it is contemplated by this disclosure that the 3D printer 100 can comprise any number of rails (between two and twenty rails or more than twenty rails) oriented radially with respect to the printbed 130 and positioned at an angle (an oblique or non-right angle, i.e., an acute angle or an obtuse angle) or positioned at right angles with respect to one another.

As will be discussed in more detail in the following sections, the various travel paths 200 disclosed herein can be implemented using belt drive mechanisms and belt drive arrangements devised by the applicant. As will be apparent to one of ordinary skill in the art, one technical problem with the travel paths 200 disclosed herein is how such travel paths 200 can be implemented without the gantry carriers 124 or printheads 160 colliding with one another. Another technical problem with the travel paths 200 disclosed herein is how multiple radially-oriented travel paths 200 can be implemented given the strictures provided by frame supports used to hold components of the 3D printer in place. Solutions to such technical problems are provided in the following sections.

Figure 3A:
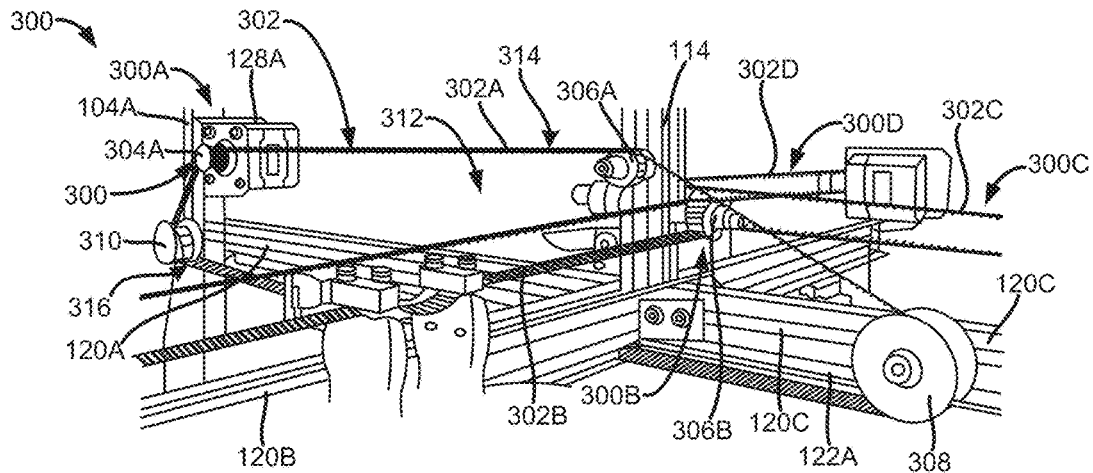
FIGS. 3A-3C illustrate one arrangement of belt drives of the cylindrical-coordinate 3D printer from different vantage points.
Figure 3B:
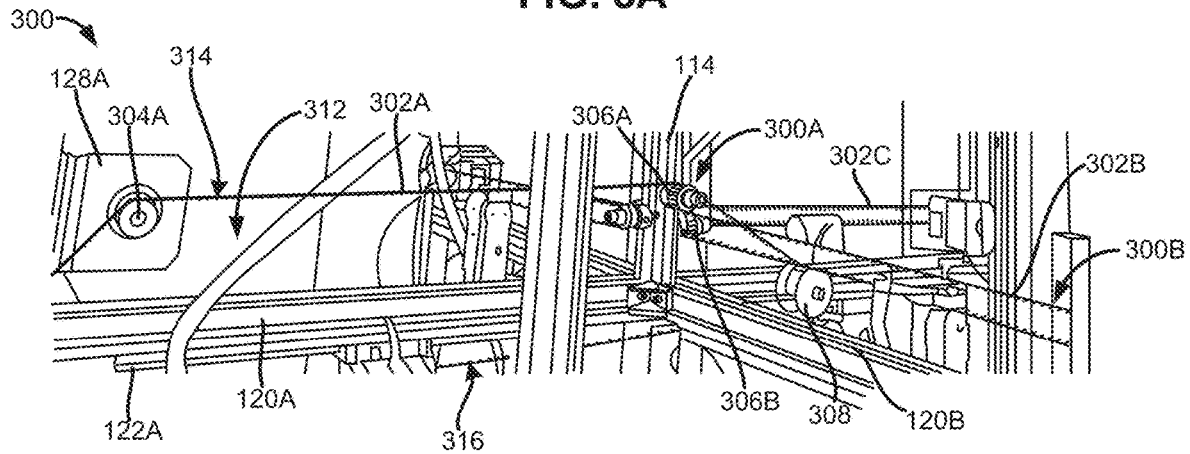
Figure 3C:
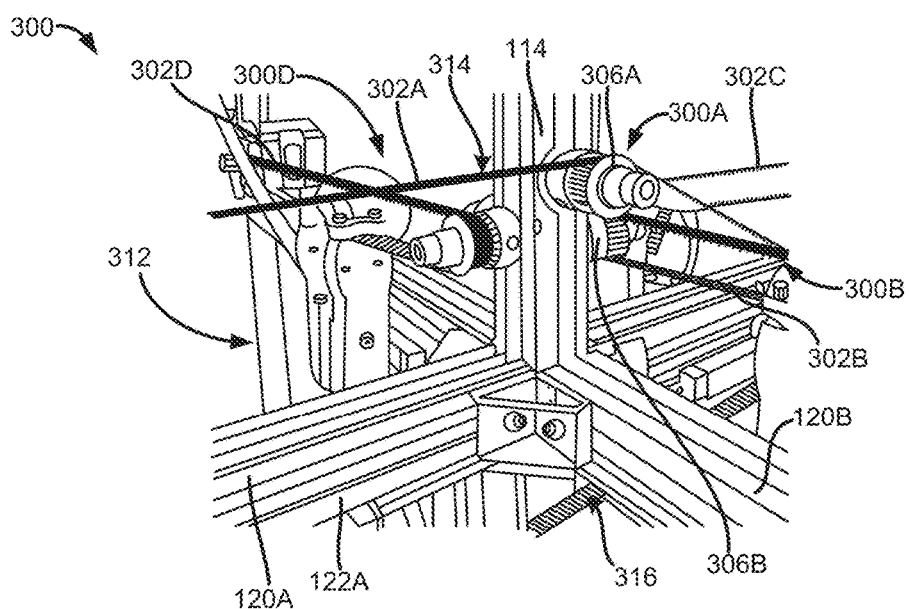

FIGS. 3A-3C illustrate one arrangement of belt drives 300 of the cylindrical-coordinate 3D printer 100 from different vantage points. The belt drives 300 can comprise different types of open belt drives arranged to allow at least one gantry carrier 124 to translate radially along a segment of the first rail 122A (e.g., the X-rail, see FIG. 2A) and cross over the rotational axis 132 of the printbed 130 to a different segment of the first rail 122A (e.g., the V-rail, see FIG. 2A) diametrically aligned to the other segment.

The belt drives 300 can comprise a first belt drive 300A, a second belt drive 300B, a third belt drive 300C, and a fourth belt drive 300D. The belt drives 300 can each comprise a drive belt 302. The drive belts 302 can be timing belts or toothed belts compatible with toothed pulleys. In some embodiments, the drive belts 302 can be rubber timing belts having a belt width of between about 4.0 mm to about 8.0 mm (e.g., about 5.0 mm or about 6.0 mm). Other types of toothed belts can also be used including timing belts made in part of a polymeric material or a metallic material.

The first belt drive 300A can comprise a first timing belt 302A looped around a first motorized pulley 304A, a first distal pulley 306A, a proximal pulley 310, and a cross-frame pulley 308. The first motorized pulley 304A can be coupled to the first gantry motor 128A. In some embodiments, the first gantry motor 128A can be a NEMA 17 bipolar stepper motor. The first timing belt 302A can be driven by the first motorized pulley 304A. The first distal pulley 306A, the proximal pulley 310, and the cross-frame pulley 308 can all be driven pulleys or idler pulleys configured to guide and provide tension to the drive belts 302. When the drive belts 302 are toothed belts or timing belts, the various pulleys, including all motorized and idler pulleys, can be toothed pulleys or gear pulleys with the teeth or gears of the pulley engaging the teeth of the timing belts.

A belt path of the first timing belt 302A can span two rail frame supports 120. For example, the belt path of the first timing belt 302A can span the first rail frame support 120A and the third rail frame support 120C. As shown in FIGS. 3A and 3B, the cross-frame pulley 308 can be coupled to the third rail frame support 120C. The proximal pulley 310 can be coupled to a vertical frame support 104 such as the first vertical frame support 104A. The proximal pulley 310 can be substantially aligned horizontally with the cross-frame pulley 308.

As shown in FIGS. 3A-3C, the first belt drive 300A can also comprise a first distal pulley 306A. The first distal pulley 306A can be coupled to the central frame support 114. The first distal pulley 306A can be positioned vertically above other distal pulleys of the other belt drives 300. For example, the first distal pulley 306A can be positioned vertically above at least a second distal pulley 306B. The first motorized pulley 304A can also be positioned vertically above other motorized pulleys 304 of the other belt drives 300. For example, the first motorized pulley 304A can be positioned vertically above a second motorized pulley.

The first motorized pulley 304A, the first distal pulley 306A, the cross-frame pulley 308, and the proximal pulley 310 can be arranged such that a belt loop of the first timing belt 302A is enlarged relative to the belt loops of other drive belts 302.

FIGS. 3A-3C also illustrate a second belt drive 300B comprising a second timing belt 302B. The second timing belt 302B can be looped around a second motorized pulley (not shown in the figures) and a second distal pulley 306B. The second timing belt 302B can be driven by the second motorized pulley. The second distal pulley 306B can be coupled to the central frame support 114. In some embodiments, the second distal pulley 306B can be positioned vertically below the first distal pulley 306A.

The second timing belt 302B can be arranged substantially perpendicular to or at an angle (an oblique or non-right angle, i.e., an acute angle or an obtuse angle) with respect to the first timing belt 302A and extend or crisscross through a belt loop void 312 defined by the first timing belt 302A. Both the first timing belt 302A and the second timing belt 302B can be operable when the second timing belt 302B is extended through or crisscross through the belt loop void 312 defined by the first timing belt 302A. For example, a belt path of the first timing belt 302A can overlap or intersect with a belt path of the second timing belt 302B when viewed from a top plan view or bottom plan view of the 3D printer 100. In these embodiments, the second rail frame support 120B can also extend or crisscross through the belt loop void 312 defined by the first timing belt 302A.

In some embodiments, the belt loop void 312 defined by the first timing belt 302A can be enlarged by the plurality of idler pulleys or driven pulleys (e.g., the first distal pulley 306A, the cross-frame pulley 308, and the proximal pulley 310) working in combination with the first motorized pulley 304A. In other embodiments, the belt loop void 312 of the first timing belt 30A can be enlarged by pulleys having an enlarged diameter.

Moreover, in these embodiments, the third timing belt 302C of the third belt drive 300C does not extend through the belt loop void 312 defined by the first timing belt 302A or crisscross the first timing belt 302A. The fourth timing belt 302D of the fourth belt drive 300D does not extend through the belt loop void 312 defined by the first timing belt 302A or crisscross the first timing belt 302A.

The first gantry carrier 124A can be coupled to a segment of the first timing belt 302A such that movement of the first gantry carrier 124A along the first rail 122A is driven by the movement of the first timing belt 302A. The first timing belt 302A of the first belt drive 300A can comprise an above-frame segment 314 and a below-frame segment 316. The above-frame segment 314 of the first timing belt 302A can be positioned vertically above the first rail frame support 120A and the below-frame segment 316 can be positioned vertically below the first rail frame support 120A. In these embodiments and other embodiments, the first gantry carrier 124A can be clamped, fastened, or otherwise coupled to the below-frame segment 316 of the first timing belt 302A. In some embodiments, the below-frame segment 316 of the first timing belt 302A can also be below the first rail 122A.

The second gantry carrier 124B can be coupled to a segment of the second timing belt 302B. Movement of the second gantry carrier 124B along the second rail 122B can be driven by the movement of the second timing belt 302B. In some embodiments, the second gantry carrier 124B can be coupled to the second timing belt 302B above the second rail frame support 120B.

The third gantry carrier 124C can be coupled to a segment of the third timing belt 302C. Movement of the third gantry carrier 124C along the first rail 122A can be driven by the movement of the third timing belt 302C. In some embodiments, the third gantry carrier 124C can be coupled to the third timing belt 302C above the third rail frame support 120C.

The fourth gantry carrier 124D can be coupled to a segment of the fourth timing belt 302D. Movement of the fourth gantry carrier 124D along the third rail 122C can be driven by the movement of the fourth timing belt 302D. In some embodiments, the fourth gantry carrier 124D can be coupled to the fourth timing belt 302D above the fourth rail frame support 120D.

As shown in FIGS. 3A-3C, the drive belts 302 (for example, the first timing belt 302A, the second timing belt 302B, the third timing belt 302C, and the fourth timing belt 302D) can be positioned laterally offset from the gantry rails 122. The gantry carriers 124 can be configured to couple to the drive belts 302 even though the drive belts 302 are positioned laterally offset from the gantry rails 122 and even though the gantry carriers 124 are also coupled to slidable carriages 126 configured to slide along the gantry rails 122. The design of the various gantry carriers 124 will be discussed in more detail in the following sections.

In alternative embodiments contemplated by this disclosure but not shown in the figures, the third belt drive 300C can be configured similar to the first belt drive 300A such that the third belt drive 300C also comprises a third distal pulley coupled to the central frame support 114, a proximal pulley coupled to the third vertical frame support 104C, and a cross-frame pulley coupled to part of the first rail frame support 120A). The pulleys can enlarge the third timing belt 302C such that the fourth timing belt 302D and the fourth rail frame support 120D extend through a belt loop void defined by the third belt drive 300C. In these embodiments, the first gantry carrier 124A and the third gantry carrier 124C (coupled to the third timing belt 302C) would have the travel paths shown in FIG. 2B.

Figure 4:
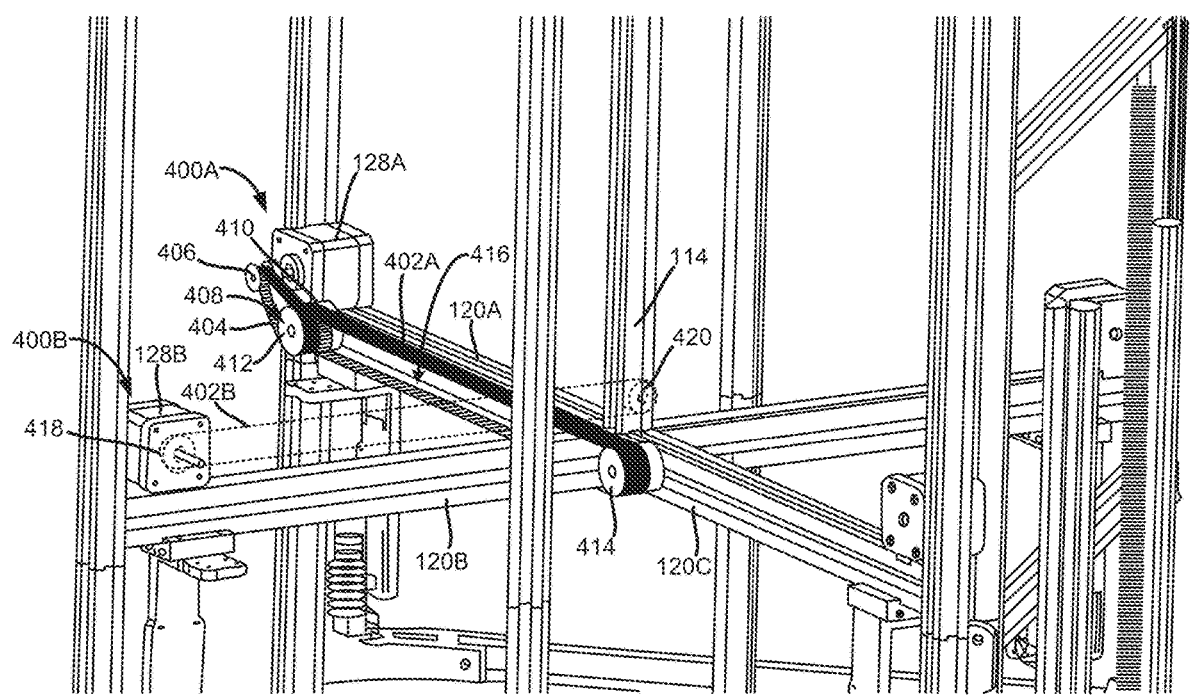
FIG. 4 illustrates an alternative arrangement of belt drives of the cylindrical-coordinate 3D printer.

FIG. 4 illustrates an alternative arrangement of belt drives of the cylindrical-coordinate 3D printer 100. In this embodiment, the 3D printer 100 can comprise a first belt drive 400A and a second belt drive 400B. The first belt drive 400A can comprise a first timing belt 402A and the second belt drive 400B can comprise a second timing belt 402B (shown using broken or dotted lines in FIG. 4). The first timing belt 402A and the second timing belt 402B can be the same type of timing belts as the drive belts 302 mentioned previously (e.g., rubber timing belts having teeth or belt grooves).

The first belt drive 400A can also comprise an ancillary drive belt 404, a first motorized pulley 406 coupled to the first gantry motor 128A, a dual pulley assembly 408 comprising an intermediary drive pulley 410 and a driven pulley 412, and a cross-frame pulley 414.

The ancillary drive belt 404 can be a shorter version of the first timing belt 402A or the second timing belt 402B. The first motorized pulley 406 can be similar to any of the motorized pulleys 304 previously disclosed. The ancillary drive belt 404 can connect the first motorized pulley 406 to the driven pulley 412 of the dual pulley assembly 408.

The dual pulley assembly 408 can comprise the driven pulley 412 connected to the intermediary drive pulley 410. The driven pulley 412 can share the same axis or drive shaft as the intermediary drive pulley 410. Rotation of the driven pulley 412 also rotates the intermediary drive pulley 410.

The first timing belt 402A can connect the intermediary drive pulley 410 to the cross-frame pulley 414. The cross-frame pulley 414 can be a driven pulley or idler pulley coupled or otherwise attached in part to the third rail frame support 120C. The dual pulley assembly 408 can be coupled or otherwise attached in part to the first rail frame support 120A.

In this embodiment, the second rail frame support 120B can extend through a belt loop void 416 defined by the first timing belt 402A. The first timing belt 402A can be operable while looped around the second rail frame support 120B. The first motorized pulley 406 can drive the rotation of the driven pulley 412 via the ancillary drive belt 404, which can then cause the rotation of the intermediary drive pulley 410. Rotation of the intermediary drive pulley 410 can then drive the movement of the first timing belt 402A. In this manner, the first timing belt 402A is driven indirectly by the first motorized pulley 406.

FIG. 4 also illustrates a second timing belt 402B positioned substantially perpendicular to the first timing belt 402A when tensioned. In this embodiment, the second timing belt 402B does not extend through the belt loop void 416 of the first timing belt 402A. In this embodiment, the second timing belt 402B is positioned vertically above the first timing belt 402A. Unlike the belt drive mechanisms shown in FIGS. 3A-3C, the belt drive mechanism shown in FIG. 4 has only a neighboring rail frame support extending through a smaller belt loop void defined by the first timing belt 402A. The other timing belts are positioned vertically above the first timing belt 402A.

The second timing belt 402B can be driven by a second motorized pulley 418 coupled to the second gantry motor 128B. The second timing belt 402B can connect the second motorized pulley 418 to a second distal pulley 420 coupled to the central frame support 114.

Although not shown in the figures, it is contemplated by this disclosure that the 3D printer 100, in this embodiment, can also comprise a third belt drive and a fourth belt drive. The fourth belt drive can be configured similar to the second belt drive 400B but positioned along the fourth rail frame support 120D. The third belt drive can be configured similar to either the first belt drive 400A or the second belt drive 400B. For example, the third belt drive can have a distal pulley coupled to the first rail frame support 120A and the fourth rail frame support 120D can extend through a belt loop void defined by the third timing belt of the third belt drive. Alternatively, the third belt drive can be configured similar to the second belt drive 400B comprising a third timing belt positioned perpendicular to or at an angle (an oblique or non-right angle, i.e., an acute angle or an obtuse angle) with respect to the second timing belt and above the first timing belt.

Figure 5A:
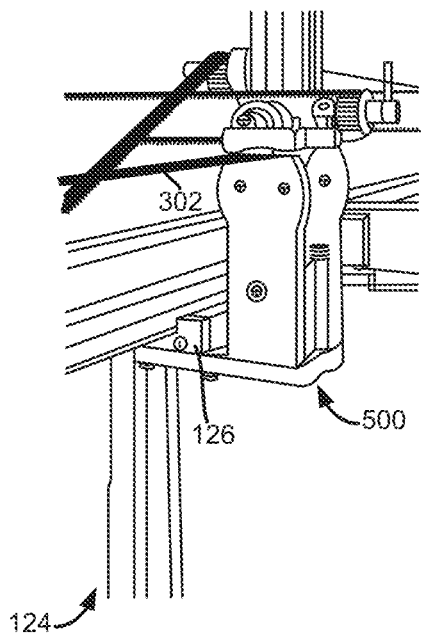
FIGS. 5A and 5B illustrate perspective views of one embodiment of a gantry carrier of the cylindrical-coordinate 3D printer having a lateral carrier extender configured to attach to a timing belt.
Figure 5B:
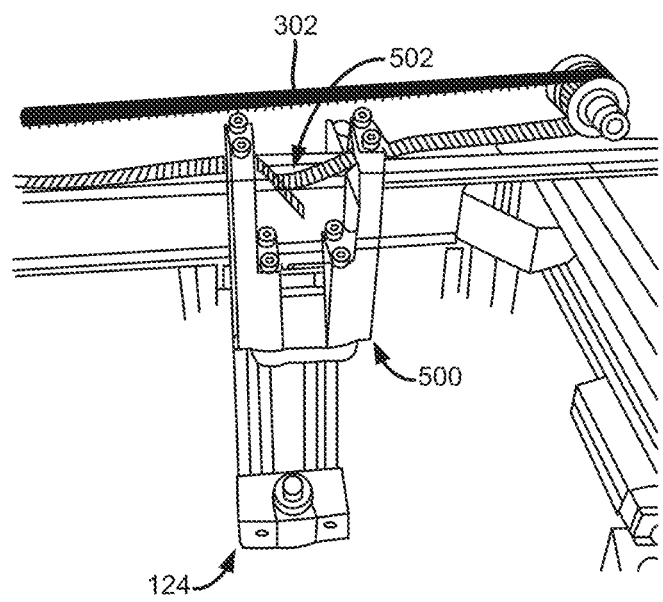

FIGS. 5A and 5B illustrate perspective views of one embodiment of a gantry carrier 124 of the cylindrical-coordinate 3D printer 100 having a lateral carrier extender 500 configured to attach to a drive belt 302 (e.g., any of the second timing belt 302B, the third timing belt 302C, or the fourth timing belt 302D).

As previously discussed, the drive belts 302 (for example, the second timing belt 302B, the third timing belt 302C, and the fourth timing belt 302D) can be positioned laterally offset from the gantry rails 122. For example, when viewing the gantry rails 122 (e.g., the second rail 122B or the third rail 122C) from a radially outermost end to a radially innermost end, the drive belts 302 are positioned above and to the right of the gantry rails 122. The lateral carrier extender 500 allows certain of the gantry carriers 124 (e.g., the second gantry carrier 124B, the third gantry carrier 124C, or the fourth gantry carrier 124D) to couple to their respective drive belts 302.

The lateral carrier extender 500 can be substantially shaped as a backward-L. In other embodiments, the lateral carrier extender 500 can have a crescent or arcuate shape. The lateral carrier extender 500 can be coupled to a top portion of a gantry carrier 124 and to part of the slidable carriage 126. As previously discussed, the slidable carriage 126 can be a carriage block configured to slide along the gantry rails 122. The slidable carriages 126 can comprise miniature ball bearings (e.g., stainless steel ball bearings) housed within the slidable carriages 126. The ball bearings can serve as a friction-reducing interface between the gantry rail 122 and the remainder of the slidable carriage 126.

The lateral carrier extender 500 can comprise a clamp or clip at the top of the lateral carrier extender 500 for clamping, clipping, or otherwise fastening to the drive belts 302. The lateral carrier extender 500 can be made in part of a polymeric material, similar to the gantry carrier 124. Although the lateral carrier extender 500 is described as a separate piece from the gantry carrier 124, it should be understood by one of ordinary skill in the art that the lateral carrier extender 500 can also be integrated with the gantry carrier 124 or be part of the gantry carrier 124.

FIG. 5B illustrates that the lateral carrier extender 500 can also be used to fasten together two unconnected ends 502 of an open-ended timing belt. By fastening the two unconnected ends 502 to the lateral carrier extender 500, the lateral carrier extender 500 can close the loop of the open-ended timing belt, thereby forming the drive belt 302. This allows an operator of the 3D printer 100 more control over the tension of the drive belts 302 and reduces the cost of the 3D printer 100 by allowing the operator to use open-ended timing belts to create a closed-loop drive belt rather than having to specially purchase customized closed-loop drive belts.

Figure 5C:
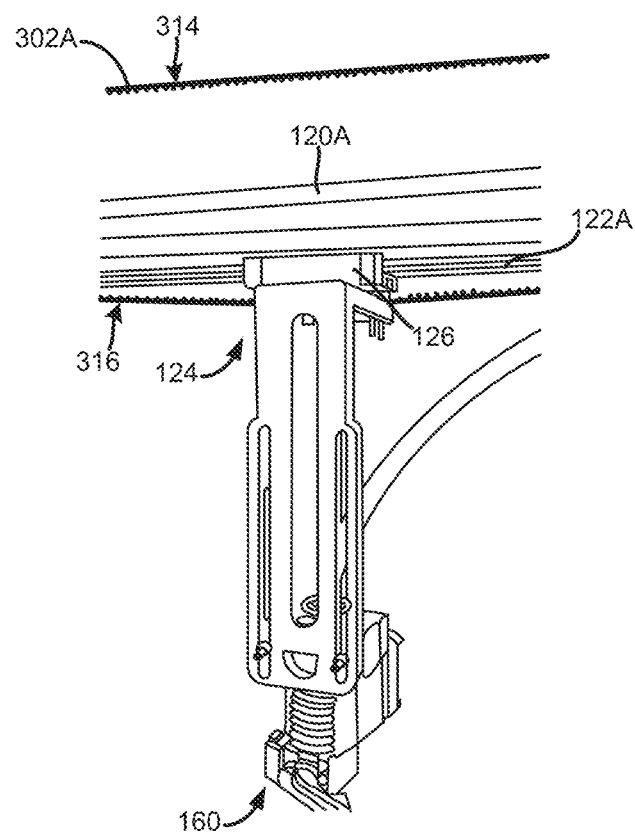
FIG. 5C illustrates a perspective view of another embodiment of a gantry carrier of the cylindrical-coordinate 3D printer configured to attach to a timing belt.

FIG. 5C illustrates a perspective view of another embodiment of a gantry carrier 124 (e.g., the first gantry carrier 124A) of the cylindrical-coordinate 3D printer 100 configured to attach directly to a drive belt 302 such as the first timing belt 302A. This instance of the gantry carrier 124 can be used to couple the gantry carrier 124 to an instance of a drive belt 302 configured to have a below-frame segment 316 (e.g., the first timing belt 302A of the first belt drive 300A). As shown in FIG. 5C, the below-frame segment 316 of the first timing belt 302A can be sandwiched, clamped, or otherwise secured in between the slidable carriage 126 and the top of the gantry carrier 124.

In all such embodiments, the drive belt 302 (e.g., the rubber timing belt) can be coupled to the lateral carrier extender 500 or coupled in between the gantry carrier 124 and the slidable carrier 126 via belt clamps or tension clamps. An operator of the 3D printer 100 can screw or unscrew such clamps from the top of the gantry carrier 124 or the lateral carrier extender 500 to release the carrier or extender from the belt.

Figure 6A:
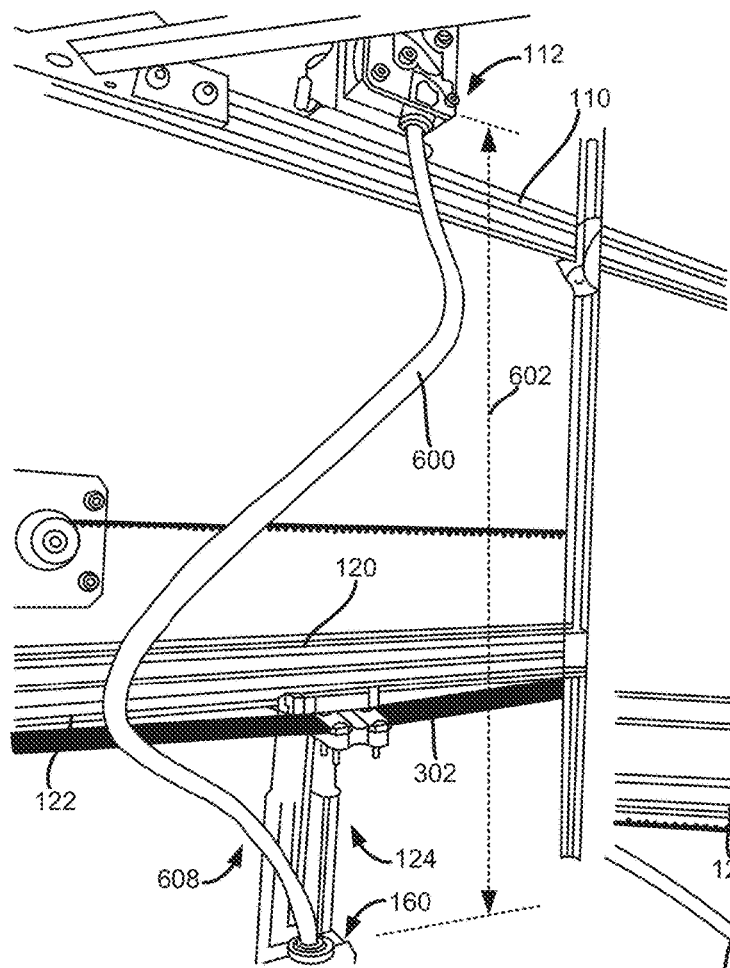
FIG. 6A illustrates an embodiment of a Bowden-type extruder of the cylindrical-coordinate 3D printer positioned above a printhead and an extruder tube connecting the extruder to the printhead.

FIG. 6A illustrates an embodiment of an extruder assembly 112 (e.g., a Bowden-type extruder) positioned above a printhead 160 and an extruder tube 600 connecting the extruder assembly 112 to the printhead 160. The extruder tube 600 can be a polymeric tube configured to act as a conduit for delivering filament to the extruder hotend or printhead 160. In some embodiments, the extruder tube 600 can be made in part of polytetrafluoroethylene (PTFE) or Teflon™. The extruder tube 600 can have an inner tube diameter of between about 2.0 mm to about 4.0 mm.

The extruder tube 600 connects the extruder assembly 112 to the printhead 160. Each of the extruder assemblies 112 can comprise an extruder motor. The extruder motor can be controlled by the control unit 150. When the cylindrical-coordinate 3D printer 100 comprises four extruder assemblies 112, the control unit 150 can control all four of the extruder motors along with other motors of the 3D printer 100.

The extruder assembly 112 can be a Bowden-type extruder where the extruder is separated from the printhead 160 by a separation distance 602. The separation distance 602 can be a straight-line vertical distance measured from a bottom of the extruder assembly 112 to a top of the printhead 160 when the printhead 160 is positioned vertically in line with the extruder assembly 112 (e.g., when the second printhead 160B is positioned below the second extruder assembly 112B and vertically in line with the bottom of the second extruder assembly 112B). The separation distance 602 can be between about 300 mm to about 400 mm. In some embodiments, the separation distance 602 can be between about 250 mm to about 300 mm. In other embodiments, the separation distance 602 can be between about 400 mm to about 500 mm or greater than 500 mm.

It has been discovered by the applicant that optimal operation of the cylindrical-coordinate 3D printer 100 requires the length of the extruder tube 600 to be determined based on the separation distance 602. The length of the extruder tube 600 should be longer than the separation distance 602. In addition, a ratio of the separation distance 602 to the length of the extruder tube 600 can be between about 1:1.2 to about 1:1.4. In other embodiments, a ratio of the separation distance 602 to the length of the extruder tube 600 can be between about 1:1.4 to about 1:1.6.

The extruder tube 600 connecting the first extruder assembly 112A to the first printhead 160A can be longer than the lengths of the other extruder tubes 600 (e.g., the other three extruder tubes 600). For example, the length of the extruder tube 600 connecting the first extruder assembly 112A to the first printhead 160A can be 25% longer than the length of the other extruder tubes 600. This difference in lengths of the extruder tubes 600 is to accommodate the extra distance traveled by the first gantry carrier 124A and the first printhead 160A carried or otherwise secured to the first gantry carrier 124A. The lengths of the other extruder tubes 600 can also be lengthened to accommodate any extra distance traveled by such gantry carriers 124 (for example, if the third gantry carrier 124C also is allowed to cross over the rotational axis 132).

The extruder assembly 112 can be coupled to the extruder frame support 110. In some embodiments, the extruder assembly 112 can be coupled to a top of the extruder frame support 110. In other embodiments not shown in the figures, at least part of the extruder assembly 112 can be coupled to a bottom of the extruder frame support 110. As previously discussed, the extruder frame supports 110 can be aligned radially with the rail frame supports 120. In these embodiments, the extruder assembly 112 can be positioned substantially at a midpoint of the extruder frame support 110 or in proximity to the midpoint of the extruder frame support 110.

Figure 6B:
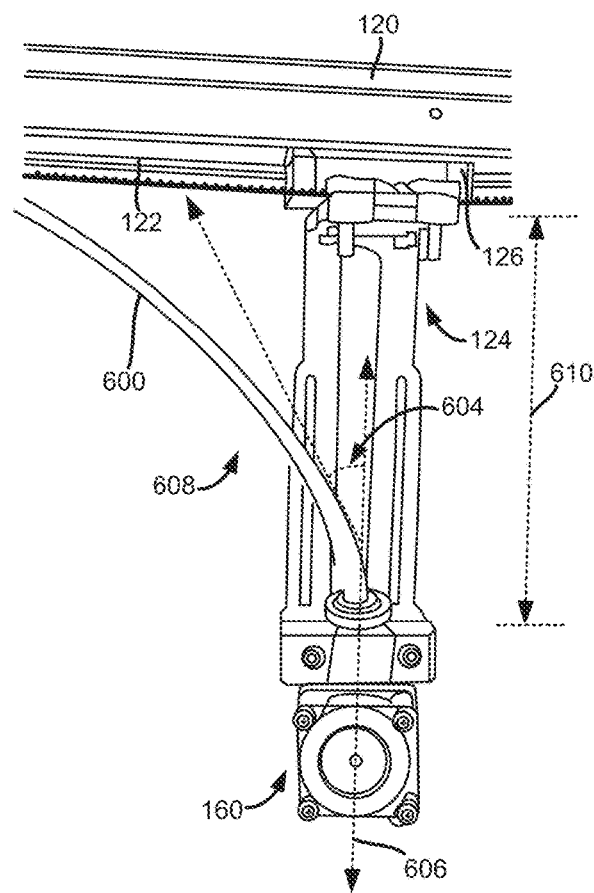
FIG. 6B illustrates a close-up of an extruder tube entering the printhead and an entry angle of the extruder tube with respect to a longitudinal axis of the printhead.

FIG. 6B illustrates a close-up of an extruder tube 600 entering the printhead 160 at an entry angle 604 with respect to a longitudinal axis 606 of the printhead. The entry angle 604 can be defined by a tube segment 608 in proximity to the top of the printhead 160 and the longitudinal axis 606 of the printhead 160.

The entry angle 604 can be less than about 45 degrees. In other embodiments, the entry angle 604 can be between about 30 degrees and 45 degrees. In further embodiments, the entry angle 604 can be between about 20 degrees and 30 degrees. In even further embodiments, the entry angle 604 can be between about 10 degrees and 20 degrees or less than 10 degrees. In additional embodiments, the entry angle 604 can be between about 45 degrees and 60 degrees.

It has been discovered by the applicant that an entry angle 604 of between about 10 degrees and 45 degrees contributes to the optimal functioning of the cylindrical-coordinate 3D printer 100. An entry angle 604 above 60 degrees can result in filament not being fed properly to the printhead 160 or slowing down the operation of the 3D printer 100.

FIG. 6B also illustrates that the gantry carrier 124 can have a gantry carrier height 610. The gantry carrier height 610 can be measured from a bottom of the slidable carriage 126 to a top of the printhead 160. The gantry carrier height 610 can be between about 80.0 mm to about 125 mm (e.g., about 100 mm). In other embodiments, the gantry carrier height 610 can be between about 125 mm to about 150 mm or greater than 150 mm. The gantry carrier height 610 can be adjusted based on a vertical separation distance between the extruder frame support 110 and the rail frame support 120. It has been discovered by the applicant that a gantry carrier height 610 of between about 80.0 mm to about 125 mm works well to allow tubing and wiring (not shown in the figures) to freely move without interfering with the operation of the 3D printer 100.

Figure 7:
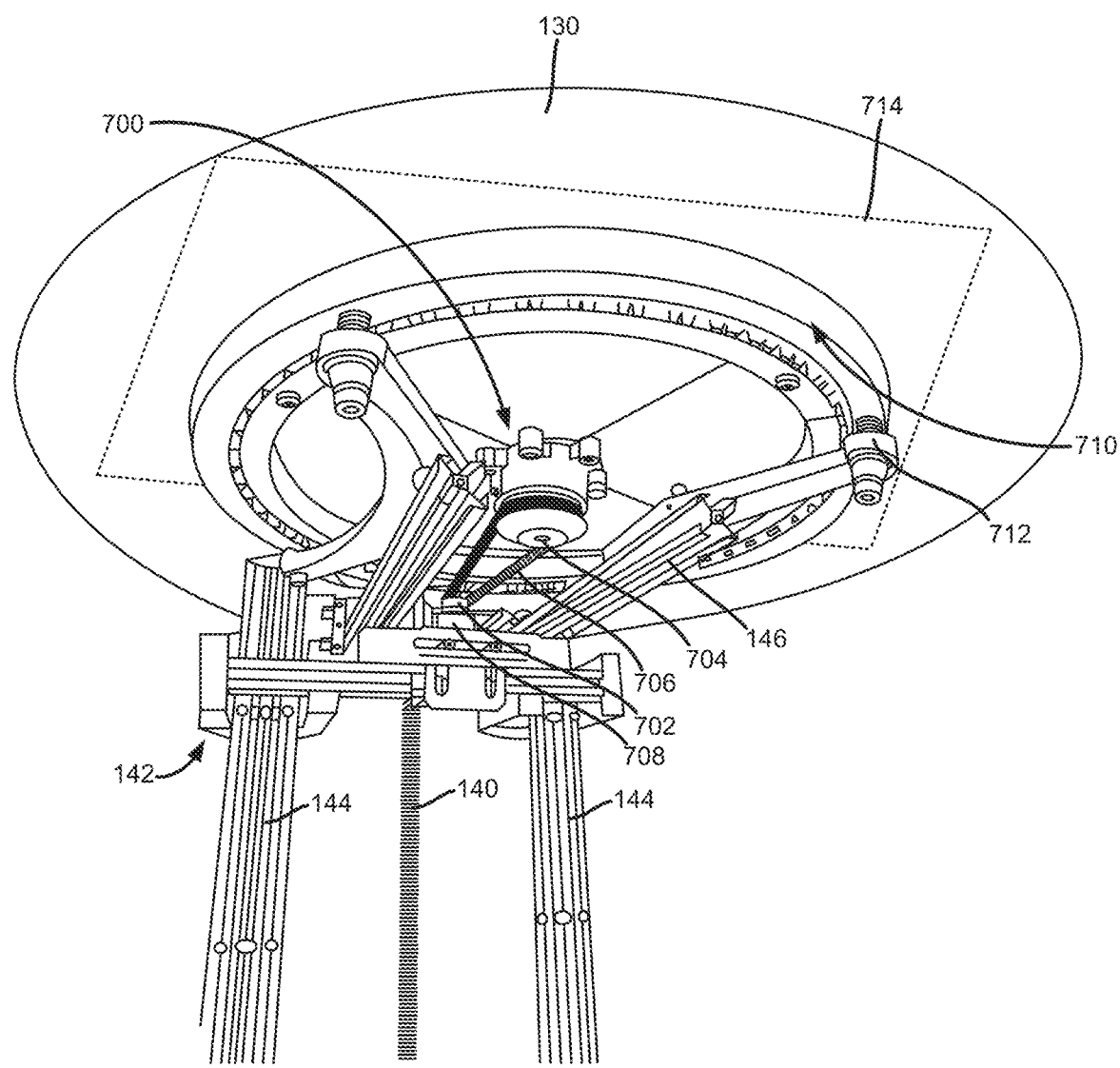
FIG. 7 illustrates an underside of a rotatable printbed of the cylindrical-coordinate 3D printer showing a rotation of the printbed controlled by a pulley mechanism.

FIG. 7 illustrates an underside of a rotatable printbed 130 of the cylindrical-coordinate 3D printer 100. The rotation of the printbed 130 can be controlled by a pulley mechanism 700. In some embodiments, the pulley mechanism 700 can comprise a motorized printbed pulley 702, a central printbed pulley 704, and a printbed drive belt 706 linking the motorized printbed pulley 702 to the central printbed pulley 704. The motorized printbed pulley 702 can be powered by a printbed motor 708 controlled by the control unit 150. In some embodiments, the motorized printbed pulley 702 and the printbed motor 708 can be coupled to part of the printbed supporting platform 142. In these and other embodiments, the central printbed pulley 704 can be coupled to a midpoint or center of the underside of the printbed 130. The printbed 130 can be configured to rotate in a clockwise rotational direction or a counterclockwise rotational direction. Rotation of the printbed 130 can be driven by the motorized printbed pulley 702 powered by the printbed motor 708. In response to the rotation of the motorized printbed pulley 702, the central printbed pulley 704 can be rotated via the printbed drive belt 706 (e.g., rubber timing belt or toothed belt).

As previously discussed, the printbed 130 can be actuated in the z-direction (vertically upward or downward) using a mechanical linear actuator (e.g., the ball screw mechanism 136, see FIGS. 1A-1C) that translates rotational motion to linear motion with minimal friction. The printbed supporting platform 142 can be coupled to a ball nut assembly of the ball screw mechanism 136 such that the entire printbed supporting platform 142 can be raised or lowered in response to a rotation of the threaded screw 140 of the ball screw mechanism 136.

The printbed supporting platform 142 can also be stabilized by one or more lateral rails 144 (two such rails 144 are shown in FIG. 7). The printbed supporting platform 142 can further comprise a plurality of supporting arms 146 for supporting a rotatable load-bearing swivel ring 710. A base of the load-bearing swivel ring 710 can be coupled to the supporting arms 146 and a rotatable ring can be coupled directly to the underside of the printbed 130. The rotatable ring can rotate as a result of ball bearings positioned in between the ring and the load-bearing base. The load-bearing swivel ring 710 can also comprise a plurality of spring-based leveling adjusters 712 for adjusting a surface level of the printbed 130. In some embodiments, the spring-based leveling adjusters 712 can be adjusted by turning a screw (e.g., a hexagonal screw) extended through the leveling adjuster 712.

In some embodiments, the printbed 130 can be configured to be heated by a heating pad 714 (shown in broken/dotted lines in FIG. 7) coupled to an underside of the printbed 130. The heating pad 714 can be an electrically-powered heating pad. In some embodiments, the heating pad 714 can be an electrically-powered silicone heating pad. The heating pad 714 can be attached to the underside of the printbed 130 via adhesives, fasteners, clips, or a combination thereof. As will be discussed in more detail in the following sections, the heating pad 714 can be electrically coupled to a power supply 148 via a slip ring assembly 800 such that electrical wires connecting the heating pad 714 to the power supply 148 remain untangled when the printbed 130 is being rotated.

Figures 8A, 8B:
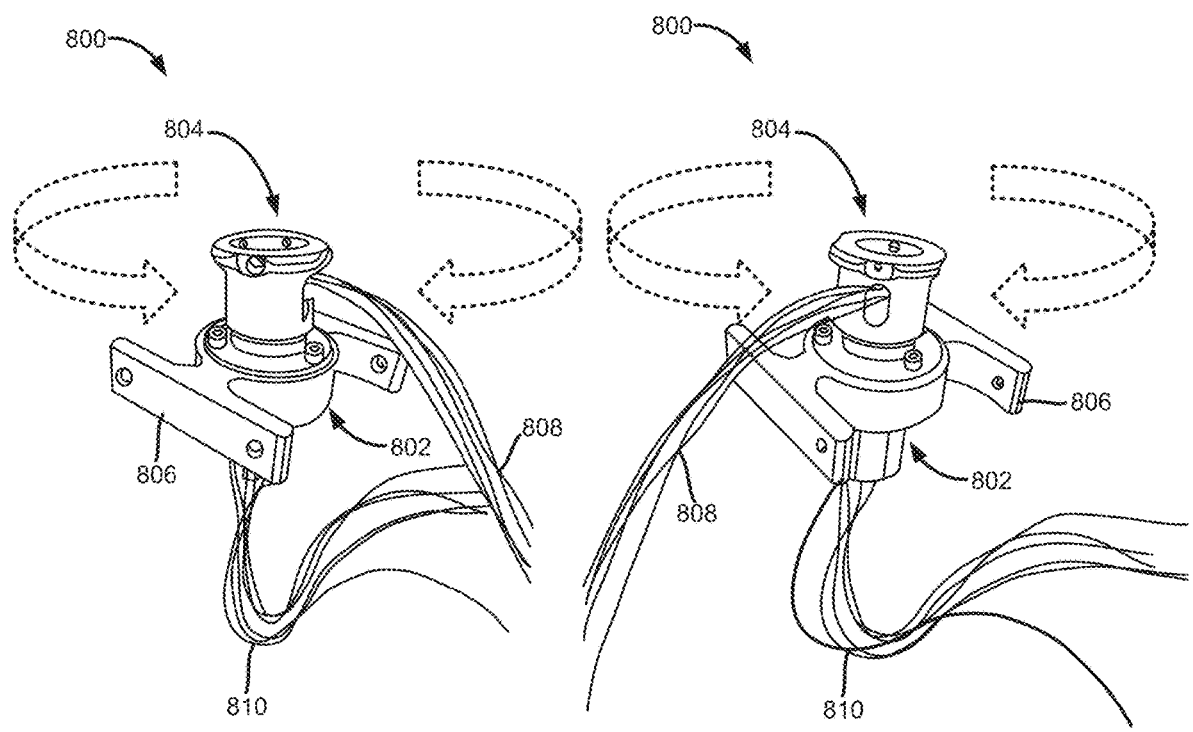
FIGS. 8A and 8B illustrate a slip ring assembly configured to transmit power and electrical signals to components attached to the rotatable printbed.

FIGS. 8A and 8B illustrate a slip ring assembly 800 configured to transmit power and electrical signals to components attached to the rotatable printbed 130. In one embodiment, the slip ring assembly 800 can be used to transmit power to a heating pad 714 coupled to the underside of the rotatable printbed 130. The slip ring assembly 800 can comprise a stator component 802, a rotor component 804, and a mounting bracket 806. In some embodiments, the stator component 802 can be mounted to part of the printbed supporting platform 142, the ball nut assembly, or a combination thereof via the mounting bracket 806. The rotor component 804 can be allowed to freely rotate and the rotor leads 808 or lead wires stemming from the rotor component 804 can be electrically coupled to the heating pad 714. The stator leads 810 or lead wires coming from the stator component 802 can be electrically coupled to the power supply 148, the control unit 150, or leads or components thereof.

The slip ring assembly 800 can be any type of rotary electrical joint or interface configured to transmit a current from the stator leads 810 to the rotor leads 808 emanating from the rotor component 804. For example, the slip ring assembly 800 can comprise a metal or graphite contact brush housed within the slip ring assembly 800 that rubs on one or more rotating metal rings. As the metal rings turn, the electrical current is conducted through the brush to the metal rings. The applicant has discovered that a rotary electrical interface such as the slip ring assembly 800 disclosed herein allows the 3D printer to effectively transmit power to electrical components coupled to the rotatable printbed 130 without electrical wires from becoming tangled. Although a heating pad 714 has been discussed, it is contemplated by this disclosure that various other electrically-powered components can also be coupled to the printbed 130 including various sensors, gauges, lights, or a combination thereof.

Figure 9:
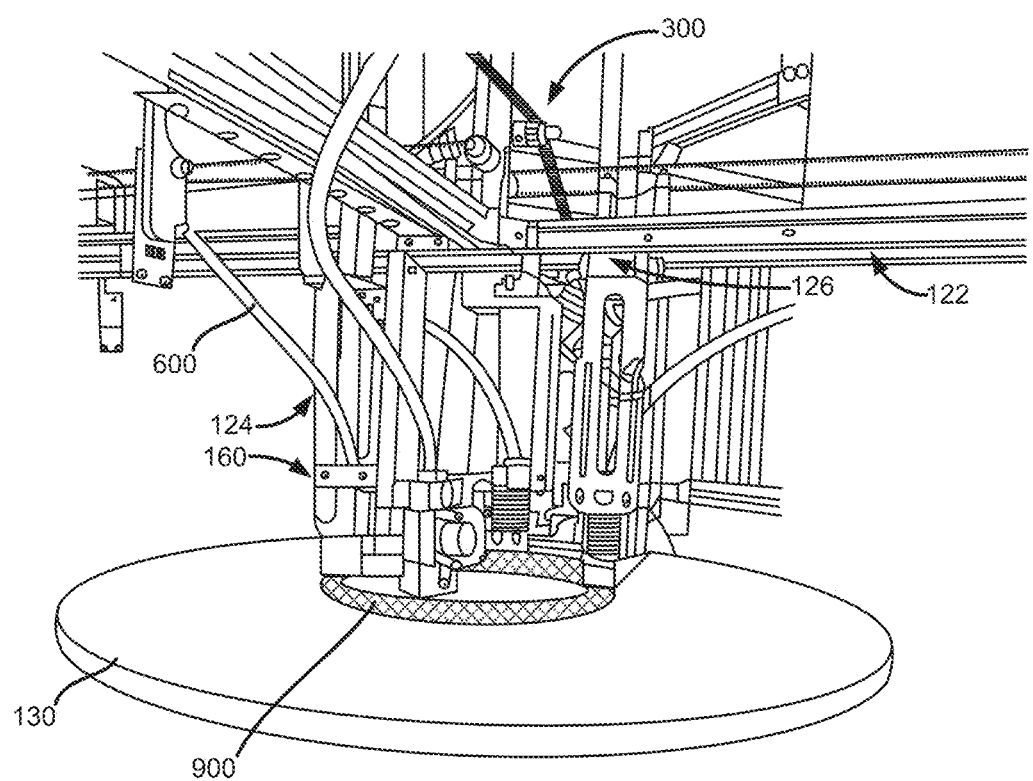
FIG. 9 illustrates an embodiment of all four printheads of the cylindrical-coordinate 3D printer operating concurrently.

FIG. 9 illustrates an embodiment of the cylindrical-coordinate 3D printer 100 with all four printheads 160 operating concurrently. As shown in FIG. 9, the four printheads 160 can operate concurrently to print a 3D printed object 900. The four printheads 160 can print the 3D printed object 900 directly on the printbed 130. Each of the four printheads 160 can be moved radially (e.g., radially inward or radially outward) with respect to the circular printbed 130 to deposit a layer of melted filament on either a surface of the printbed 130 or on an existing layer of the 3D printed object 900.

In some embodiments, the printheads 160 can be Bowden-type hotends comprising at least a heater, a fan, a thermistor, and a nozzle, For example, the printheads 160 can be Bowden-type hotends comprising a 40 W heating element, a 12V fan, an NTC 3950 thermistor, and a metallic nozzle. The printheads 160 can be connected by an extruder tube 600 (e.g., a Bowden-type extruder tube) to the extruder assemblies 112 (not shown in FIG. 9, see FIG. 6A).

The printheads 160 can be carried, securely held, or otherwise coupled to gantry carriers 124. The gantry carriers 124 can be coupled in turn to slidable carriages 126 configured to slide along gantry rails 122.

At least one of the printheads 160 or gantry carriers 124 (for example, the first printhead 160A or the first gantry carrier 124A) can be configured to cross a rotational axis 132 or a rotational origin 134 of the printbed 130 (see FIGS. 1A and 2A) to print to a middle or midpoint of the printbed 130. In some embodiments, multiple printheads 160 or gantry carriers 124 can be configured to cross the rotational axis 132 or the rotational origin 134 to print to the middle or midpoint of the printbed 130.

Movement of the gantry carriers 124 can be controlled by belt drive mechanisms coupled to the various frame supports of the structural frame 102. The gantry carriers 124 can be coupled to drive belts positioned above the gantry carriers 124.

The printbed 130 can be rotated, either clockwise or counterclockwise, once the printheads 160 have completed a layer deposition. The printbed 130 can also be translated vertically downward via a mechanical actuation mechanism (e.g., a ball screw mechanism) once the printheads 160 have completed a layer deposition.

It has been discovered by the applicant that the cylindrical-coordinate 3D printer 100 disclosed herein can print 3D printed objects up to 70% faster than traditional Cartesian 3D printers. For certain larger 3D printed objects, the applicant has discovered that the cylindrical-coordinate 3D printer 100 disclosed herein can print 3D printed objects up to 90% faster than traditional Cartesian 3D printers.

A computing device in wireless communication with the control unit 150 of the cylindrical-coordinate 3D printer 100 can be programmed to execute instructions to translate standard Cartesian or delta printer G-code into modified G-code for use with the cylindrical-coordinate 3D printer 100 disclosed herein. Such instructions can be part of a specialized slicer program or software application run on the computing device.

A file containing the modified G-code can then be wirelessly transmitted to the control unit 150. The control unit 150 can then run the modified G-code to begin the 3D printing process.

Figure 10:
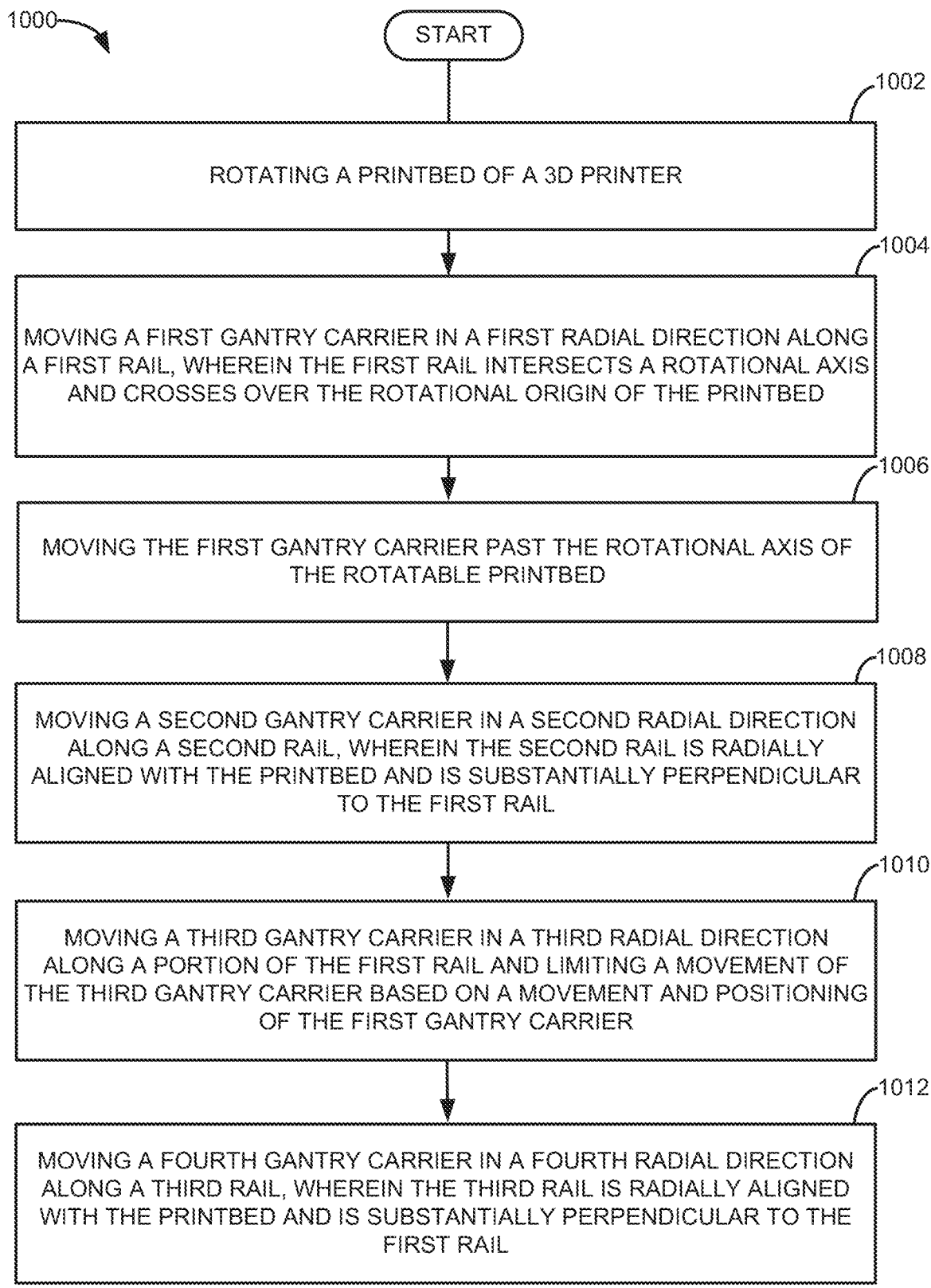
FIG. 10 illustrates an embodiment of a method of 3D printing using a cylindrical-coordinate 3D printer.

FIG. 10 illustrates an embodiment of a method 1000 of 3D printing using the cylindrical-coordinate 3D printer 100. The method 1000 can comprise rotating a printbed 130 of the 3D printer 100 in step 1002. In some embodiments, the printbed 130 can be rotated using a pulley mechanism 700 driven by a printbed motor 708. The printbed motor 708 can be coupled to a moveable printbed supporting platform 142. The printbed 130 can be circular and can be defined by a rotational origin 134 having a rotational axis 132 extending therethrough. The rotatable printbed 130 can be vertically translatable in an upward and downward direction using a mechanical linear actuator such as a rotating ball screw. The method 1000 can also comprise moving or controlling a movement of a first gantry carrier 124A in a first radial direction with respect to the circular printbed 130 along a first rail 122A in step 1004. The first rail 122A can intersect the rotational axis 132 and cross over the rotational origin 134 of the printbed 130.

The method 1000 can further comprise moving the first gantry carrier 124A past the rotational axis 132 in step 1006. A length of the first rail 122A can be substantially equivalent to or exceed a diameter of the printbed 130. The method 1000 can also comprise moving a second gantry carrier 124B in a second radial direction along a second rail 122B in step 1008. The second rail 122B can be aligned radially with the printbed 130 and be oriented substantially perpendicular to or at an angle (an oblique or non-right angle, i.e., an acute angle or an obtuse angle) with respect to the first rail 122A. The travel path of the second gantry carrier 124B can end or terminate prior to the second gantry carrier 124B reaching the rotational axis 132.

The method 1000 can also comprise moving a third gantry carrier 124C in a third radial direction along a portion of the first rail 122A in step 1010. The third radial direction can be substantially diametrically aligned or collinear with the first radial direction. The method 1000 can further comprise limiting a movement of the third gantry carrier 124C based on a movement and positioning of the first gantry carrier 124A. For example, the movement of the third gantry carrier 124C can be limited by the control unit 150 of the 3D printer 100. One or more processors of the control unit 150 can execute software instructions stored in one or more memory units of the control unit 150 to limit the movement of the third gantry carrier 124C based on a movement and positioning of the first gantry carrier 124A.

The method 1000 can also comprise moving a fourth gantry carrier 124D in a fourth radial direction along a third rail 122C in step 1012. The third rail 122C can be oriented substantially perpendicular to or at an angle (an oblique or non-right angle, i.e., an acute angle or an obtuse angle) with respect to the first rail 122A and be substantially collinear with the second rail 122B. The travel path of the fourth gantry carrier 124D can end or terminate prior to the fourth gantry carrier 124D reaching the rotational axis 132. The method 1000 can also comprise simultaneously operating a first printhead 160 carried by the first gantry carrier 124A, a second printhead 160 carried by the second gantry carrier 124B, a third printhead 160 carried by the third gantry carrier 124C, and a fourth printhead 160 carried by the fourth gantry carrier 124D. The printbed 130 can also be rotated or translated vertically downward or upward after any or all of the four printheads have completed a deposition operation.

The method 1000 can comprise additional steps not shown in FIG. 10. For example, the method 1000 can further comprise steps or operations described in the preceding portions of this disclosure.

Figure 11A:
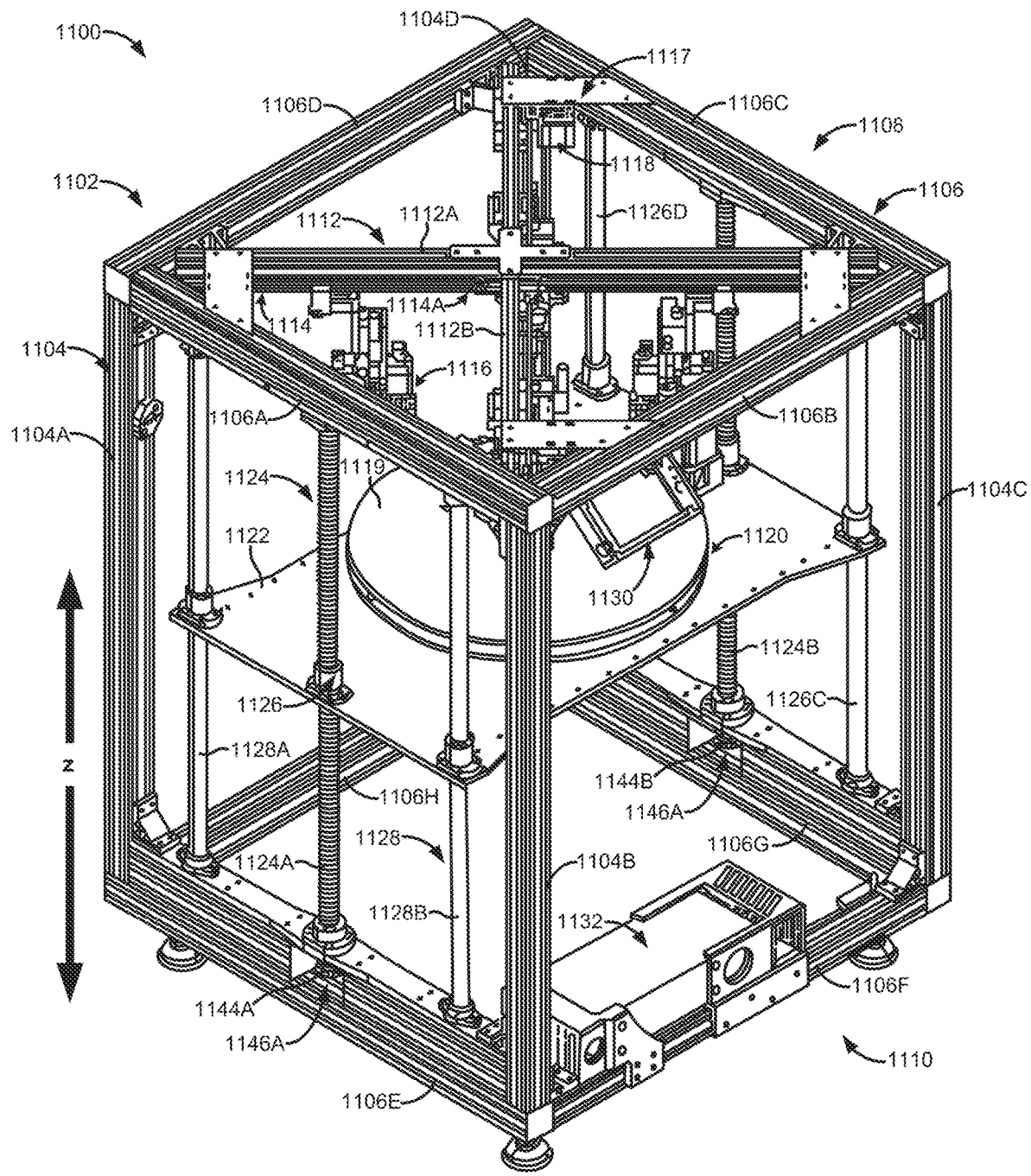
FIG. 11A illustrates a perspective view of another embodiment of a cylindrical-coordinate 3D printer.

FIG. 11A illustrates a perspective view of another embodiment of a cylindrical-coordinate 3D printer 1100. The 3D printer 1100 can comprise a structural frame 1102 made in part of a plurality of rigid frame supports coupled to one another. The figures illustrate the cylindrical-coordinate 3D printer 1100 with an outer enclosure or a housing removed from the structural frame 1102 for ease of viewing. In some embodiments, the outer enclosure(s) or housing can be substantially cylindrical-shaped. In other embodiments, the outer enclosure or housing can be substantially shaped as an elongate polyhedron such as an elongate cuboid or rectangular prism, a pentagonal prism, a hexagonal prism, a heptagonal prism, or an octagonal prism.

In some embodiments, the structural frame 1102 can comprise a plurality of vertical frame supports 1104 including at least a first vertical frame support 1104A, a second vertical frame support 1104B, a third vertical frame support 1104C, and a fourth vertical frame support 1104D. The structural frame 1102 can also comprise a number of additional vertical frame supports 1104 interspersed in between the first vertical frame support 1104A, the second vertical frame support 1104B, the third vertical frame support 1104C, and the fourth vertical frame support 1104D.

The structural frame 1102 can also comprise a plurality of horizontal frame supports 1106. The plurality of horizontal frame supports 1106 can comprise four upper horizontal frame supports and four lower horizontal frame supports. The four upper horizontal frame supports can comprise a first upper horizontal frame support 1106A, a second upper horizontal frame support 1106B, a third upper horizontal frame support 1106C, and a fourth upper horizontal frame support 1106D.

The four lower horizontal frame supports can comprise a first lower horizontal frame support 1106E, a second lower horizontal frame support 1106F, a third lower horizontal frame support 1106G, and a fourth lower horizontal frame support 1106H.

The four upper horizontal frame supports can form part of a frame top 1108 serving as the top or upper portion of the structural frame 1102. The four lower horizontal frame supports can form part of a frame bottom 1110 serving as the bottom or lower portion of the structural frame 1102.

Figure 11B:
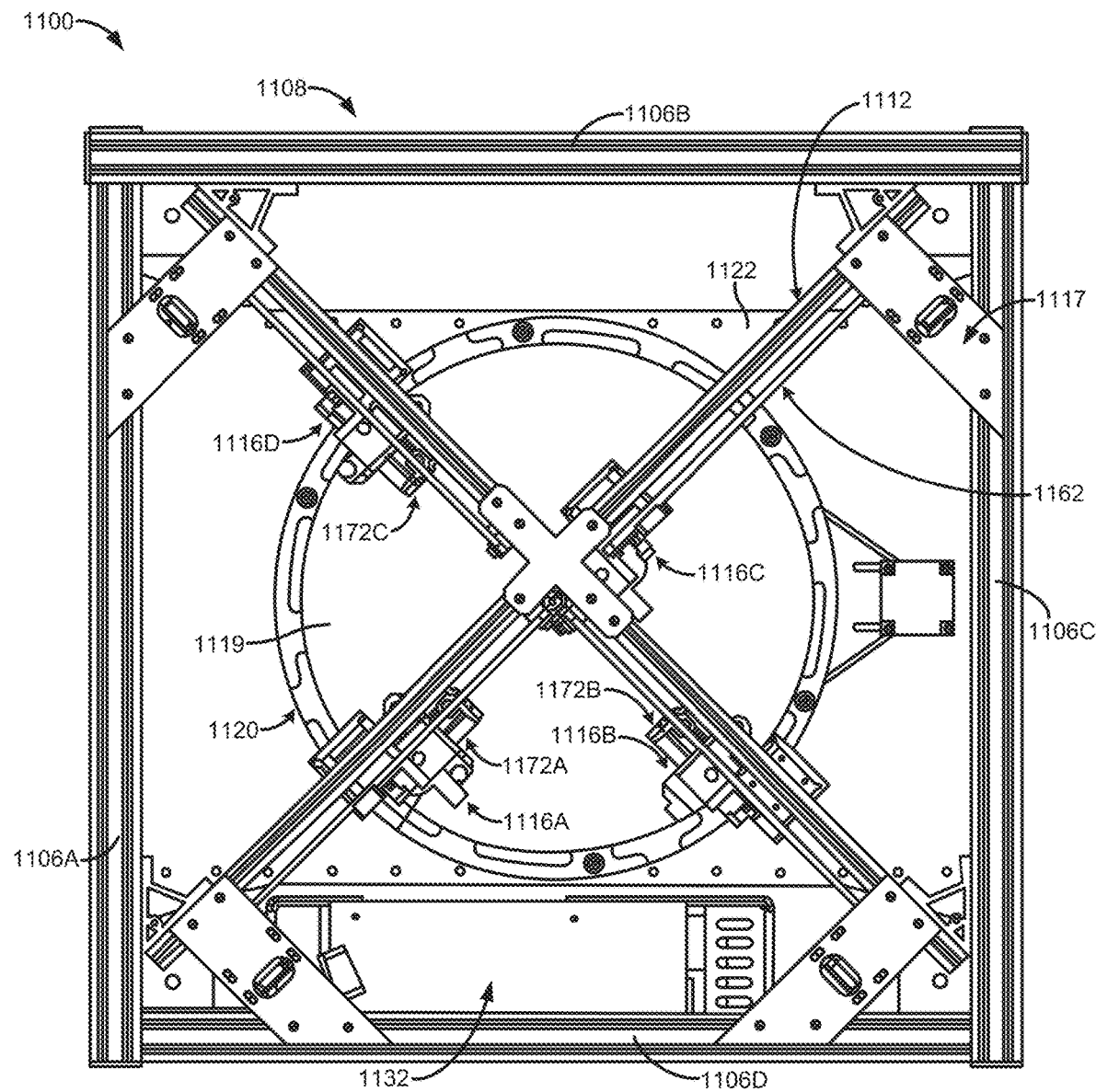
FIG. 11B illustrates a top plan view of the cylindrical-coordinate 3D printer.
Figure 11C:
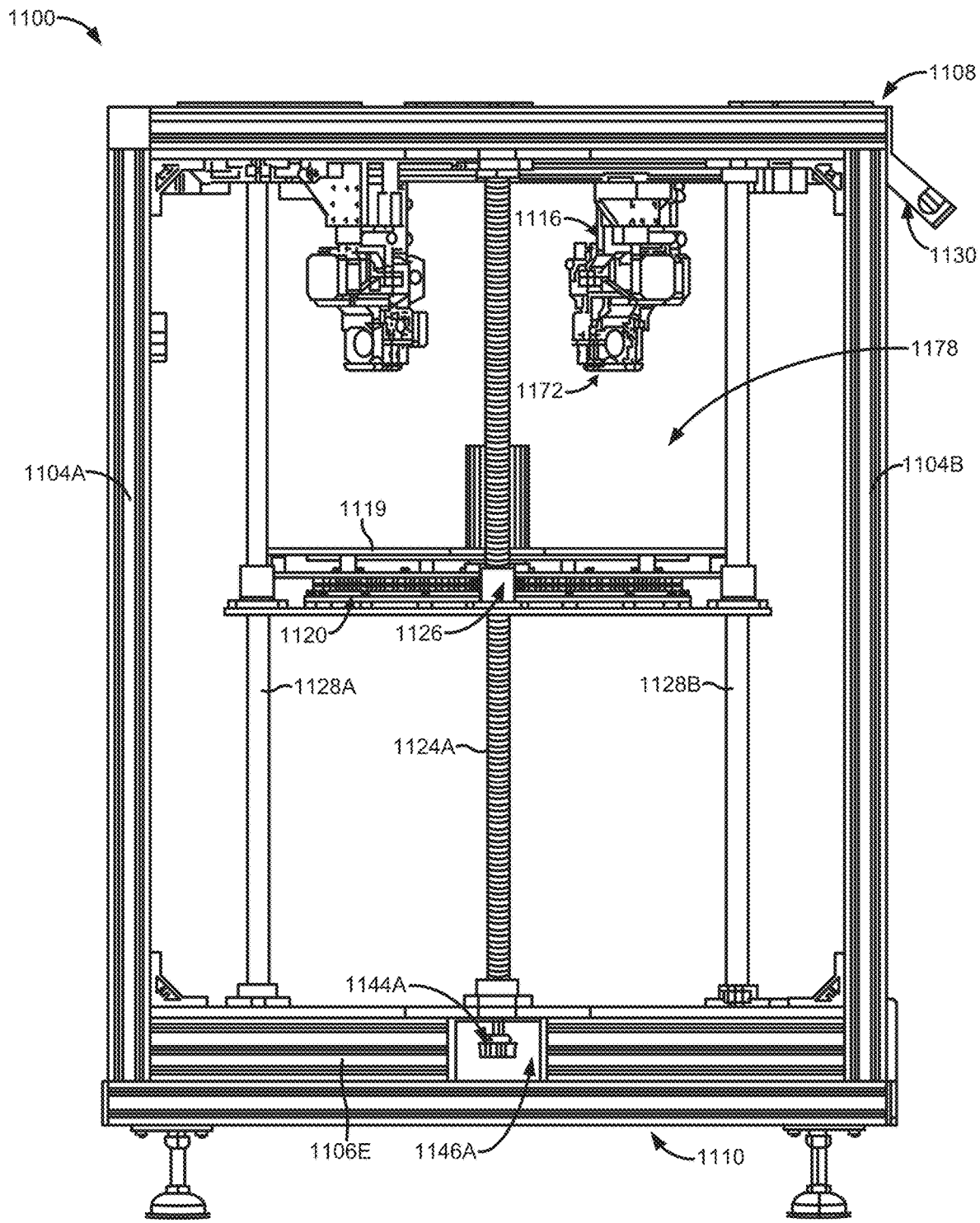
FIG. 11C illustrates a rear view of the cylindrical-coordinate 3D printer.

When the structural frame 1102 is shaped substantially as a cuboid or rectangular prism (as shown in FIGS. 11A-11C), the frame top 1108 and the frame bottom 1110 can be substantially square-shaped or rectangular-shaped. However, it is contemplated by this disclosure that the structural frame 1102 can also be shaped substantially as a cylinder or an elongate polyhedron having more than four sides. For example, the structural frame 1102 can be shaped substantially as an elongate pentagonal prism, hexagonal prism, heptagonal prism, or octagonal prism.

The structural frame 1102 can also comprise a plurality of rail frame supports 1112. The rail frame supports 1112 can be oriented diagonal to the frame top 1108 such that the rail frame supports 1112 connect opposite corners of the frame top 1108. The rail frame supports 1112 can form part of the frame top 1108. The rail frame supports 1112, in addition to serving as supports for the rails, can also serve as bracing supports for the structural frame 1102.

In certain embodiments, the structural frame 1102 can have a height dimension between about 120 cm to about 130 cm and length and width dimensions (if the top-down profile of structural frame 1102 is substantially a square or rectangle) of between about 45.0 cm to about 55.0 cm each.

The structural frame 1102 including any of the plurality of the vertical frame supports 1104, the horizontal frame supports 1106, the rail frame supports 1112, or a combination thereof can be made in part of a metallic material (e.g., aluminum, aluminum alloy, stainless steel, or a combination thereof), a polymeric material (such as a rigid plastic), or a combination thereof. For example, the structural frame 1102 including any of the plurality of the vertical frame supports 1104, the horizontal frame supports 1106, the rail frame supports 1112, or a combination thereof can be made in part of aluminum alloy 6005. As a more specific example, the structural frame 1102 including any of the plurality of the vertical frame supports 1104, the horizontal frame supports 1106, the rail frame supports 1112, or a combination thereof can be made in part of A6N01SS-T5 6005A-T5 aluminum alloy provided by Misumi Group Inc.

The plurality of vertical frame supports 1104, horizontal frame supports 1106, and rail frame supports 1112 can be fastened together by screws, nuts, bolts, ties, connectors, support plates, adhesives, or a combination thereof. In other embodiments, at least some of the vertical frame supports 1104, horizontal frame supports 1106, rail frame supports 1112, or a combination thereof can be welded together.

In the embodiment shown in FIGS. 11A-11C and 13A, the structural frame 1102 comprises two rail frame supports 1112 including a first rail frame support 1112A and a second rail frame support 1112B extending through a cutout or opening defined along a middle of the first rail frame support 1112A such that the second rail frame support 1112B crisscrosses the first rail frame support 1112A. As shown in FIGS. 11A-11C and 13A, the first rail frame support 1112A and the second rail frame support 1112B can be perpendicular. In other embodiments not shown in the figures, the first rail frame support 1112A and the second rail frame support 1112B can be non-perpendicular such that the first rail frame support 1112A is positioned at an angle (an oblique or non-right angle, i.e., an acute angle or an obtuse angle) with respect to the second rail frame support 1112B. In these embodiments, the frame top 1108 is not square-shaped.

In the case where the second rail frame support 1112B extends through a cutout or opening defined along the first rail frame support 1112A, the underside of the second rail frame support 1112B can be positioned vertically higher than the underside of the first rail frame support 1112A. In other embodiments not shown in the figures, the underside of the second rail frame support 1112B can be positioned substantially at the same height or flush with the underside of the first rail frame support 1112A.

In additional embodiments, the structural frame 1102 can comprise four rail frame supports 1112 coupled to a central frame support or column. For example, each of the rail frame supports 1112 can be coupled to the central frame support or column at a radially-innermost end of the rail frame support 1112 and coupled to a vertical frame support 1104 at a radially-outermost end of the rail frame support 1112.

The 3D printer 1100 can also comprise a plurality of gantry rails 1114. For example, the 3D printer 1100 can comprise two gantry rails 1114 including a first gantry rail 1114A and a second gantry rail 1114B (see, e.g., FIG. 13A). The gantry rails 1114 can be affixed or otherwise coupled to the underside of the rail frame supports 1112. For example, the first gantry rail 1114A can be affixed or otherwise coupled to the underside of the first rail frame support 1112A and the second gantry rail 1114B can be affixed or otherwise coupled to the underside of the second rail frame support 1112B.

As previously discussed, the second rail frame support 1112B can extend through a cutout or opening defined along the first rail frame support 1112A. In this embodiment, the second gantry rail 1114B can also extend through the cutout or opening defined along the first rail frame support 1112A. Moreover, in this embodiment, the underside of the second rail frame support 1112B is positioned vertically higher than the underside of the first rail frame support 1112A and the second gantry rail 1114B is also positioned vertically higher than the first gantry rail 1114A.

In some embodiments, the first gantry rail 1114A and the second gantry rail 1114B can each have a rail length of between about 650 mm to about 850 mm. In other embodiments, the first gantry rail 1114A and the second gantry rail 1114B can each have a rail length of less than about 650 mm or greater than about 850 mm. The rail lengths can vary depending on the size of the structural frame 1102.

The 3D printer 1100 can further comprise a plurality of gantry carriers 1116 configured to move radially inward and outward along the gantry rails 1114. Each of the gantry carriers 1116 can be configured to hold a printhead or a hotend of an extruder assembly. The printheads or hotends and extruder assemblies will be discussed in more detail in the following sections.

The gantry carriers 1116 can be coupled to the gantry rails 1114 via slidable carriages 1195 (see, e.g., FIGS. 14A, 14B, 15A, and 15B for a better view of the slidable carriages 1195). For example, each of the gantry carriers 1116 can have its own slidable carriage 1195 slidably coupled to the gantry rails 1114. In some embodiments, the slidable carriages 1195 can slide along the gantry rails 1114 on metallic ball bearings. In other embodiments, the slidable carriages 1195 can slide along the gantry rails 1114 on other types of bearings or interfaces.

Figure 13A:
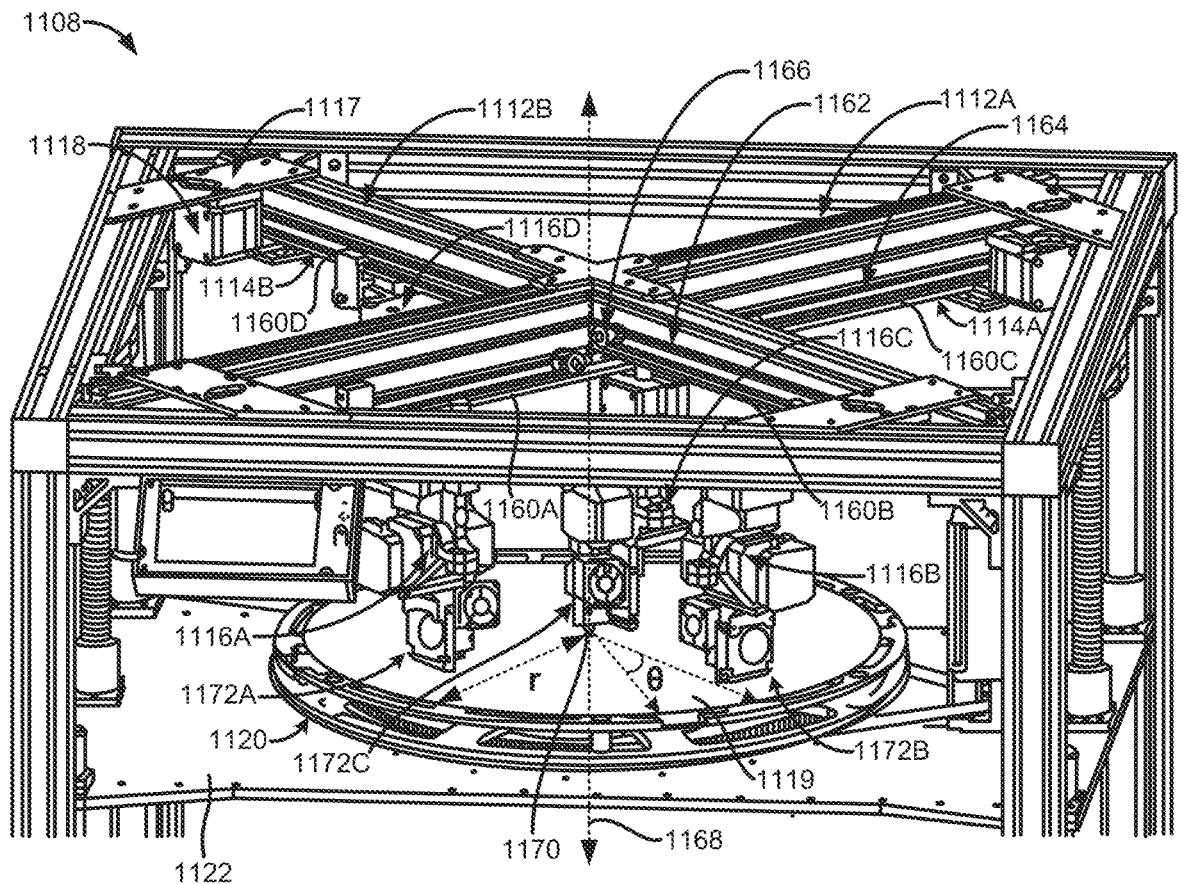
FIG. 13A illustrates a perspective view of a plurality of printheads of the cylindrical-coordinate 3D printer printing on a rotatable printbed with a nozzle of one of the printheads at the center of the printbed.

Movement of the gantry carriers 1116 can be controlled by gantry motors 1118 coupled to a plurality of belt drives 1162 (see, e.g., FIGS. 11B and 13A). Some of the belt drives 1162, including some of the pulleys and belts, are not shown in FIGS. 11A-11C to avoid over complicating the figures. Portions of such belt drives 1162 are shown in FIGS. 11B, 13A, and 15B.

In some embodiments, the gantry motors 1118 can be coupled to brace plates 1117 or struts extending between the horizontal frame supports 11106 and the rail frame supports 1112. The gantry motors 1118 can be positioned near the corners of the frame top 1108.

FIGS. 11A-11C also illustrate that the gantry carriers 1116 can be positioned vertically above a printbed 1119 supported by a rotatable printbed support assembly 1120. The printbed support assembly 1120 can be configured to rotate in a clockwise rotational direction or a counterclockwise rotational direction. As will be discussed in more detail in the following sections, rotation of the printbed support assembly 1120 can be controlled by a motorized belt drive mechanism comprising a printbed motor, a printbed drive pulley, and a timing belt.

The entire printbed support assembly 1120 can be supported by a base plate 1122. The base plate 1122 can be vertically translatable (e.g., up or down), that is, translatable in a z-direction (as shown in FIG. 11A).

Figure 16A:
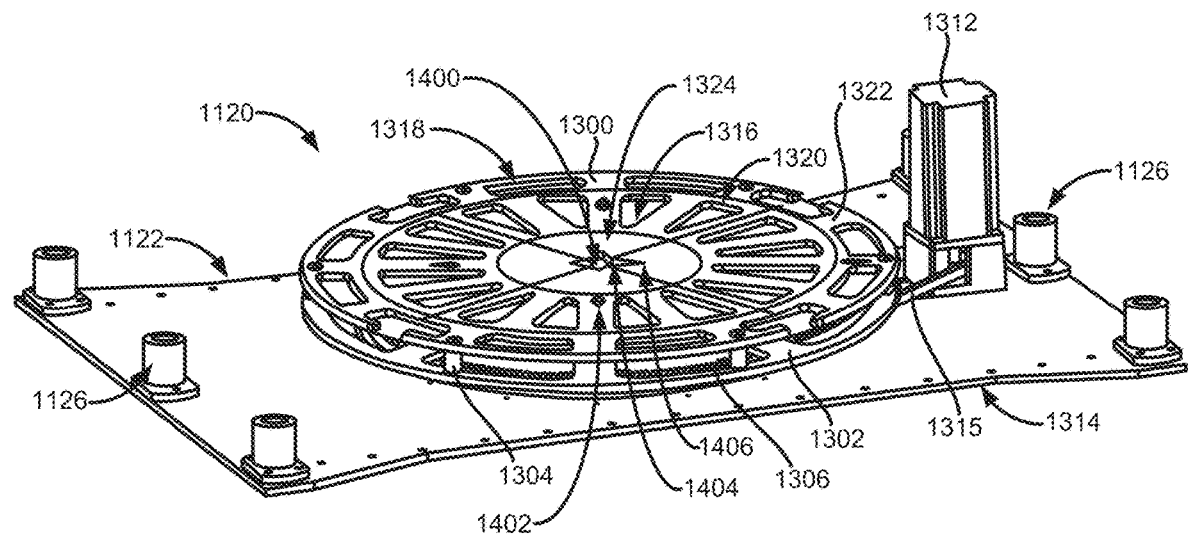
FIG. 16A illustrates an embodiment of a printbed support assembly of the cylindrical-coordinate 3D printer supported by a base plate.

The base plate 1122 can be a rigid plate or layer designed to hold the printbed support assembly 1120 and the motorized belt drive mechanism. As shown in FIGS. 11A and 16A, the base plate 1122 can be substantially rectangular with corners that jut out or flare out. For example, each of the corners of the base plate 1122 can be substantially shaped as right-angle trapezoids. In other embodiments not shown in the figures but contemplated by this disclosure, the base plate 1122 can be entirely rectangular, substantially oval, or circular.

The base plate 1122 can comprise numerous cutouts, cavities, or holes defined along the surface of the base plate 1122 to reduce the weight of the base plate 1122 but still retain its rigidity. In other embodiments not shown in the figures but contemplated by this disclosure, the base plate 1122 can be formed from interconnecting or overlapping strips or planks.

The base plate 1122 can have a plate length and a plate width as measured along the wider ends of the base plate 1122. In some embodiments, the plate length can be between approximately 650 mm to about 800 mm (e.g., about 728 mm). In these and other embodiments, the plate width can be between approximately 450 mm to about 600 mm (e.g., about 510 mm).

The base plate 1122 can also have a plate thickness. The plate thickness can be between approximately 5.0 mm to about 8.0 mm. In some embodiments, the plate thickness can be about 6.00 mm. The dimensions of the base plate 1122 can be increased or decreased based on the size of the structural frame 1102.

The base plate 1122 can be made of a rigid metal or metal alloy such as aluminum 6061. In other embodiments, the base plate 1122 can be made in part of stainless steel. In further embodiments, the base plate 1122 can be made of a rigid polymeric material.

The base plate 1122 can be actuated in the z-direction (vertically upward or downward) using a plurality of mechanical linear actuators that translate rotational motion to linear motion with minimal friction. In the embodiments shown in FIGS. 11A-11C, the mechanical linear actuators can comprise two rotatable lead screws 1124.

The base plate 1122 can be vertically translatable (i.e., in the z-direction) via a first rotatable lead screw 1124A and a second rotatable lead screw 1124B. The two lead screws 1124 can extend through the base plate 1122 and be coupled to the base plate 1122 via flanged mating nuts 1126. The mating nuts 1126 can be lead screw nuts with internal threads complementary to the threads on the lead screws 1124. For example, the lead screws 1124 can have a trapezoidal thread profile. In other embodiments, the lead screws 1124 can have a square thread profile or a buttress thread profile.

In some embodiments, the mating nuts 1126 can be made in part of brass. In other embodiments, the mating nuts 1126 can be made in part of bronze. In these and other embodiments, the lead screws 1124 can be made in part of carbon steel, stainless steel, or aluminum.

The flange part of the mating nuts 1126 can have throughholes or mounting holes to allow for mounting or fastening to the base plate 1122.

The first rotatable lead screw 1124A and the second rotatable lead screw 1124B can be positioned on opposite sides of the base plate 1122. For example, as shown in FIGS. 11A and 13A, the first rotatable lead screw 1124A and the second rotatable lead screw 1124B can be positioned on opposite shorter sides of the base plate 1122 (e.g., along a midpoint of the shorter side) such that the two lead screws 1124 are separated by a length or almost a length of the base plate 1122.

The lead screws 1124 can have a length dimension between about 500 mm to about 800 mm. In other embodiments, the length of the lead screws 1124 can be less than 500 mm or greater than 800 mm depending on the overall dimensions of the 3D printer 1100.

In other embodiments, the mechanical linear actuators can comprise ball screw mechanisms rather than lead screw mechanisms. For example, the ball screw mechanisms can comprise the ball screw mechanism 136 previously disclosed. In further embodiments, the base plate 1122 can be actuated in the z-direction using a threadless ball screw mechanism, pneumatic actuators, or hydraulic lifting mechanisms.

FIGS. 11A-11C also illustrate that the 3D printer 1100 can also comprise at least four stabilizing rods 1128 extending through the base plate 1122. The stabilizing rods 1128 can comprise a first stabilizing rod 1128A, a second stabilizing rod 1128B, a third stabilizing rod 1128C, and a fourth stabilizing rod 1128D. The stabilizing rods 1128 can be configured to stabilize and level the base plate 1122. The stabilizing rods 1128 can be smooth or have minimal surface texture such that the rods act as tracks or guides for the flanged nuts coupled to the base plate 1122. In some embodiments, the stabilizing rods 1128 can be positioned at and extend through the corners of the base plate 1122.

One technical problem faced by the applicant is how to vertically translate a rotatable printbed or printbed support assembly without the weight of the rotatable printbed or printbed support assembly (along with the in-progress 3D-printed object) causing the print surface or build surface to tilt or become uneven or unleveled. An uneven or unleveled print surface or build surface can affect the quality and accuracy of a 3D printing job, especially when printing intricate or difficult to print designs. One technical solution devised by the applicant is the vertically translatable base plate disclosed herein actuated by two lead screws positioned at opposite ends of the base plate and stabilized by a plurality of rods positioned at the corners of the base plate. One unexpected discovery made by the applicant is that the dual lead screw mechanism disclosed herein also reduced vibrational interference. Moreover, the additional stability and room provided by the base plate allowed the applicant to introduce a more elaborate printbed support assembly for supporting and rotating the printbed.

The 3D printer 1100 can comprise a detachable or removable printbed 1119 or build plate. The printbed 1119 or build plate can be detached or re-attached to the printbed support assembly 1120. For example, the printbed 1119 or build plate can be a metallic plate (e.g., a steel plate) or platen configured to be attached to the printbed support assembly 1120 via magnets. In other embodiments, the printbed 1119 or build plate can be configured to be attached to the printbed support assembly 1120 via clips, clasps, snaps, screws, or a combination thereof.

In some embodiments, a top surface of the printbed 1119 can be covered by a sticker, tape, or coating to improve adhesion of the printer filament to the printing surface. For example, the printbed 1119 can be covered by strips of painter's tape or a polyimide tape. In other embodiments, the top surface of the printbed 1119 can be covered by a polyetherimide (PEI) sheet.

As shown in FIGS. 11A-11C and 13A, the printbed 1119 can be substantially circular. In other embodiments, the printbed 1119 can be shaped as an oval, square, rectangle, or another type of polygon (e.g., octagon, decagon, dodecagon, etc.).

In some embodiments, the printbed 1119 can have a diameter between about 300 mm to about 500 mm. More specifically, the printbed 1119 can have a diameter between about 400 mm to about 460 mm. In alternative embodiments, the printbed 1119 can have a diameter between about 500 nm to about 700 nm. The diameter of the printbed 1119 can be adjusted based on the size of the structural frame 1102.

In some embodiments, the size of the printbed 1119 can exceed the size of the plate(s) or other structure(s) supporting the printbed 1119. For example, the diameter of the printbed 1119 can exceed or be substantially the same as the diameter of the plate(s) of the printbed support assembly 1120 (see, e.g., FIG. 11A). In other embodiments, the size of the printbed 1119 can be smaller than the size of the plate(s) or other structure(s) supporting the printbed 1119. For example, the diameter of the printbed 1119 can be smaller than the diameter of the upper support plate 1300 (see, e.g., FIGS. 11B and 13A) on which the printbed 1119 rests.

FIG. 11C illustrates a rear view of the cylindrical-coordinate 3D printer 1100. As shown in FIG. 11C, a frame cavity 1178 is defined within the structural frame 1102. The size of the frame cavity 1178 can depend on the size of the structural frame 1102 including the lengths of the vertical frame supports 1104 and the horizontal frame supports 1106. As previously discussed, the diameter of the printbed 1119 can be adjusted based on the size of the structural frame 1102.

In some embodiments, the cylindrical-coordinate 3D printer 1100 can print a 3D printed object having a maximum diameter or width of up to 350 mm. In further embodiments, the cylindrical-coordinate 3D printer 1100 can print a 3D printed object having a maximum diameter or width of up to 500 mm. In further embodiments, the cylindrical-coordinate 3D printer 1100 can print a 3D printed object having a maximum diameter or width of up to or exceeding 700 mm.

In some embodiments, the cylindrical-coordinate 3D printer 1100 can print a 3D printed object having a maximum height of up to 50 cm. In further embodiments, the cylindrical-coordinate 3D printer 1100 can print a 3D printed object having a maximum height of up to 65 cm. In further embodiments, the cylindrical-coordinate 3D printer 1100 can print a 3D printed object having a maximum height of up to or exceeding 75 cm.

In some embodiments, the cylindrical-coordinate 3D printer 1100 can print a 3D printed object having a maximum volume of up to 75,000 $cm^3$. In further embodiments, the cylindrical-coordinate 3D printer 1100 can print a 3D printed object having a maximum volume of up to 90,000 $cm^3$. In other embodiments, the 3D printer 1100 can print a 3D printed object having a maximum volume of up to 125,000 $cm^3$. In additional embodiments, the 3D printer 1100 can print a 3D printed object having a maximum volume of up to or greater than 125,000 $cm^3$.

It should be noted that for ease of viewing, certain wires, tubing, securement ties, and fasteners have been removed from the illustrations shown in certain figures. For example, all electrical wiring connecting the control unit 1130 or the power supply 1132 to the various electronic components have been removed for ease of viewing. Moreover, certain belts and belt drive components including pulleys have been removed from FIGS. 11A-11C and 13A to avoid overcomplicating the illustrations.

FIGS. 11A-11C also illustrate that the 3D printer 1100 can further comprise a control unit 1130 and power supply 1132. The control unit 1130 can be the same as the control unit 150 shown in the earlier figures.

The power supply 1132 can be configured to supply power to the control unit 1130 and the various motors and electronic components disclosed herein. In some embodiments, the power supply 1132 can be a switching or switched-mode power supply comprising a switching regulator for converting 110V/220V AC (mains) power to 12V DC for powering the various motors and electronic components. In some embodiments, the power supply 1132 can be a 400W switch-mode power supply. In these and other embodiments, the power supply 1132 can also comprise a portable power supply such as one or more batteries.

The control unit 1130 can comprise one or more processors, one or more memory units, and at least one wireless communication module for receiving commands and executable instructions from another device via a wireless communication protocol (e.g., WiFi, Bluetooth™, BLE, ZigBee, etc.). The control unit 1130 can be configured to simultaneously control the operation of the 3D printer's four gantry motors 1118, four extruder motors 1198, lead screw motor 1140, and printbed motor 1312. The one or more processors of the control unit 1130 can be programmed to execute instructions to allocate current to the four gantry motors 1118, the four extruder motors 1198, the lead screw motor 1140, and the printbed motor 1312 such that all motors can be in operation simultaneously. For example, the one or more processors of the control unit 1130 can be programmed to execute instructions to raise certain power thresholds for the four gantry motors 1118, the four extruder motors 1198, the lead screw motor 1140, and the printbed motor 1312.

In addition, the control unit 1130 can also control the heating of the printbed 1119 via one or more plates of the printbed support assembly 1120.

In some embodiments, the control unit 1130 can be a Duet 2™ 3D printer controller board (provided by Duet3D Ltd.) modified with a Duex 5™ expansion board. In these embodiments, the one or more processors can be 32-bit microprocessors. The wireless communication module can be an onboard WiFi chip supporting a number of WiFi communication protocols including the IEEE 802.11b protocol, the IEEE 802.11g protocol, the IEEE 802.11n protocol, or a combination thereof.

The memory units can comprise read-only memory (ROM), on-chip static random-access memory (SRAM), flash memory, or a combination thereof. Firmware instructions can be stored on one or more of the memory units to operate the one or more processors and the other electronic components of the 3D printer 1100. In some embodiments, the firmware instructions can be written in the C programming language, the C++ programming language, or a combination thereof.

Although not shown in FIGS. 11A-11C, it is contemplated by this disclosure that a plurality of filament spools (see, e.g., filament spools 118) can be positioned vertically above the frame top 1108. The filament spools can be exposed to allow detachment and replacement of the filament spools. The filament spools can be secured or held by spool shafts (see, e.g., spool shafts 116) coupled to any of the vertical frame supports 1104, the horizontal frame supports 1106 or a combination thereof. The spool shafts can also be secured or otherwise coupled to a central frame support.

Each of the plurality of spool shafts can be configured to carry or hold at least one rotatable filament spool. For example, the 3D printer 1100 can comprise four spool shafts with each spool shaft configured to hold one rotatable filament spool. In other embodiments, each of the spool shafts can be configured to carry or hold multiple filament spools.

Moreover, at least one spool shaft can be secured or otherwise coupled to a segment of a vertical frame support 1104 protruding above the frame top 1108. In this embodiment, the filament spools can be positioned at the corners of the structural frame 1102.

In certain embodiments, each of the filament spools can be a 1 kg (or 2.2 pound) spool comprising a thermoplastic filament wound around the spool. The filament spools can have a spool diameter of between about 18-20 cm, a spool width of between about 5.0 to 7.0 cm, and spool hub diameter of between about 5.0 cm to about 6.0 cm. The length of the 3D printing filament wound around the spool can be about 335 m. The 3D printing filament can have a cross-sectional filament diameter of approximately 1.75 mm. In other embodiments, the 3D printing filament can have a cross-sectional filament diameter of approximately 2.85 mm.

The filament spools can be exposed to allow detachment and replacement of the filament spools. In addition, the filament spools can be exposed to allow an operator to untangle any filament which has become tangled on the spools. A filament spool can be detached from a spool shaft when an operator pinches a terminal end of the spool shaft and slides the filament spool off of a pinched end of the spool shaft. Similarly, an operator can attach a filament spool to a spool shaft by pinching the terminal end of the spool shaft and sliding a filament spool onto a pinched end of the spool shaft.

The filament spools can be spools of any type of thermoplastic appropriate for FDM or FFF printing. For example, any of the following types of thermoplastic filaments can be used with the cylindrical-coordinate 3D printer 100 disclosed herein: polylactic acid (PLA), nylon or polyamide (PA) including PA 6, PA 11, or PA 12, acrylonitrile butadiene styrene (ABS), polystyrene (PS), high-impact polystyrene (HIPS), polycarbonate (PC), thermoplastic polyurethane (TPU), polyethylene terephthalate glycol (PETG), poly(ethylene-co-trimethylene terephthalate) (PETT), polypropylene (PP), polyetherether ketone (PEEK), polyether imide (PEI), polyphenylene ether (PPE), and polyvinyl chloride (PVC). It should be understood by one of ordinary skill in the art that although the above filaments are mentioned, other types of thermoplastic filaments can also be compatible with the cylindrical-coordinate 3D printer 1100.

Figure 12:
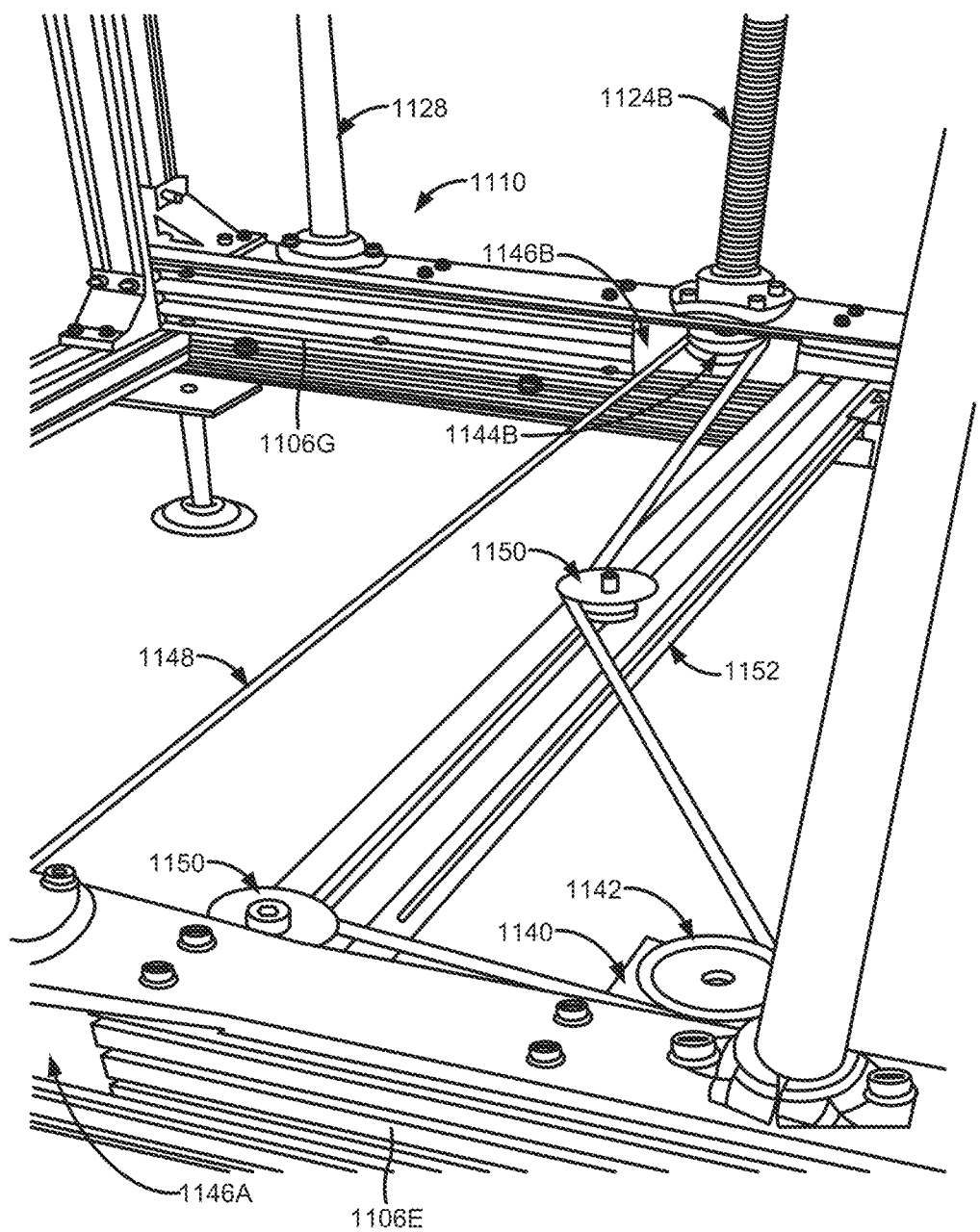
FIG. 12 illustrates a lead screw actuating mechanism comprising a lead screw motor, a lead screw drive pulley, a lead screw belt, and a plurality of lead screw pulleys.

FIG. 12 illustrates certain components used to drive rotation of the lead screws 1124. As previously discussed, rotation of the lead screws 1124 vertically translates the base plate 1122 holding the printbed support assembly 1120 used to support the printbed 1119 or build plate.

As shown in FIG. 12, a lead screw motor 1140 can power and rotate a lead screw drive pulley 1142 coupled to at least part of the lead screw motor 1140. In the example embodiment shown in FIG. 12, a single lead screw motor 1140 powers the rotation of the lead screws 1124.

The lead screw motor 1140 can be a stepper motor. For example, the lead screw motor 1140 can be a high-torque NEMA 23 or NEMA 24 bipolar stepper motor having a step angle of approximately 1.8 degrees and a holding torque of between about 2.40 Newton-meter (N-m) and 3.5 N-m.

The lead screw motor 1140 can be coupled to at least part of the frame bottom 1110. For example, the lead screw motor 1140 can be coupled or mounted to at least part of a lower horizontal frame support 1106. In other embodiments, the lead screw motor 1140 can be coupled or mounted to a plate, brace, and/or strut extending from one of the lower horizontal frame supports 1106.

The first rotatable lead screw 1124A can have a first lead screw pulley 1144A coupled to a lower end of the lead screw (see, e.g., FIGS. 11A and 11C). As shown in FIGS. 11A and 12, the second rotatable lead screw 1124B can have a second lead screw pulley 1144B coupled to a lower end of the lead screw.

The first lead screw pulley 1144A and the second lead screw pulley 1144B can be positioned within cutouts or openings defined along the lower horizontal frame supports 1106. For example, the first lead screw pulley 1144A can be positioned within a first frame cutout 1146A defined along the first lower horizontal frame support 1106E. The second lead screw pulley 1144B can be positioned within a second frame cutout 1146B defined along the third lower horizontal frame support 1106G.

A lead screw belt 1148 (e.g., a toothed belt or timing belt) can loop around or link at least the lead screw drive pulley 1142, the first lead screw pulley 1144A, and the second lead screw pulley 1144B. The lead screw belt 1148 can also be looped around or tensioned by one or more idler pulleys 1150. As shown in FIG. 12, the lead screw belt 1148 can be tensioned by two idler pulleys 1150 mounted or otherwise coupled to a support bar 1152 connecting the first lower horizontal frame support 1106E to the third lower horizontal frame support 1106G. In some embodiments, the two idler pulleys 1150 can be positioned substantially longitudinally aligned along the support bar 1152.

In other embodiments, the two idler pulleys 1150 can be positioned on separate support bars or on support bars extending diagonally across the frame bottom 1110. In further embodiments, the lead screw belt 1148 can be tensioned by three or more idler pulleys.

Moreover, FIG. 12 also illustrates that the lead screw motor 1140 and the lead screw drive pulley 1142 can be positioned laterally offset from the idler pulleys 1150 and even further laterally offset from the first lead screw pulley 1144A and the second lead screw pulley 1144B.

The lead screw drive pulley 1142 can drive the rotation of the first lead screw pulley 1144A and the second lead screw pulley 1144B via the lead screw belt 1148. One advantage of the lead screw drive mechanism disclosed herein is that both lead screws are able to be rotated by a single motor (which conserves power and is easier to control). Moreover, the applicant discovered that the lead screw drive mechanism disclosed herein rotates the lead screws without perturbing the base plate 1122 and/or the printbed support assembly 1120 (e.g., vibrating or shaking the base plate 1122 and/or the printbed support assembly 1120) to an extent that affects the print quality of the 3D printed object. Moreover, the lead screw drive mechanism disclosed herein is lightweight and does not add unnecessary weight to the 3D printer.

At least some of the lead screw motor 1140, the lead screw drive pulley 1142, the lead screw belt 1148, the support bar 1152, and the idler pulleys 1150 are not shown in FIGS. 11A-11C for ease of viewing. It is contemplated by this disclosure that the 3D printer 1100 can operate with a different version of the lead screw drive mechanism disclosed herein such as motors coupled directly to the lead screws.

FIG. 13A illustrates that the first gantry rail 1114A can be comprised of a first rail segment 1160A and a third rail segment 1160C. The first rail segment 1160A and the third rail segment 1160C can refer to different segments or portions of the same gantry rail (e.g., the first gantry rail 1114A). The first rail segment 1160A and the third rail segment 1160C can be collinear.

FIG. 13A also illustrates that the second gantry rail 1114B can be comprised of a second rail segment 1160B and a fourth rail segment 1160D. The second rail segment 1160B and the fourth rail segment 1160D can refer to different segments or portions of the same gantry rail (e.g., the second gantry rail 1114B). The second rail segment 1160B and the fourth rail segment 1160D can be collinear.

The first rail segment 1160A, the second rail segment 1160B, the third rail segment 1160C, and the fourth rail segment 1160D can be positioned above the printbed 1119 and the printbed support assembly 1120. Moreover, the first rail segment 1160A, the second rail segment 1160B, the third rail segment 1160C, and the fourth rail segment 1160D can be aligned substantially radially with the printbed 1119 and the printbed support assembly 1120.

The first rail segment 1160A and the third rail segment 1160C can be substantially perpendicular to the second rail segment 1160B and the fourth rail segment 1160D.

The 3D printer 1100 can further comprise a plurality of gantry carriers 1116 including a first gantry carrier 1116A, a second gantry carrier 1116B, a third gantry carrier 1116C, and a fourth gantry carrier 1116D (see, e.g., FIG. 11B). Each of the gantry carriers 1116 can comprise a slidable carriage 1195 positioned at the top of each gantry carrier 1116. The gantry carriers 1116 can be coupled to the gantry rails 1114 via the slidable carriages 1195 (see, e.g., FIGS. 14A, 14B, 15A, and 15B for better views of the slidable carriages 1195).

The gantry carriers 1116 can be configured to move along the rails or rail segments. For example, the first gantry carrier 1116A can be configured to move along the first rail segment 1160A, the second gantry carrier 1116B can be configured to move along the second rail segment 1160B, the third gantry carrier 1116C can be configured to move along the third rail segment 1160C, and fourth gantry carrier 1116D can be configured to move along the fourth rail segment 1160D.

Movement of the gantry carriers 1116 can be controlled by the gantry motors 1118. Each of the gantry carriers 1116 can have its own gantry motor 1118. The gantry motors 1118 can power belt drives 1162 used to move or translate the gantry carriers 1116. Each of the belt drives 1162 can comprise a drive pulley powered by the gantry motor 1118, a timing belt 1164, and at least one idler pulley 1166.

In some embodiments, the gantry motors 1118 can be stepper motors. For example, the gantry motors 1118 can be 2-phase bipolar stepper motors. As a more specific example, the gantry motors 1118 can be NEMA 17 PKP series 2-phase bipolar stepper motor having a basic step angle of approximately 1.8 degrees and a holding torque of between about 0.40 and 0.50 N-m.

The gantry motors 1118 and the belt drives 1162 (including the various pulleys and timing belts) can work together to control the incremental or stepped movement of the gantry carriers 1116 along the gantry rails 1114. The gantry motors 1118 and the belt drives 1162 can work together to control the incremental or stepped movement of the gantry carriers 1116 in a radial direction (shown in FIG. 13A as "r") with respect to the printbed 1119 and the printbed support assembly 1120.

The printbed 1119 and the printbed support assembly 1120 can be configured to rotate in a clockwise rotational direction or a counterclockwise rotational direction. The printbed 1119 and the printbed support assembly 1120 can be configured to rotate about a rotational axis 1168 extending through a rotational origin or center point 1170 of the printbed support assembly 1120.

Angular rotation of the printbed 1119 and the printbed support assembly 1120 about its rotational axis 1168 is shown using the symbol "θ" in FIG. 13A. As will be discussed in more detail in the following sections, rotation of the printbed support assembly 1120 is controlled by a pulley mechanism.

The control unit 1130 can control the movement of the gantry carriers 1116 in the radial direction (r), the upward and downward movement of the printbed support assembly 1120 in the z-direction, and the angular rotation (θ) of the printbed support assembly 1120. In this manner, the 3D printer 1100 can print 3D objects on the printbed 1119 by relying on a cylindrical-coordinate system (r, z, and θ) rather than a traditional 3-axis Cartesian-coordinate system.

Each of the gantry carriers 1116 can be configured to hold, carry, or support at least a printhead 1172 or hotend. As will be discussed in more detail in the following sections, each of the gantry carriers 1116 can also be configured to hold, carry, or support an extruder motor 1198 and an extruder 1196. The gantry carrier 1116 can carry or support the printhead 1172 by serving as a mount or mounting platform for the printhead 1172. For example, the printhead 1172 or a part thereof can be mounted to part of the gantry carrier 1116 via screws, nuts, bolts, clips, adhesives, or a combination thereof.

The first gantry carrier 1116A can be configured to hold, carry, or support a first printhead 1172A, the second gantry carrier 1116B can be configured to hold, carry, or support a second printhead 1172B, the third gantry carrier 1116C can be configured to hold, carry, or support a third printhead 1172C, and the fourth gantry carrier 1116D can be configured to hold, carry, or support a fourth printhead 1172D.

The first printhead 1172A, the second printhead 1172B, the third printhead 1172C, and the fourth printhead 1172D can all reach and print to the center point 1170. For example, the nozzles of the first printhead 1172A, the second printhead 1172B, the third printhead 1172C, and the fourth printhead 1172D can all reach and print to the center point 1170.

The printhead 1172 can print to the center point 1170 even when the gantry carrier 1116 or at least part of the gantry carrier 1116 does not reach the center point 1170. As will be discussed in more detail in the following sections, the nozzle of the printhead 1172 can be positioned laterally offset/shifted or more radially inward from the carrier body 1190 (see, e.g., FIGS. 14A and 14B) of the gantry carrier 1116. This allows the nozzle 1200 of the printhead 1172 to reach the center point 1170 before the gantry carrier 1116 reaches the center point 1170.

In some embodiments, the center point 1170 can be or refer to a calculated center point or a center point determined by the software or firmware running on the 3D printer 1100. For example, a point on the printbed support assembly 1120 or printbed 1119 can be considered the "center point" when a point is substantially near a center of the printbed support assembly 1120 or printbed 1119 but not the actual center of printbed support assembly 1120 or printbed 1119.

All four printheads 1172 of the cylindrical-coordinate 3D printer 1100 can operate concurrently or simultaneously. The four printheads 1172 can print a 3D printed object directly on the printbed 1119. Each of the four printheads 1172 can be moved radially (e.g., radially inward or radially outward) with respect to the circular printbed 1119 to deposit a layer of melted filament on either a surface of the printbed 1119 or on an existing layer of the 3D printed object.

Figure 13B:
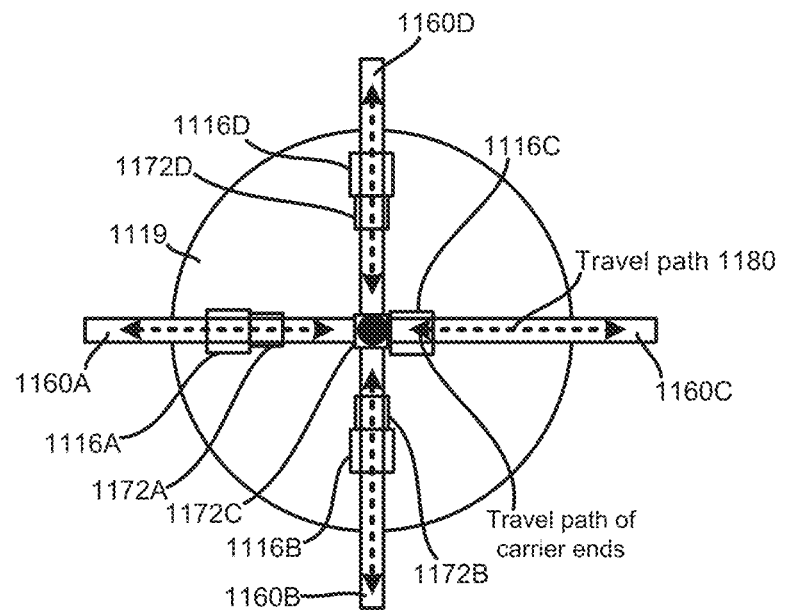
FIG. 13B illustrates example travel paths of gantry carriers of the cylindrical-coordinate 3D printer.

FIG. 13B is a schematic diagram illustrating that, in some embodiments, the travel paths 1180 of the gantry carriers 1116 along the rail segments ends prior to reaching the center point 1170. However, the printheads 1172 are still able to reach and print to the center point 1170 since the nozzle of the printhead 1172 can be positioned laterally offset/shifted or more radially inward of the carrier body of the gantry carrier 1116.

Endstops can be positioned at or in proximity to the radially outer ends of the gantry rails 1114 or rail frame supports 1112 to prevent the gantry carriers 1116 from advancing past the endstops. For example, the endstops can be coupled to the radially outermost end of each rail frame support 1112 or gantry rail 1114. Moreover, the endstops can also be coupled to the gantry carriers 1116.

The endstops can be microswitches or electromechanical sensors having a mechanical lever arm that can be activated or switched closed when the gantry carrier 1116 causes the mechanical lever arm to physically contact a physical obstructions or barrier. The microswitch endstop can inform the control unit 1130 that a gantry carrier 1116 has reached its radial maximum or the end of its travel path.

In some embodiments, the physical obstructions or barriers can be silicone or rubber bumpers physically attached to the rails or frame supports. The physical obstructions or barriers can stop the gantry carriers 1116 and/or the slidable carriages 1195 from going past.

Figures 14A, 14B:
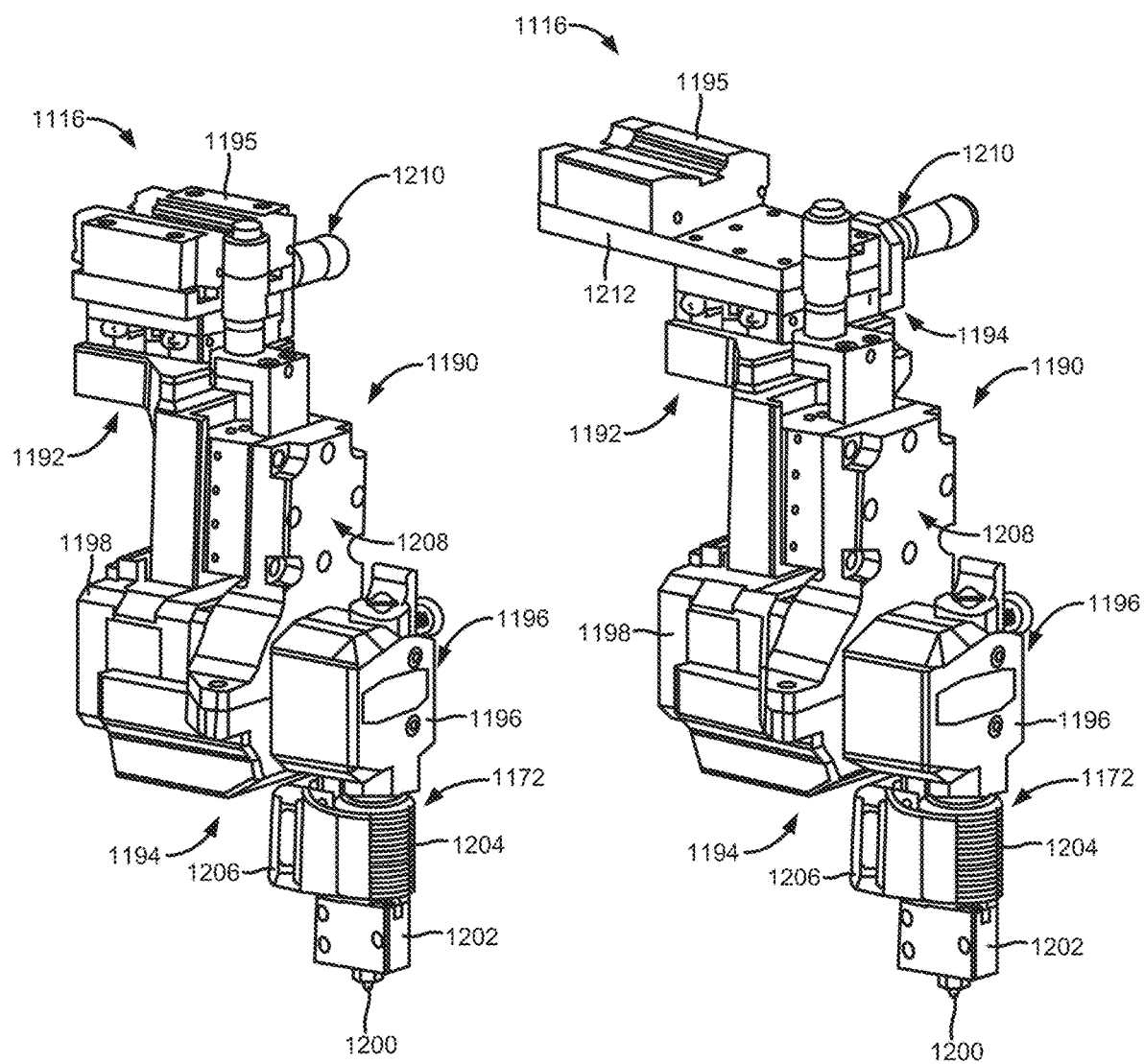
FIG. 14A illustrates one embodiment of a gantry carrier of the cylindrical-coordinate 3D printer configured to carry an extruder and a printhead.
FIG. 14B illustrates another embodiment of a gantry carrier of the cylindrical-coordinate 3D printer configured to carry an extruder and a printhead.

FIGS. 14A and 14B illustrate different embodiments of the gantry carrier 1116 of the cylindrical-coordinate 3D printer 1100. The gantry carrier 1116 can comprise a carrier body 1190 having a carrier top 1192 and a carrier bottom 1194. A slidable carriage 1195 can be coupled to the carrier top 1192.

The slidable carriage 1195 can be a carriage block configured to slide along the gantry rails 1114. The slidable carriages 1195 can comprise miniature ball bearings (e.g., stainless steel ball bearings) housed within the slidable carriages 1195. The ball bearings can serve as a friction-reducing interface between the gantry rail 1114 and the remainder of the slidable carriage 1195.

The carrier top 1192 can be positioned laterally offset or shifted from the remainder of the carrier body 1190 such that the carrier body 1190 is shaped substantially as an upside-down L or a mirror image of an upside-down L.

In other embodiments not shown in the figures, at least part of the carrier body 1190 can be curved. In further embodiments, at least part of the carrier body 1190 can be angled or tilted.

As shown in FIGS. 14A and 14B, an extruder 1196 and an extruder motor 1198 can be coupled or mounted to the carrier body 1190. For example, the extruder 1196 and the extruder motor 1198 can be coupled or mounted to the carrier bottom 1194.

In some embodiments, the carrier body 1190 can act as a mounting platform or moveable mount for the extruder 1196, the printhead 1172, and the extruder motor 1198. In these and other embodiments, the carrier body 1190 can comprise cutouts, cavities, arms, or other type of supports for accommodating the extruder 1196, the printhead 1172, the extruder motor 1198, or a combination thereof.

In some embodiments, the extruder 1196 can be a direct drive extruder. For example, the extruders 1196 shown in FIGS. 14A and 14B can be direct drive extruders. In these embodiments, the extruder 1196 can be coupled directly to the printhead 1172 or hotend.

The printhead 1172 can comprise a nozzle 1200, a heater block 1202, a heatsink 1204, a fan 1206, and a thermistor. The fan 1206 can be a 12V fan. The thermistor can be a negative temperature coefficient (NTC) thermistor. The nozzle 1200 and the heater block 1202 can be made of a metallic material such as brass or plated copper. The heatsink 1204 can be made in part of aluminum or an aluminum alloy.

The extruder 1196 and the printhead 1172 can be mounted or otherwise coupled or affixed to a lateral side 1208 of the carrier body 1190 such that the nozzle 1200 of the printhead 1172 is even more laterally offset/shifted from the carrier top 1192 than the rest of the carrier body 1190. The extruder motor 1198 can be mounted or otherwise coupled or affixed to the other lateral side of the carrier body 1190 opposite the lateral side 1208.

As previously discussed, the travel paths 1180 (see FIG. 13B) of the gantry carriers 1116 along the rail segments can end or terminate prior to reaching the center point 1170. However, the printheads 1172 are still able to reach and print to the center point 1170 of the printbed 1119 (see FIG. 13A) since the nozzle 1200 of the printhead 1172 can be positioned laterally offset or more radially inward of the carrier body 1190 of the gantry carrier 1116. In this way, the nozzles 1200 of the printheads 1172 are able to print to the center point 1170 even though the gantry carriers 1116 do not reach or travel to the center point 1170.

FIG. 14B illustrates that some gantry carriers 1116 can comprise a lateral extender 1212. In some embodiments, the slidable carriage 1195 can be coupled to a distal end of the lateral extender 1212. In other embodiments, the slidable carriage 1195 can be coupled to a mid-section or another portion of the lateral extender 1212. The lateral extender 1212 can be configured to further laterally offset or shift the slidable carriage 1195 away from the remainder of the carrier body 1190 and the nozzle 1200.

The gantry carrier 1116 shown in FIG. 14B can be slid along either the second rail segment 1160B or the fourth rail segment 1160D. The gantry carrier 1116 shown in FIG. 14A can be slid along either the first rail segment 1160A or the third rail segment 1160C. As previously discussed, the second rail segment 1160B and the fourth rail segment 1160D can be positioned vertically higher than the first rail segment 1160A and the fourth rail segment 1160C due to the second rail frame support 1112B being positioned vertically higher than the first rail frame support 1112A (see, e.g., FIG. 13A). Moreover, the gantry carriers 1116 on either the second rail segment 1160B or the fourth rail segment 1160D cannot travel as far (in a radially inward direction) as the gantry carriers 1116 on either the first rail segment 1160A or the third rail segment 1160C. As such, the lateral extender 1212 can allow the nozzle 1200 of the printhead 1172 coupled or mounted to the gantry carrier 1116 sliding along the second rail segment 1160B or the fourth rail segment 1160D to print to the center point 1170.

The gantry carriers 1116 can further comprise a plurality of micro-adjustment screws 1210. The micro-adjustment screws 1210 can be thumbscrews or tunable screws configured to allow an operator of the 3D printer 1100 to adjust a positioning or alignment of the gantry carriers 1116 and, by extension, the various components coupled or affixed to the gantry carriers 1116. The micro-adjustment screws 1210 can be used by the operator to adjust the positioning or alignment of the of the gantry carriers 1116 (and the various components coupled or affixed to the gantry carriers 1116) as part of an alignment procedure or initial set-up procedure. The alignment procedure will be discussed in more detail in the following sections.

As previously discussed, the extruders 1196 can be direct drive extruders. In these embodiments, the printheads 1172 can also be direct drive printheads or hotends. Moreover, the extruder motors 1198 are coupled to the carrier bodies 1190 in close proximity to the extruders 1196 to power the extruders 1196.

Since the extruder 1196 (with the help of the extruder motor 1198) can push filament directly to the nozzle 1200, the heated filament extruded is often of a higher-quality that filament extruded by other type of extruders. Moreover, direct drive extruders allow for a wider range of filaments to be used. For example, direct drive extruders are compatible with a wider range of filaments including flexible filaments and abrasive or metallic/metallic-infused filaments.

Moreover, one advantage of direct drive extruders and printheads is that the nozzle and heater block can be heated to a higher temperature, thereby opening up the range of filaments capable of being extruded. For example, when the extruders 1196 are direct drive extruders and the printheads 1172 are direct drive printheads, the cylindrical-coordinate 3D printer 1100 can print 3D objects using a thermoplastic polyurethane (TPU) filament. The 3D objects printed with the TPU filament can be flexible and elastic. Also, for example, when the extruders 1196 are direct drive extruders and the printheads 1172 are direct drive printheads, the cylindrical-coordinate 3D printer 1100 can print 3D objects using abrasive or metal-infused filaments such as copper-infused filament, bronze-infused filament, brass-infused filament, or stainless steel-infused filament. These metal-infused filaments can be made in part of a traditional polymeric filament (e.g., PLA) infused with fine metal powders.

In addition, the cylindrical-coordinate 3D printer 1100 can print 3D objects with filaments having a filament diameter of approximately 1.75 mm. Therefore, a technical advantage of the cylindrical-coordinate 3D printer 1100 is that the 3D printer can print with a wide range of filaments (including flexible and metal-infused filaments) and filaments with a smaller filament diameter (e.g., 1.75 mm versus 2.85 mm).

Although the cylindrical-coordinate 3D printer 1100 can print with 1.75 mm filament, it is contemplated by this disclosure that the printer 1100 can also print with 2.85 mm diameter filament.

The cylindrical-coordinate 3D printer 1100 can also print 3D objects with traditional thermoplastic filaments. For example, any of the following types of thermoplastic filaments can be used with the cylindrical-coordinate 3D printer 1100 disclosed herein: polylactic acid (PLA), clear or transparent PLA, nylon or polyamide (PA) including PA 6, PA 11, or PA 12, acrylonitrile butadiene styrene (ABS), polystyrene (PS), high-impact polystyrene (HIPS), polycarbonate (PC), thermoplastic polyurethane (TPU), polyethylene terephthalate glycol (PETG), poly(ethylene-co-trimethylene terephthalate) (PETT), polypropylene (PP), polyether ether ketone (PEEK), polyether imide (PEI), polyphenylene ether (PPE), and polyvinyl chloride (PVC). It should be understood by one of ordinary skill in the art that although the above filaments are mentioned, other types of thermoplastic filaments can also be compatible with the cylindrical-coordinate 3D printer 1100.

One technical problem faced by the applicants is that when the extruders 1196 are direct drive extruders, the extruder 1196 and the extruder motor 1198 (along with the printhead 1172) adds to the weight of each gantry carrier 1116, which can impede or burden the movement of the gantry carriers 1116 and introduce vibrational disturbance, thereby adversely affecting the quality of print jobs.

One technical solution devised by the applicants is to make the gantry carriers 1116 out of a stiff and sturdy material. In some embodiments, the gantry carriers 1116 can be made in part of a metallic alloy having a Young's modulus of at least 68 GPa. For example, the gantry carriers 1116 can be made in part of aluminum alloy 6061. The gantry carriers 1116 can also be made in part of aluminum alloy 7075, aluminum alloy 1100, or aluminum alloy 2024. In other embodiments, the gantry carriers 1116 can be made in part of metallic alloy having a Young's modulus of between about 68 GPa and 200 GPa. For example, the gantry carriers 1116 can be made in part of stainless steel or titanium alloy.

It has been discovered by the applicants that making the gantry carriers 1116 out of a metallic alloy having a Young's modulus of at least 68 GPa (e.g., aluminum alloy 6061) results in less vibrational disturbance or wobble and better quality print jobs overall.

In some embodiments, the gantry carriers 1116 can be machined using a Computer Numerical Control (CNC) machine. For example, the gantry carriers 1116 can be machined from sheets of aluminum alloy 6061.

In alternative embodiments, the extruders 1196 and the printheads 1172 can be Bowden-type extruders and Bowden-type printheads, respectively. In these embodiments, the extruders can be separated from the print heads and positioned above the printheads (e.g., on the rail frame supports 1112 or above).

Figure 15A:
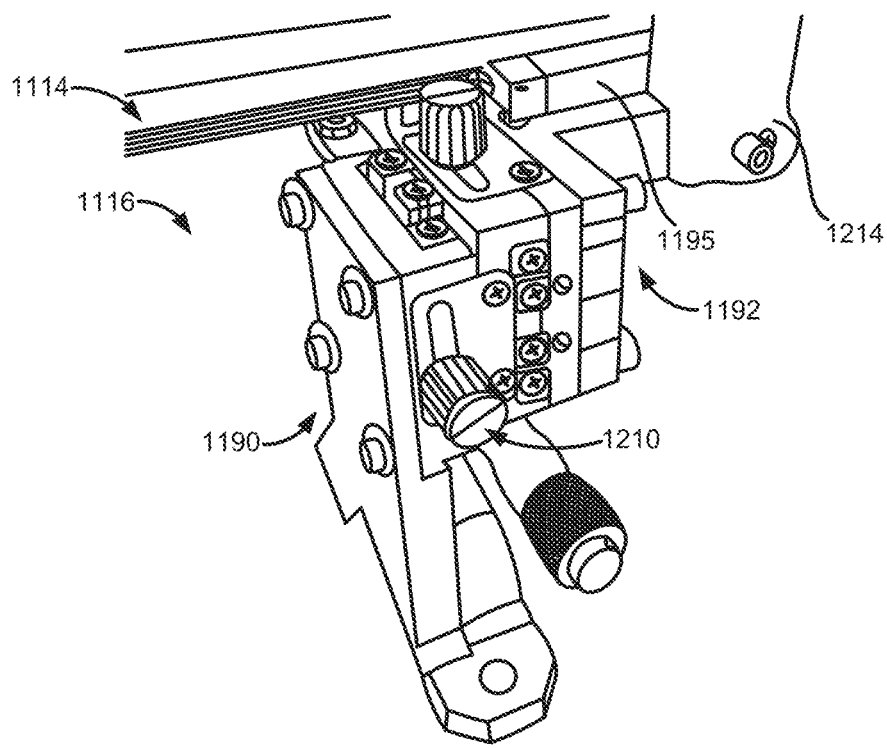
FIG. 15A illustrates a close-up view of another embodiment of a gantry carrier of the cylindrical-coordinate 3D printer.
Figure 15B:
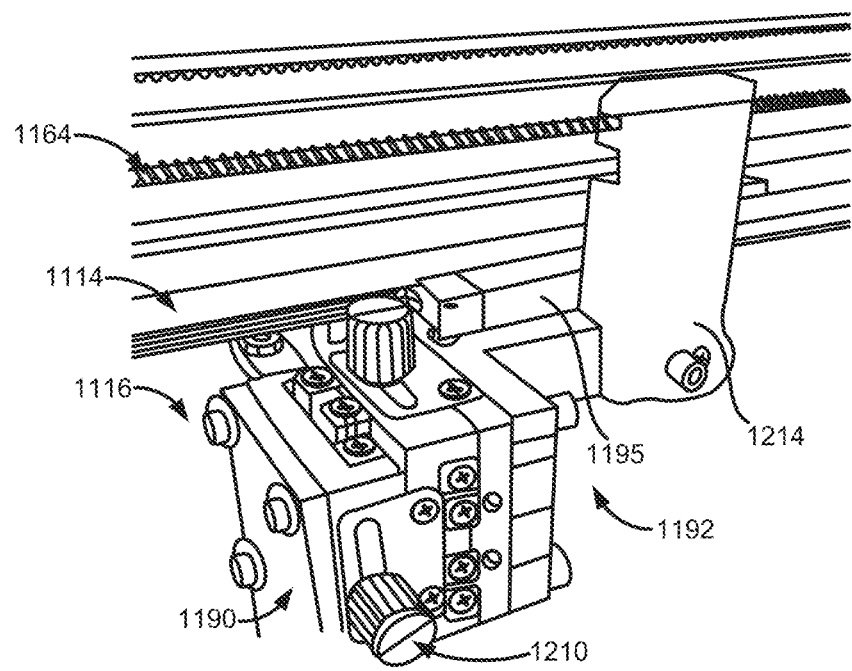
FIG. 15B illustrates a close-up view of the gantry carrier of FIG. 15A comprising a carrier belt arm attached to a timing belt.

FIGS. 15A and 15B illustrate close up views of another embodiment of a gantry carrier 1116 of the cylindrical-coordinate 3D printer 1100 without the extruder 1196, extruder motor 1198, or printhead 1172 mounted or coupled to the gantry carrier 1116.

The gantry carrier 1116 can have a carrier belt arm 1214 coupled to the carrier top 1192. For example, the carrier belt arm 1214 can be coupled to a portion of the carrier top 1192 under the slidable carriage 1195. In other embodiments, the carrier belt arm 1214 can be coupled to the slidable carriage 1195 or to another part of the gantry carrier 1116. In further embodiments, the carrier belt arm 1214 can be part of the gantry carrier 1116 or integrated with the gantry carrier 1116.

The carrier belt arm 1214 can comprise a clamp or clip at the top of the carrier belt arm 1214 for clamping, clipping, or otherwise fastening to a timing belt 1164 above the slidable carriage 1195. The timing belts 1164 can be part of the belt drives 1162 driven by the drive pulleys powered by the gantry motors 1118 (see, e.g., FIG. 13A).

In some embodiments, the carrier belt arm 1214 can be made of the same material as the gantry carrier 1116 (e.g., a stiff metallic material such as aluminum alloy 6061). In other embodiments, the carrier belt arm 1214 can be made in part of a stiff polymeric material.

The timing belt 1164 can be released from the carrier belt arm 1214 to allow an operator to replace the timing belt 1164 or to clean or maintain the gantry carrier 1116 or components coupled to the gantry carrier 1116.

FIG. 16A illustrates an embodiment of a printbed support assembly 1120 of the cylindrical-coordinate 3D printer 1100 supported by a base plate 1122. The printbed support assembly 1120 can comprise an upper support plate 1300 configured to support or hold a detachable printbed 1119 (not shown in FIG. 16A, see, e.g., FIG. 13A) and a lower support plate 1302 positioned below the upper support plate 1300 and coupled to the upper support plate 1300 via a plurality of height-adjustable spacers 1304.

Figure 16B:
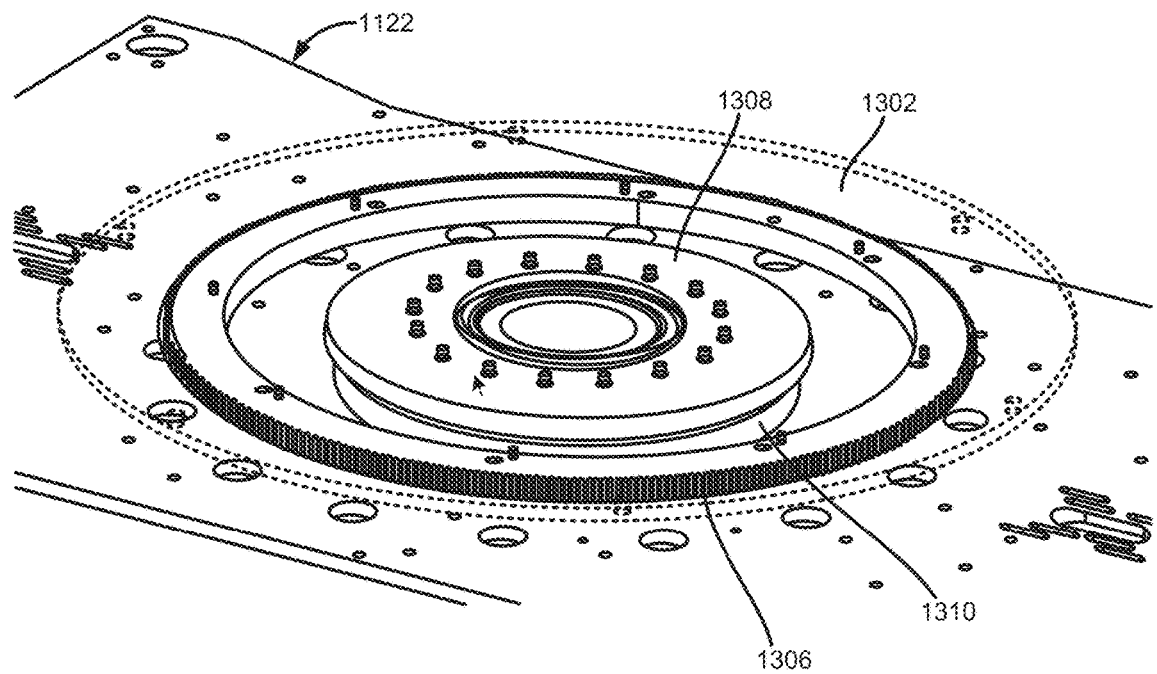
FIG. 16B illustrates the printbed support assembly of FIG. 16A with certain components removed to illustrate embodiments of a toothed gear plate, an upper bearing plate, and a lower bearing plate.

FIG. 16B illustrates additional components of the printbed support assembly 1120 with the upper support plate 1300 removed and the lower support plate 1302 shown in broken or phantom lines for ease of viewing. As shown in FIG. 16B, the printbed support assembly 1120 can also comprise a toothed gear plate 1306 positioned below the lower support plate 1302 and coupled to the lower support plate 1302, an upper bearing plate 1308 coupled to an underside of the lower support plate 1302, and a lower bearing plate 1310 coupled to the base plate 1122.

The upper bearing plate 1308 can be configured to swivel or rotate with respect to the lower bearing plate 1310 via bearings or another low-friction interface disposed in between the upper bearing plate 1308 and the lower bearing plate 1310. In some embodiments, the bearings can be rolling-element bearings such as ball bearings (e.g., stainless steel ball bearings) or rollers. In other embodiments, the bearings can be lubricated plain bearings, fluid bearings, or magnetic bearings.

FIG. 16A also illustrates that a printbed motor 1312 can be coupled or otherwise disposed on the base plate 1122. The printbed motor 1312 can be a stepper motor. For example, the printbed motor 1312 can be a high-torque NEMA 23 or NEMA 24 bipolar stepper motor having a step angle of approximately 1.8 degrees and a holding torque of between about 2.40 Newton-meter (N-m) and 3.5 N-m.

The printbed motor 1312 can be positioned in between one of the mating nuts 1126 and the lower support plate 1302. The printbed motor 1312 can also be positioned substantially equidistant from the longer sides 1314 of the base plate 1122. It has been discovered by the applicants that positioning the printbed motor 1312 at the aforementioned location on the base plate 1122 reduces the amount of vibrational interference caused by the operation of the printbed motor 1312 on the base plate 1122 and the printbed support assembly 1120.

The printbed motor 1312 can be configured to rotate a printbed drive pulley (hidden from view in FIG. 16A). A printbed timing belt 1315 (e.g., a rubber timing belt) can link the toothed gear plate 1306 to the printbed drive pulley and be looped around both the toothed gear plate 1306 and the printbed drive pulley. The lower support plate 1302 and the upper support plate 1300 can be configured to rotate in response to a rotation of the toothed gear plate 1306.

Although not shown in the figures, it is contemplated by this disclosure that one or more idler pulley can also be used to add tension to the printbed timing belt 1315.

As shown in FIG. 16B, the toothed gear plate 1306 can be shaped substantially as a truncated annular cylinder having a gear tooth profile defined on a lateral side of the truncated annular cylinder. In some embodiments, each gear tooth can have a tooth height of between about 2.5 mm and 3.5 mm (e.g., about 3.0 mm).

The toothed gear plate 1306 can have a gear plate outer diameter. In some embodiments, the gear plate outer diameter can be between about 300 mm to about 400 mm (e.g., about 350 mm). The lower support plate 1302 can have a support plate diameter. The support plate diameter can be between about 400 mm to about 500 mm (e.g., about 450 mm). The gear plate outer diameter can be less than the support plate diameter.

In some embodiments, the ratio of the support plate diameter to the gear plate outer diameter can be between about 1.25 to 1 and 1.30 to 1 (e.g., about 1.28 to 1). In other embodiments, the ratio of the support plate diameter to the gear plate outer diameter can be between about 1.15 to 1 and 1.25 to 1. In further embodiments, the ratio of the support plate diameter to the gear plate outer diameter can be between about 1.30 to 1 and 1.60 to 1.

FIG. 16A illustrates that the upper support plate 1300 can comprise a plurality of cavities 1316 or divots defined along a top surface of the upper support plate 1300. In some embodiments, the cavities 1316 or divots can be sections of the upper support plate 1300 where a top portion of the plate has been removed but a bottom portion of the plate still remains. In other embodiments, the cavities 1316 or divots can be sections of the upper support plate 1300 where a thickness of the plate has been reduced relative to an adjacent section. The cavities 1316 can reduce the weight of the upper support plate 1300 yet allow the upper support plate 1300 to still maintain its structural integrity without bending, twisting, or otherwise deforming (to any noticeable degree).

The upper support plate 1300 can comprise a first cavitied portion 1318 having a first cavity pattern and a second cavitied portion 1320 having a second cavity pattern. The second cavitied portion 1320 can be positioned radially inward of the first cavitied portion 1318. The first cavity pattern can be different from the second cavity pattern.

The first cavitied portion 1318 can be an annular portion defined in proximity to a radially outermost edge of the upper support plate 1300. The first cavity pattern can comprise a plurality of circular trapezoids or curved rectangles arranged in a substantially annular or circular pattern surrounding or encircling the second cavitied portion. The cavities 1316 of the first cavitied portion 1318 can be separated by non-cavitied regions 1322.

The second cavitied portion 1320 can be positioned radially inward of the first cavitied portion 1318 and radially outward of a central portion 1324. The second cavity pattern can comprise a plurality of triangles (e.g., isosceles triangles) or circular sectors arranged in a substantially circular pattern surrounding or encircling the central portion 1324.

In some embodiments, the lower support plate 1302 can also comprise at least one of the first cavitied portion 1318 having the first cavity pattern and the second cavitied portion 1320 having the second cavity pattern.

At least one of the upper support plate 1300, the lower support plate 1302, and the toothed gear plate 1306 can be made in part of a rigid material having a Young's modulus of at least 68 GPa. For example, at least one of the upper support plate 1300, the lower support plate 1302, and the toothed gear plate 1306 can be made of a rigid metal or metal alloy. For example, at least one of the upper support plate 1300, the lower support plate 1302, and the toothed gear plate 1306 can be machined from a sheet of aluminum 6061. In other embodiments, at least one of the upper support plate 1300, the lower support plate 1302, and the toothed gear plate 1306 can be made in part of stainless steel or titanium.

In further embodiments, at least one of the upper support plate 1300, the lower support plate 1302, and the toothed gear plate 1306 can be made of a rigid polymeric material.

One of the technical problems faced by the applicants is how to design a rotatable printbed support assembly that can support a printbed, as well as the 3D object printed on the printbed, without bending, buckling, or twisting. Moreover, a related technical problem faced by the applicants is how to reduce the weight of the rotatable printbed support assembly such that it can be vertically translated up and down along with the printbed motor and any other components needed to rotate and operate the printbed support assembly. The technical solution devised by the applications is the printbed support assembly 1120 disclosed herein. As previously discussed, the printbed support assembly 1120 can comprise an upper support plate 1300 with two cavitied portions uniquely arranged on the upper support plate 1300. The lower support plate 1302 coupled to the upper support plate 1300 can also comprise a plurality of cavitied portions. The printbed support assembly 1120 can also comprise a lightweight toothed gear plate 1306 coupled to the lower support plate 1302.

Figure 17A:
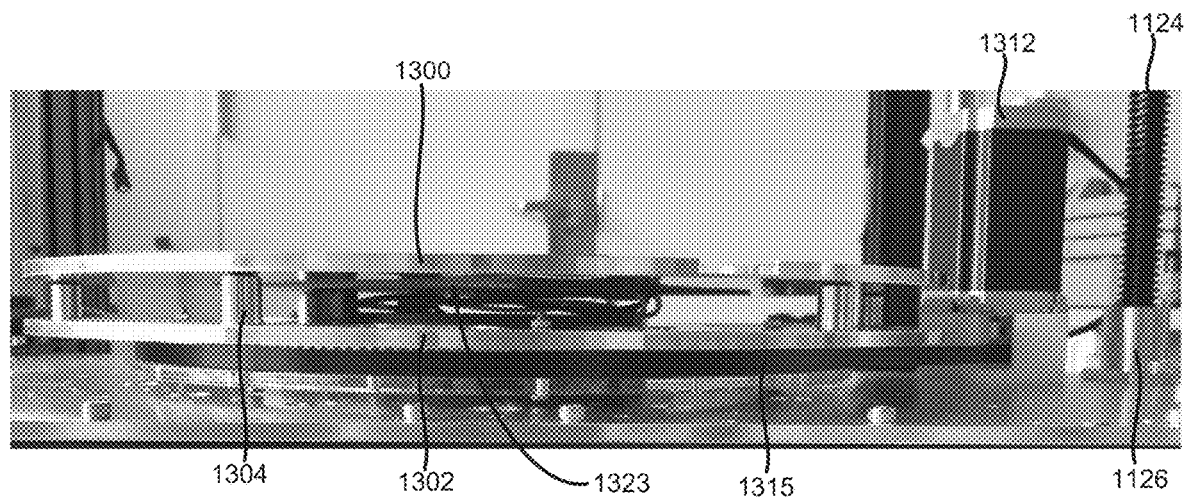
FIG. 17A is a side view of an embodiment of a printbed support assembly of the cylindrical-coordinate 3D printer.

FIG. 17A illustrates that the upper support plate 1300 can be coupled to the lower support plate 1302 by a plurality of height adjustable spacers 1304. In some embodiments, an operator or user of the 3D printer 1100 can lengthen or shorten the height adjustable spacers 1304 to level the upper support plate 1300. The operator or user can adjust the height of the spacers 1304 by turning a spacer bolt head to compress or expand a spring washer within the spacer 1304.

The height adjustable spacers 1304 can create a gap or spacing in between the upper support plate 1300 and the lower support plate 1302. This can allow additional components to be positioned in between the upper support plate 1300 and the lower support plate 1302 such as a heating pad 1323.

The heating pad 1323 can be the same as the heating pad 714 previously disclosed. The heating pad 1323 can be an electrically-powered heating pad. In some embodiments, the heating pad 1323 can be an electrically-powered silicone heating pad. The heating pad 1323 can be attached to the underside of the upper support plate 1300 via adhesives, fasteners, clips, or a combination thereof. The heating pad 1323 can be electrically coupled to the power supply 1132 via a slip ring assembly (for example, the slip ring assembly 800, see, e.g., FIGS. 8A and 8B) such that electrical wires connecting the heating pad 1323 to the power supply 1132 remain untangled when plates of the printbed support assembly 1120 (including the upper support plate 1300) are being rotated.

Although a heating pad 1323 is shown in FIG. 17A, it is contemplated by this disclosure that various other electrically-powered components can also be coupled to the upper support plate 1300 including various sensors, gauges, lights, or a combination thereof.

Figure 17B:
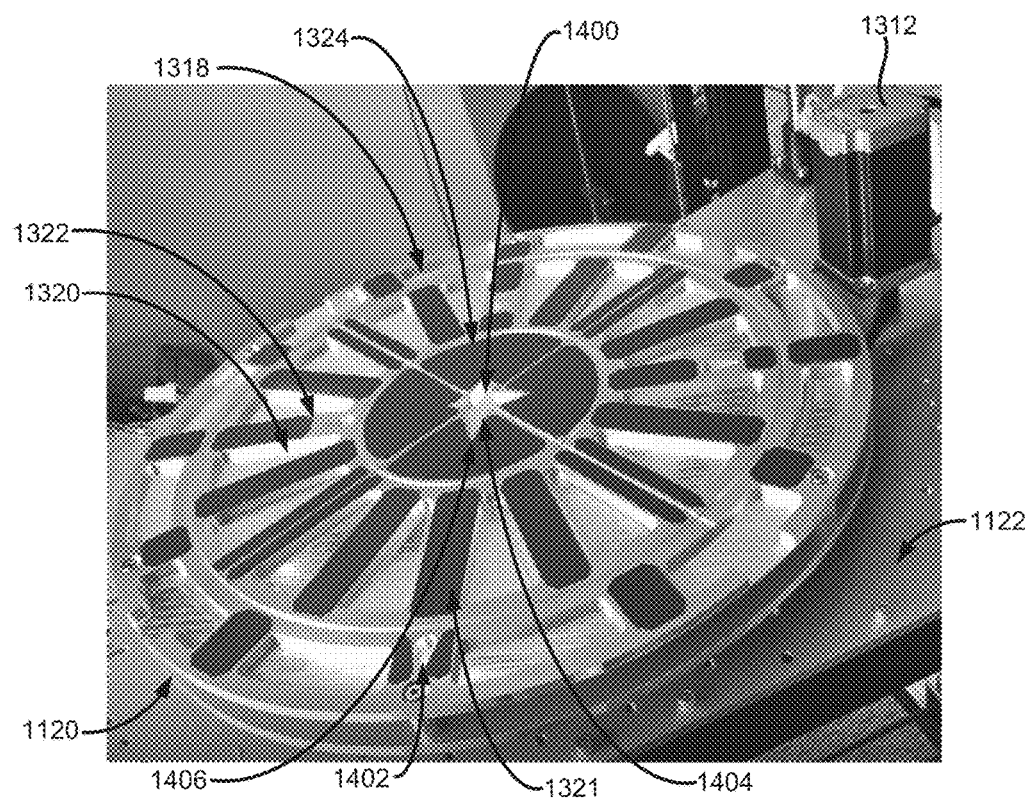
FIG. 17B is a perspective view of the printbed support assembly shown in FIG. 17A.

FIG. 17B illustrates that the upper support plate 1300 can comprise a number of magnets 1321 adhered or otherwise coupled to a top surface of the upper support plate 1300. The magnets 1321 can be used to secure or otherwise attach the metallic printbed 1119 to the top surface of the upper support plate 1300. The magnets 1321 can be positioned in a central portion 1324 of the upper support plate 1300 and along non-cavitied regions 1322 of the upper support plate 1300 radially outward of the central portion 1324.

FIGS. 16A and 17B also illustrate that the central portion 1324 of the upper support plate 1300 can comprise a first alignment cavity 1400 defined within the central portion 1324 and at least one second alignment cavity 1402 positioned radially outward of the first alignment cavity 1400. The first alignment cavity 1400 and the at least one second alignment cavity 1402 can be sections of the upper support plate 1300 where a top portion of the plate has been removed but a bottom portion of the plate still remains (e.g. a divot or carved-out portion). In other embodiments, the first alignment cavity 1400 and the at least one second alignment cavity 1402 can be sections of the upper support plate 1300 where a thickness of the plate has been reduced relative to an adjacent section.

As shown in FIGS. 16A and 17B, the upper support plate 1300 can comprise a plurality of second alignment cavities 1402 positioned radially outward of the first alignment cavity 1400.

The first alignment cavity 1400 can comprise a plurality of converging cavity portions 1404. Each of the converging cavity portions 1404 can be formed from two cavity sides converging at a vertex 1406.

Each vertex 1406 of the first alignment cavity 1400 can be aligned radially with a vertex of a second alignment cavity 1402. For example, the first alignment cavity 1400 can be in the shape of an isotoxal star polygon having a plurality of vertices 1406. As a more specific example, the first alignment cavity 1400 can be in the shape of a four point star. In this example embodiment, the upper support plate 1300 can comprise a total of four second alignment cavities 1402 with each of the second alignment cavities 1402 having one converging cavity portion formed by two cavity sides converging toward a vertex. Moreover, in this example embodiment, each point or vertex 1406 of the four point star can be radially aligned with the vertex of one of the second alignment cavities 1402. More specifically, each point or vertex 1406 of the four point star can be radially aligned with the vertex of one of the second alignment cavities 1402 when a line extending in a radial direction relative to the upper support plate 1300 intersects both of the vertices.

As shown in FIGS. 16A and 17B, each of the second alignment cavities 1402 can be in the shape of an arrowhead, a triangle, or a circular sector. Although FIGS. 16A and 17B illustrate the first alignment cavity 1400 as being in the shape of a four point star, it is contemplated by this disclosure that the first alignment cavity 1400 can be in the shape of a three point star, a six point star, an eight point star, a rhombus or diamond, a square, a pentagon, or a hexagon.

The first alignment cavity 1400 and one or more of the second alignment cavities 1402 can be used by the 3D printer 1100 as part of an alignment procedure to determine whether one or more of the printheads 1172 (more specifically, the nozzles 1200 of the printheads 1172) are out of alignment with respect to the center point 1170 of the upper support plate 1300 and the printbed 1119. Since the center point 1170 acts as the origin for the cylindrical coordinate system used by the 3D printer 1100, it is important that the nozzles 1200 of all of the printheads 1172 agree on the same origin and can reach the same center point 1170.

The alignment procedure can take advantage of the fact that, in some embodiments, the upper support plate 1300, the nozzle 1200 of the printhead 1172, and at least one of the heater block 1202 and the heatsink 1204 of the printhead 1172 are all made out of electrically conductive material. In these embodiments, the upper support plate 1300 and the nozzle 1200, via the heater block 1202 or the heat sink 1204, can be electrically coupled or connected to a switch or switch-type device (e.g., a switch comprising a pullup resistor that is triggered when the switch closes or opens) such that the switch is triggered when the electrically conductive nozzle 1200 makes contact with at least part of the electrically conductive upper support plate 1300. The control unit 1130 can also receive one or more signals from the switch or switch-type device notifying the control unit 1130 that the nozzle 1200 has made physical contact with at least part of the upper support plate 1300.

The one or more processors of the control unit 1130 can be programmed to execute instructions (e.g., firmware instructions or other software instructions) to begin the alignment procedure by translating a gantry carrier 1116 carrying a printhead 1172 (e.g., radially inward) to a position above the first alignment cavity 1400 of the upper support plate 1300 in proximity to a converging cavity portion 1404 of the first alignment cavity 1400. For example, when the first alignment cavity 1400 is in the shape of a four point star, the nozzle 1200 of the printhead 1172 can be positioned above one of the arms of the four point star.

The one or more processors of the control unit 1130 can then be programmed to execute further instructions to adjust the base plate 1122 in the z-direction (i.e., vertically) until the nozzle 1200 of the printhead 1172 is positioned within the converging cavity portion 1404 of the first alignment cavity 1400. For example, the base plate 1122 can be adjusted until the nozzle 1200 is several millimeters (e.g., about 4.0 mm) below a surface of the upper support plate 1300 within one of the converging cavity portions 1404 of the first alignment cavity 1400.

The one or more processors of the control unit 1130 can then be programmed to execute further instructions to rotate the printbed support assembly 1120 in a clockwise and/or counterclockwise rotational direction until the nozzle 1200 physically contacts the converging sides of the converging cavity portion 1404. In some embodiments, the gantry carrier 1116 can slowly move the nozzle 1200 radially inward as the printbed support assembly 1120 is rotated repeatedly in a clockwise and/or counterclockwise rotational direction until the nozzle 1200 physically contacts several points along the converging sides of the converging cavity portion 1404.

Figure 18A:
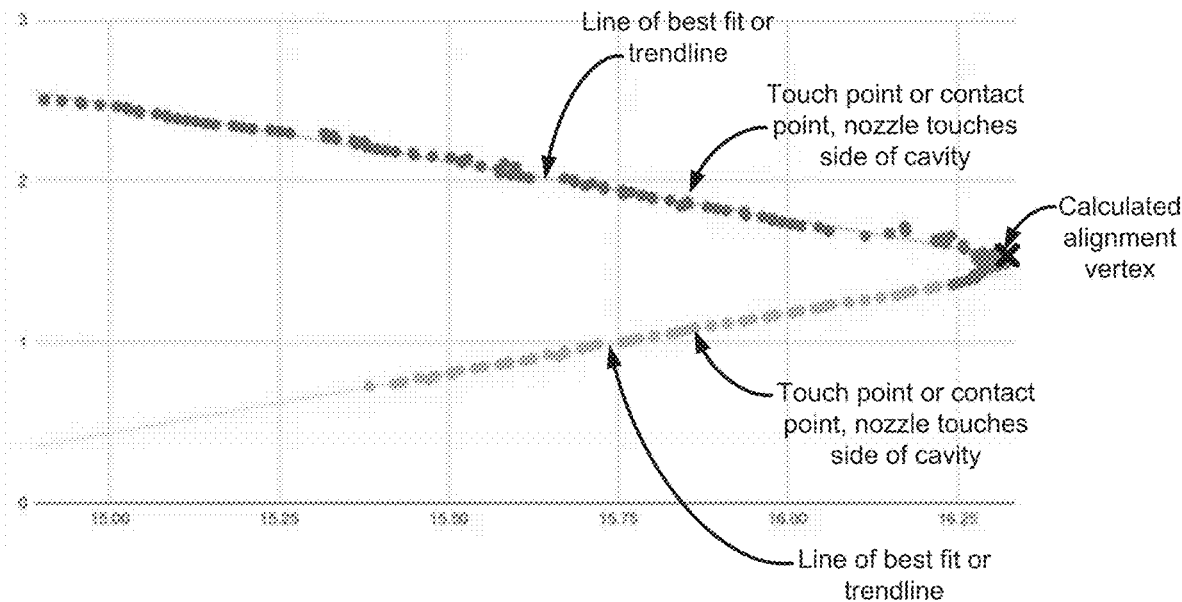
FIG. 18A is a plot showing multiple points of contact between an electrically conductive nozzle and the electrically conductive sides of an alignment cavity.

FIG. 18A is a plot showing multiple points of contact between the electrically conductive nozzle 1200 and the electrically conductive cavity sides of a converging cavity portion 1404 (e.g., one of the arms of the four point star) of the first alignment cavity 1400. Each dot on the plot represents a touch point or a registered point of contact between the nozzle 1200 and one of the cavity sides. Once enough touch points or points of contact are registered, the one or more processors of the control unit 1130 can calculate trendlines or lines of best fit through the various touch points or points of contact. Two converging trendlines or lines of best fit can be calculated. The converging best fit lines can then be used to calculate a first alignment vertex (see FIG. 18B).

This same process can be repeated with the second alignment cavity 1402. For example, the one or more processors of the control unit 1130 can then be programmed to execute further instructions to lower the base plate 1122 and translate the gantry carrier 1116 carrying the printhead 1172 radially outward to a position above one of the second alignment cavities 1402. The nozzle 1200 of the printhead 1172 can be positioned in proximity to the vertex and in between two converging cavity sides of the second alignment cavity 1402. The base plate 1122 can then be raised until the nozzle 1200 is several millimeters (e.g., about 4.0 mm) below the surface of the upper support plate 1300 within the second alignment cavity 1402.

The one or more processors of the control unit 1130 can then be programmed to execute further instructions to rotate the printbed support assembly 1120 in both a clockwise and counterclockwise rotational direction until the nozzle 1200 physically contacts the converging sides of the second alignment cavity 1402. In some embodiments, the gantry carrier 1116 can slowly move the nozzle 1200 radially inward as the printbed support assembly 1120 is rotated repeatedly in a clockwise and counterclockwise rotational direction until the nozzle 1200 physically contacts several points along the converging sides of the second alignment cavity 1402.

Once enough touch points or points of contact are registered, the one or more processors of the control unit 1130 can calculate trendlines or lines of best fit through the various touch points or points of contact. Two converging trendlines or lines of best fit can be calculated. The converging best fit lines can then be used to calculate a second alignment vertex (see FIG. 18B).

Once the first alignment vertex and the second alignment vertex are calculated, the one or more processors of the control unit 1130 can then be programmed to execute further instructions to calculate a line intersecting or extending through both the first alignment vertex and the second alignment vertex. The line calculated from the first alignment vertex and the second alignment vertex can represent a calculated travel path of the nozzle 1200. The one or more processors of the control unit 1130 can then be programmed to execute further instructions to determine whether the nozzle 1200 is aligned based on whether the line intersects the center point 1170 or origin.

Figure 18B:
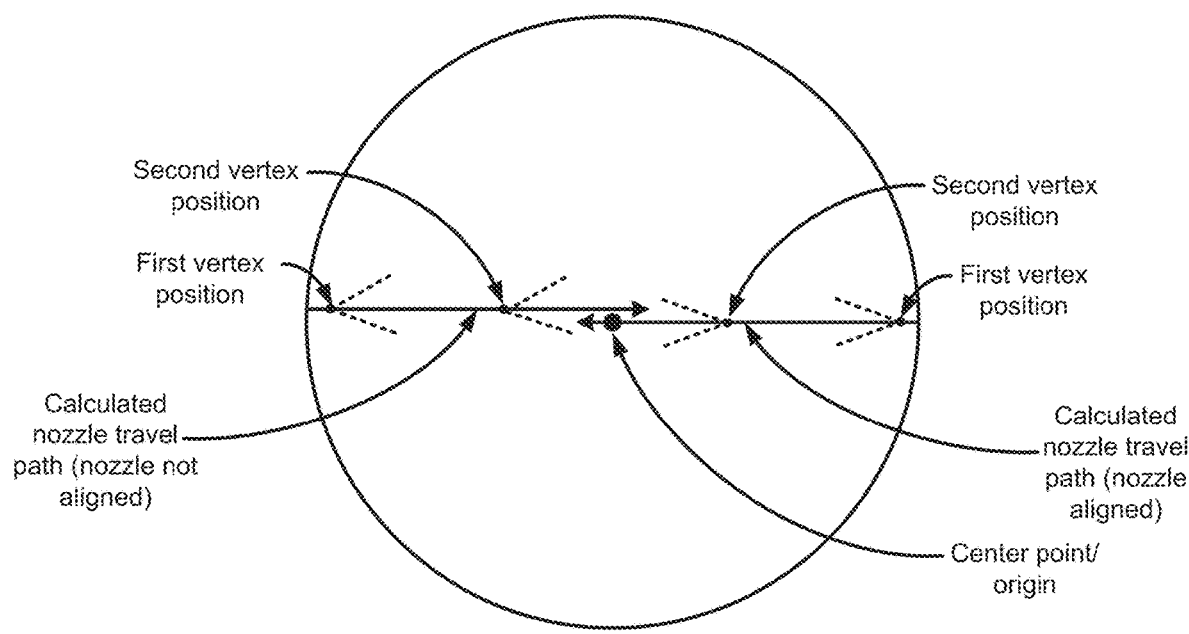
FIG. 18B is a schematic diagram illustrating a scenario where one nozzle of a printhead is aligned and a nozzle of another printhead is misaligned.

FIG. 18B is a schematic diagram illustrating a scenario where one nozzle 1200 of a printhead is aligned and another nozzle 1200 of a printhead is misaligned. As shown in FIG. 18B, when the nozzle 1200 is properly aligned, the calculated travel path of the nozzle 1200 intersects the center point 1170. When the nozzle 1200 is misaligned, the calculated travel path of the nozzle 1200 does not intersect the center point 1170.

When the 3D printer 1100 comprises four printheads 1172, all four printheads 1172 can undergo the alignment procedure to ensure that the nozzles 1200 of the four printheads 1172 can all reach the same center point 1170 or origin. Moreover, the alignment procedure can ensure that the nozzle travel paths of diametrically opposed printheads (e.g., the first printhead 1172A and the third printhead 1172C or the second printhead 1172B and the fourth printhead 1172D) are diametrically aligned.

It is contemplated by this disclosure that any of the converging cavity portions 1404 (e.g., arms of the star) of the first alignment cavity 1400 and any of the second alignment cavities 1402 can be used as part of the alignment procedure as long as the vertex of the second alignment cavity 1402 selected is radially in line with the vertex of the converging cavity portion 1404 selected.

When a nozzle 1200 is determined to be misaligned, a user or operator of the 3D printer 1100 can turn or otherwise adjust the micro-adjustment screws 1210 on the gantry carrier 1116 to fine tune the positioning or alignment of the printhead 1172 (including the nozzle 1200 disposed at a distal end of the printhead 1172). In other embodiments, the 3D printer 1100 can use software to account for the misalignment.

Figure 19:
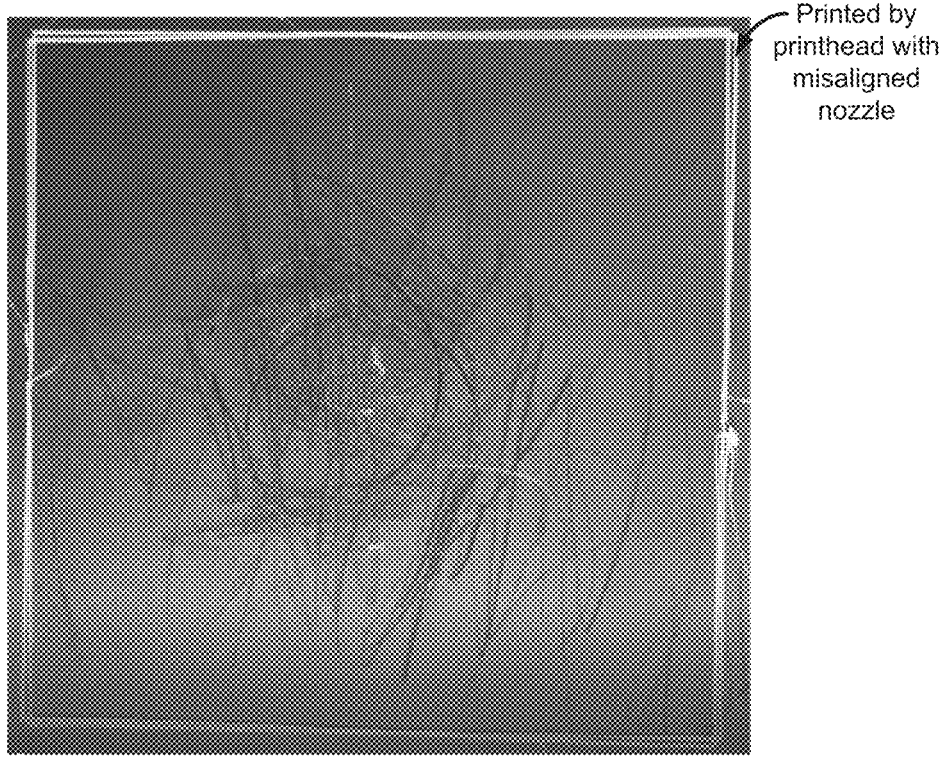
FIG. 19 is an image showing two square frames printed by two printheads of the cylindrical-coordinate 3D printer when the nozzles of such printheads are not aligned.

FIG. 19 is a black-and-white image showing two square frames printed by two different printheads when a nozzle of one of the printheads is misaligned with the other nozzle of the other printhead. In the scenario shown in FIG. 19, the printheads were instructed to print the same square frame at the same coordinates on the printbed. FIG. 19 illustrates that when one of the nozzles is misaligned and used as part of a print operation with nozzles that are aligned, the resulting print job can be adversely affected such that one or more layers or portions of the 3D printed object can be misaligned, thereby compromising the entire print job.

Figure 20:
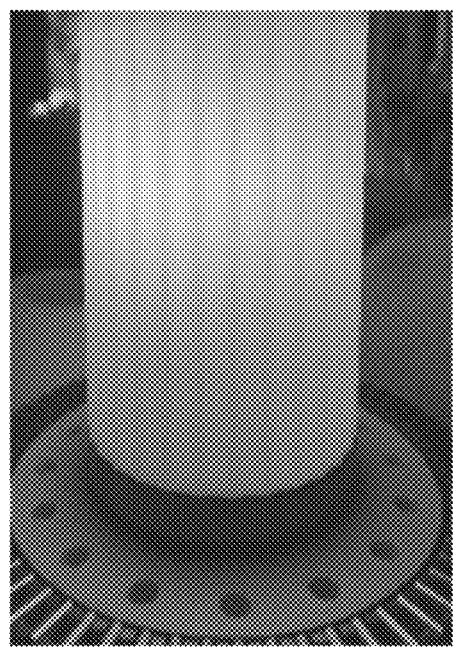
FIG. 20 is an image showing the same 3D printed product printed by the cylindrical-coordinate 3D printer.

FIG. 20 is a black-and-white image showing a lamp printed by the cylindrical-coordinate 3D printer 1100 disclosed herein. As shown in FIG. 20, the lamp printed by the cylindrical-coordinate 3D printer 1100 is free of streaks or other visible blemishes. This is especially important for 3D printed products (e.g., lamps, light covers, etc.) printed using translucent or clear 3D printing filament such as translucent or clear PLA, translucent or clear PETG, or PETT.

The quality of such 3D printed products can be attributed to the unique components of the cylindrical-coordinate 3D printer 1100 disclosed herein including, but not limited to, the rotatable printbed support assembly 1120 comprising the lightweight upper support plate 1300, the vertically translatable base plate 1122 supporting the rotatable printbed support assembly 1120 and which is translated by the dual lead screw mechanism, and the stiff gantry carriers 1116 carrying the extruders and printheads.

Moreover, it has been discovered by the applicant that the cylindrical-coordinate 3D printer 1100 disclosed herein can print 3D printed objects up to 50% faster than certain traditional Cartesian 3D printers. For larger 3D printed objects, the applicant has discovered that the cylindrical-coordinate 3D printer 1100 disclosed herein can print 3D printed objects up to 70% faster than certain traditional Cartesian 3D printers.

Figure 21:
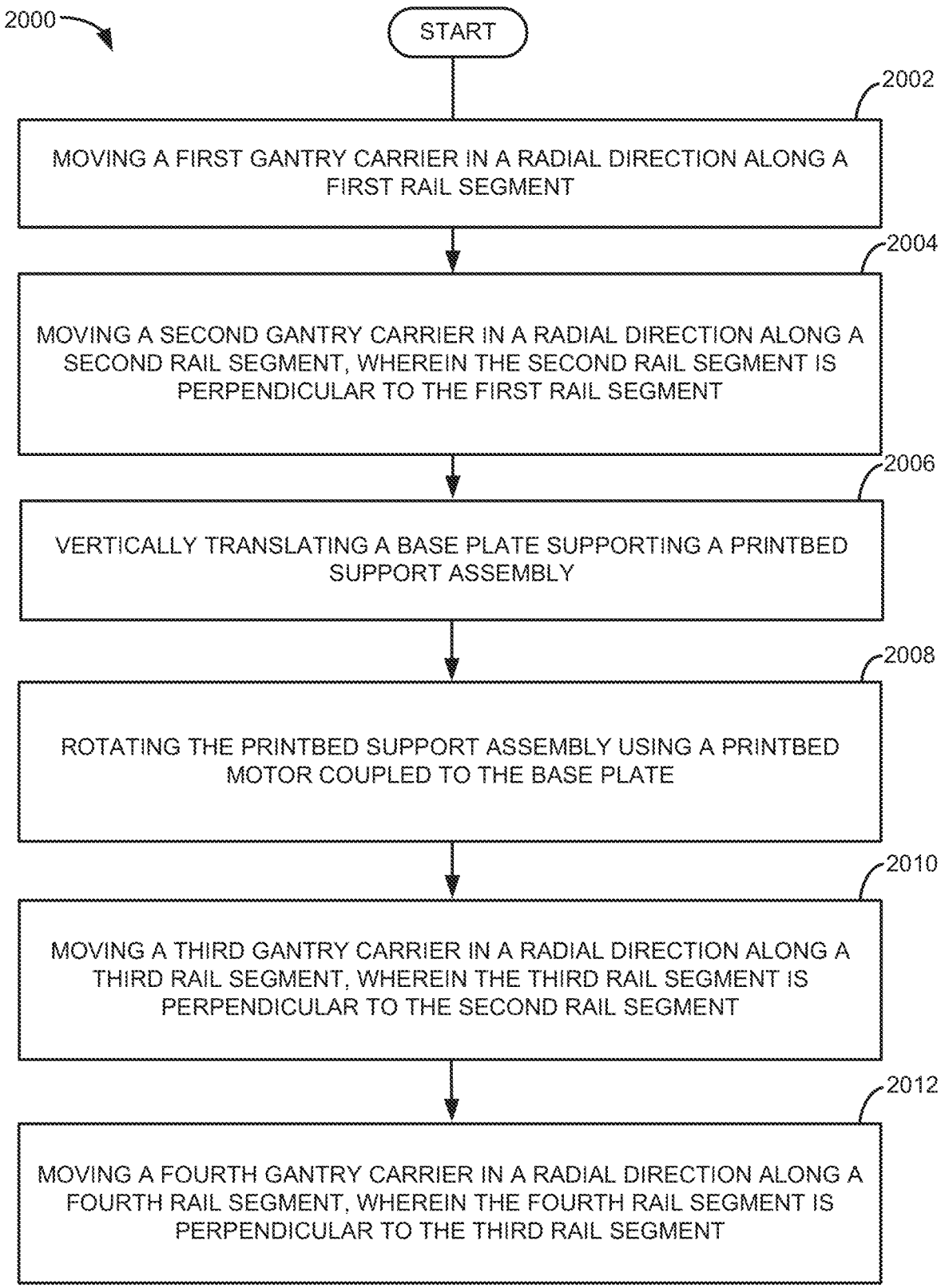
FIG. 21 illustrates an embodiment of a method of 3D printing using a cylindrical-coordinate 3D printer.

FIG. 21 illustrates an embodiment of a method 2000 of 3D printing. The method 2000 can comprise moving a first gantry carrier 1116A in a radial direction along a first rail segment 1160A in step 2002. The method 2000 can also comprise moving a second gantry carrier 1116B in a radial direction along a second rail segment 1160B in step 2004. The second rail segment 1160A can be perpendicular to the first rail segment 1160B.

The method 2000 can further comprise vertically translating a base plate 1122 supporting a printbed support assembly 1120 in step 2006. Vertically translating the base plate 1122 can further comprise vertically translating the base plate 1122 by simultaneously rotating a first lead screw 1124A and a second lead screw 1124B coupled to and extending through the base plate 1122. The first rotatable lead screw 1124A and the second rotatable lead screw 1124B can be positioned on opposite sides of the base plate 1122.

The method 2000 can also comprise rotating the printbed support assembly 1120 using a printbed motor 1312 coupled to the base plate 1122 in step 2008. Rotating the printbed support assembly 1120 can further comprise rotating a printbed drive pulley using the printbed motor 1312. The printbed drive pulley can be linked to a toothed gear plate 1306 of the printbed support assembly 1120 via a printbed timing belt 1315. The printbed timing belt 1315 and the rotation of the toothed gear plate 1306 can be driven by the rotation of the printbed drive pulley. The lower support plate 1302 and the upper support plate 1300 can be configured to rotate in response to a rotation of the toothed gear plate 1306.

The method 2000 can further comprise moving a third gantry carrier 1116C in a radial direction along a third rail segment 1160C in step 2010. The third rail segment 1160B can be perpendicular to the second rail segment 1160B. The method 2000 can also comprise moving a fourth gantry carrier 1116D in a radial direction along a fourth rail segment 1160D in step 2012. The second rail segment 1160B can be perpendicular to the third rail segment 1160C. In some embodiments, the first gantry carrier 1116A, the second gantry carrier 1116B, the third gantry carrier 1116C, and the fourth gantry carrier 1116D can be configured to be moved simultaneously.

The method 2000 can also comprise depositing a heated filament at a center point 1170 of a printbed 1119 attached to the printbed support assembly 1120 using a first printhead 1172A mounted to the first gantry carrier 1116A. The method 2000 can further comprise depositing another instance of the heated filament at the center point 1170 of the printbed 1119 using a second printhead 1172B mounted to the second gantry carrier 1116B. The heated filament can be extruded from a direct drive extruder mounted to the gantry carriers.

The method 2000 can further comprise heating the upper support plate 1300 using a heating pad 1323 coupled to an underside of the upper support plate 1300. The heating pad 1323 can be electrically coupled to a power supply via a slip ring assembly such that electrical wires connecting the heating pad 1323 to the power supply remain untangled when the printbed support assembly 1120 is rotated.

A number of embodiments have been described. Nevertheless, it will be understood by one of ordinary skill in the art that various changes and modifications can be made to this disclosure without departing from the spirit and scope of the embodiments. Elements of systems, devices, apparatus, and methods shown with any embodiment are exemplary for the specific embodiment and can be used in combination or otherwise on other embodiments within this disclosure. For example, the steps of any methods depicted in the figures or described in this disclosure do not require the particular order or sequential order shown or described to achieve the desired results. In addition, other steps operations may be provided, or steps or operations may be eliminated or omitted from the described methods or processes to achieve the desired results. Moreover, any components or parts of any apparatus or systems described in this disclosure or depicted in the figures may be removed, eliminated, or omitted to achieve the desired results. In addition, certain components or parts of the systems, devices, or apparatus shown or described herein have been omitted for the sake of succinctness and clarity.

Accordingly, other embodiments are within the scope of the following claims and the specification and/or drawings may be regarded in an illustrative rather than a restrictive sense.

Each of the individual variations or embodiments described and illustrated herein has discrete components and features which may be readily separated from or combined with the features of any of the other variations or embodiments. Modifications may be made to adapt a particular situation, material, composition of matter, process, process act(s) or step(s) to the objective(s), spirit or scope of the present invention.

Methods recited herein may be carried out in any order of the recited events that is logically possible, as well as the recited order of events. Moreover, additional steps or operations may be provided or steps or operations may be eliminated to achieve the desired result.

Furthermore, where a range of values is provided, every intervening value between the upper and lower limit of that range and any other stated or intervening value in that stated range is encompassed within the invention. Also, any optional feature of the inventive variations described may be set forth and claimed independently, or in combination with any one or more of the features described herein. For example, a description of a range from 1 to 5 should be considered to have disclosed subranges such as from 1 to 3, from 1 to 4, from 2 to 4, from 2 to 5, from 3 to 5, etc. as well as individual numbers within that range, for example 1.5, 2.5, etc. and any whole or partial increments therebetween.

All existing subject matter mentioned herein (e.g., publications, patents, patent applications) is incorporated by reference herein in its entirety except insofar as the subject matter may conflict with that of the present invention (in which case what is present herein shall prevail). The referenced items are provided solely for their disclosure prior to the filing date of the present application. Nothing herein is to be construed as an admission that the present invention is not entitled to antedate such material by virtue of prior invention.

Reference to a singular item, includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Unless defined otherwise, all technical and scientific terms used herein have the same meaning as commonly understood by one of ordinary skill in the art to which this invention belongs.

In understanding the scope of the present disclosure, the term "comprising" and its derivatives, as used herein, are intended to be open-ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" "element," or "component" when used in the singular can have the dual meaning of a single part or a plurality of parts. As used herein, the following directional terms "forward, rearward, above, downward, vertical, horizontal, below, transverse, laterally, and vertically" as well as any other similar directional terms refer to those positions of a device or piece of equipment or those directions of the device or piece of equipment being translated or moved. Finally, terms of degree such as "substantially", "about" and "approximately" as used herein mean a reasonable amount of deviation (e.g., a deviation of up to ±0.1%, ±1%, ±5%, or ±10%, as such variations are appropriate) from the specified value such that the end result is not significantly or materially changed.

This disclosure is not intended to be limited to the scope of the particular forms set forth, but is intended to cover alternatives, modifications, and equivalents of the variations or embodiments described herein. Further, the scope of the disclosure fully encompasses other variations or embodiments that may become obvious to those skilled in the art in view of this disclosure.

We claim:

1. A three-dimensional (3D) printer comprising:
 a printbed support assembly, wherein the printbed support assembly is rotatable;
 a base plate configured to support the printbed support assembly, wherein the base plate is vertically translatable;
 a first rail segment positioned above the printbed support assembly, wherein the first rail segment is aligned radially with the printbed support assembly;
 a second rail segment positioned above the printbed support assembly, wherein the second rail segment is perpendicular to the first rail segment and also aligned radially with the printbed support assembly;
 a third rail segment positioned above the printbed support assembly, wherein the third rail segment is oriented perpendicular to the second rail segment and collinear with the first rail segment;
 a fourth rail segment positioned above the printbed support assembly, wherein the fourth rail segment is oriented perpendicular to the third rail segment and collinear with the second rail segment;
 a first gantry carrier configured to carry or support a first printhead, wherein the first gantry carrier is moveable along at least part of the first rail segment; and
 a second gantry carrier configured to carry or support a second printhead, wherein the second gantry carrier is moveable along at least part of the second rail segment, and wherein the first gantry carrier and the second gantry carrier are configured to be moved simultaneously;
 a third gantry carrier configured to carry or support a third printhead, wherein the third gantry carrier is moveable along at least part of the third rail segment;
 a fourth gantry carrier configured to carry or support a fourth printhead, wherein the fourth gantry carrier is moveable along at least part of the fourth rail segment, wherein the first gantry carrier, the second gantry carrier, the third gantry carrier, and the fourth gantry carrier are configured to be moved simultaneously;
 a first rail frame support, wherein the first rail segment and the third rail segment are part of one continuous rail coupled to the first rail frame support and the travel paths of the first gantry carrier and the third gantry carrier overlap along the continuous rail, wherein the first rail frame support comprises a cutout defined along the first rail frame support; and
 a second rail frame support extending through the cutout and oriented perpendicular to the first rail frame support, wherein the second rail segment and the fourth rail segment are coupled to the second rail frame support.

2. The 3D printer of claim 1, wherein the printbed support assembly comprises a center point, wherein at least one of the first printhead, the second printhead, the third printhead, and the fourth printhead are configured to print to the center point.

3. The 3D printer of claim 1, wherein the base plate is vertically translatable via a first rotatable lead screw and a second rotatable lead screw coupled to and extending through the base plate, wherein the first rotatable lead screw and the second rotatable lead screw are positioned on opposite sides of the base plate.

4. The 3D printer of claim 3, further comprising:
 a first lead screw pulley coupled to the first rotatable lead screw;
 a second lead screw pulley coupled to the second rotatable lead screw;
 a lead screw motor configured to rotate a lead screw drive pulley coupled to the lead screw motor; and
 a lead screw belt looped around at least the first lead screw pulley, the second lead screw pulley, and the lead screw drive pulley,
  wherein the lead screw belt and the rotation of the first rotatable lead screw and the second rotatable lead screw are driven by the rotation of the lead screw drive pulley.

5. The 3D printer of claim 3, further comprising at least four stabilizing rods extending through the base plate, wherein each of the at least four stabilizing rods are positioned at a corner of the base plate, wherein the at least four stabilizing rods are configured to stabilize and level the base plate.

6. The 3D printer of claim 1, wherein the printbed support assembly comprises:
 an upper support plate;
 a lower support plate positioned below the upper support plate and coupled to the upper support plate;
 a toothed gear plate positioned below the lower support plate and coupled to the lower support plate;
 an upper bearing plate coupled to an underside of the lower support plate; and
 a lower bearing plate coupled to the base plate, wherein the upper bearing plate is configured to swivel or rotate with respect to the lower bearing plate via bearings disposed in between the upper bearing plate and the lower bearing plate.

7. The 3D printer of claim 6, further comprising:
 a printbed motor disposed on the base plate and configured to rotate a printbed drive pulley; and
 a printbed timing belt looped around the toothed gear plate and the printbed drive pulley,
  wherein the printbed timing belt and the rotation of the toothed gear plate are driven by the rotation of the printbed drive pulley, and
  wherein the lower support plate and the upper support plate are configured to rotate in response to a rotation of the toothed gear plate.

8. The 3D printer of claim 6, wherein the upper support plate is configured to be heated by a heating pad coupled to an underside of the upper support plate, wherein the heating pad is electrically coupled to a power supply of the 3D printer via a slip ring assembly such that electrical wires connecting the heating pad to the power supply remain untangled when the printbed support assembly is rotated.

9. The 3D printer of claim 1, further comprising a plurality of filament spools positioned vertically above the first rail segment and the second rail segment, wherein the filament spools are exposed to allow detachment and replacement of the filament spools.

10. The 3D printer of claim 6, wherein the upper support plate is coupled to the lower support plate by a plurality of height adjustable spacers configured to lengthen or shorten to level the upper support plate.

11. The 3D printer of claim 6, wherein the upper support plate comprises a plurality of cavities defined along a surface of the upper support plate.

12. The 3D printer of claim 11, wherein the upper support plate comprises a first cavitied portion having a first cavity pattern and a second cavitied portion having a second cavity pattern, wherein the second cavitied portion is positioned radially inward of the first cavitied portion, and wherein the first cavity pattern is different from the second cavity pattern.

13. The 3D printer of claim 6, wherein the upper support plate comprises a central portion having a first alignment cavity defined within the central portion, and wherein the upper support plate comprises a second alignment cavity positioned radially outward of the first alignment cavity.

14. The 3D printer of claim 13, wherein each of the first alignment cavity and the second alignment cavity comprises at least two cavity sides converging toward a vertex.

15. The 3D printer of claim 14, wherein the printbed support assembly comprises a center point, and wherein the 3D printer further comprises a control unit comprising one or more processors and one or more memory units, wherein the one or more processors are programmed to execute instructions stored in the one or more memory units to:
- calculate a first alignment vertex based in part on recorded points of contact made by a first nozzle of the first printhead with the at least two cavity sides of the first alignment cavity;
- calculate a second alignment vertex based in part on recorded points of contact made by the first nozzle with the at least two cavity sides of the second alignment cavity;
- calculate a line intersecting the first alignment vertex and the second alignment vertex representing a calculated travel path of the first nozzle; and
- determine an alignment of the first nozzle based on whether the line intersects the center point.

16. The 3D printer of claim 1, wherein the first gantry carrier further comprises a plurality of micro-adjustment screws configured to adjust at least one of a vertical height of the first printhead and a lateral positioning of the first printhead.

* * * * *